(12) United States Patent
Ko et al.

(10) Patent No.: US 12,432,342 B2
(45) Date of Patent: *Sep. 30, 2025

(54) VIDEO SIGNAL PROCESSING METHOD AND DEVICE USING INTRA PREDICTION FILTERING

(71) Applicant: SAMSUNG ELECTRONICS CO., LTD., Suwon-si (KR)

(72) Inventors: Geonjung Ko, Seoul (KR); Dongcheol Kim, Suwon-Si (KR); Juhyung Son, Uiwang-Si (KR); Jaehong Jung, Seoul (KR); Jinsam Kwak, Anyang-Si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/625,286

(22) Filed: Apr. 3, 2024

(65) Prior Publication Data

US 2024/0283909 A1    Aug. 22, 2024

Related U.S. Application Data

(63) Continuation of application No. 18/146,642, filed on Dec. 27, 2022, now Pat. No. 11,956,424, which is a
(Continued)

(30) Foreign Application Priority Data

| Nov. 28, 2018 | (KR) | .................. | 10-2018-0150236 |
| Jan. 18, 2019 | (KR) | .................. | 10-2019-0007196 |
| Aug. 14, 2019 | (KR) | .................. | 10-2019-0099887 |

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11);
(Continued)

(58) Field of Classification Search
CPC .. H04N 19/105; H04N 19/132; H04N 19/159; H04N 19/176; H04N 19/46;
(Continued)

(56) References Cited

U.S. PATENT DOCUMENTS

| 10,491,893 | B1 | 11/2019 | Zhao |
| 2007/0206872 | A1 | 9/2007 | Song |

(Continued)

FOREIGN PATENT DOCUMENTS

| KR | 10-2014-0049098 A | 4/2014 |
| KR | 10-2014-0145606 A | 12/2014 |

(Continued)

OTHER PUBLICATIONS

Communication issued on Dec. 28, 2023 by the Intellectual Property of Vietnam in Vietnamese Patent Application No. 1-2021-03788.
(Continued)

*Primary Examiner* — Marnie A Matt
(74) *Attorney, Agent, or Firm* — Sughrue Mion, PLLC

(57) ABSTRACT

A video signal processing method includes: a step for deriving an intra prediction mode of a current block; a step for constructing a reference sample around the current block; a step for generating a prediction sample of the current block by using the reference sample on the basis of the intra prediction mode; and a step for restoring the current block on the basis of the prediction sample. The step for generating the prediction sample may include: a step for setting a filter flag value which specifies a filter coefficient of an interpolation filter applied to the reference sample on
(Continued)

the basis of the width and height of the current block; and a step for performing filtering on the reference sample by using the interpolation filter having the filter coefficient specified by the filter flag.

4 Claims, 26 Drawing Sheets

Related U.S. Application Data continuation of application No. 17/333,887, filed on May 28, 2021, now Pat. No. 11,632,543, which is a continuation of application No. PCT/KR2019/016639, filed on Nov. 28, 2019.

(51) Int. Cl.
  *H04N 19/159* (2014.01)
  *H04N 19/176* (2014.01)
  *H04N 19/46* (2014.01)
  *H04N 19/82* (2014.01)

(52) U.S. Cl.
  CPC .......... *H04N 19/176* (2014.11); *H04N 19/46* (2014.11); *H04N 19/82* (2014.11)

(58) Field of Classification Search
  CPC ...... H04N 19/82; H04N 19/11; H04N 19/117; H04N 19/157; H04N 19/182; H04N 19/593; H04N 19/107; H04N 19/119; H04N 19/50; H04N 19/60; H04N 19/70; H04N 19/80; H04N 19/91
  USPC .................................................... 375/240.02
  See application file for complete search history.

(56) References Cited

U.S. PATENT DOCUMENTS

| | | | |
|---|---|---|---|
| 2013/0136175 A1* | 5/2013 | Wang ..................... | H04N 19/11 375/240.12 |
| 2015/0023405 A1 | 1/2015 | Joshi | |
| 2017/0034536 A1 | 2/2017 | Filippov | |
| 2019/0191155 A1 | 6/2019 | Ko | |
| 2019/0313116 A1 | 10/2019 | Lee | |
| 2019/0335171 A1 | 10/2019 | Jeong | |
| 2020/0014916 A1* | 1/2020 | Gamei ................. | H04N 19/119 |
| 2020/0344471 A1 | 10/2020 | Lee | |
| 2020/0413069 A1 | 12/2020 | Lim | |
| 2021/0021818 A1* | 1/2021 | Lee ....................... | H04N 19/119 |
| 2021/0105468 A1* | 4/2021 | Ikonin .................... | H04N 19/70 |
| 2021/0377519 A1* | 12/2021 | Kim ....................... | H04N 19/119 |
| 2022/0345728 A1* | 10/2022 | Poirier ................... | H04N 19/70 |
| 2023/0319270 A1* | 10/2023 | Filippov .............. | H04N 19/159 |

FOREIGN PATENT DOCUMENTS

| | | | | |
|---|---|---|---|---|
| KR | 1020160034923 A | | 3/2016 | |
| WO | 2017-222237 A1 | | 12/2017 | |
| WO | WO-2020111843 A1 * | | 6/2020 | ........... H04N 19/105 |

OTHER PUBLICATIONS

International Search Report of International application No. PCT/KR2019/016639. Mar. 20, 2020.
Santiago De Lux N Hernandez. CE3: Line-based intra coding mode (Tests 2.2. I and 2. 1.2). Joint Video Experts Team (JVET) ofTU-T SG 16 IVI) 3 and iSO/[EC .ITC iiSC 29/WG 11. JVET-Loo76 __ v2. 12th Meeting. Macao, CN. pp. 1-9, Oct. 12, 2018 [Retrieved on Mar. 11, 2020], Retrieved from [http://phenix.int-evry.fr/jvet;] See pp. 4-5.
Flynn, David. High Efficiency Video Coding (HEVC) Range Extensions text specification Draft 3, Joint Collaborative Team on Video Coding (JCT-VC) ofITU-T SG I 6 WP 3 and ISO/IEC JTC I /SC 29/WG I I.JCTVC-1\11005 . . . _vl 13th Meeting: Incheon, KR pp. 1-303, Apr. 26, 2013, [Retrieved on II Mar. 2020], Retrieved from | http://phenix.it_sudpans.eu/Jct!] See pp. 108-109.
Written Opinion of International application No. PCT /KR2019/016639. Mar. 20, 2020.
Non-Final Rejection of U.S. Appl. No. 17/333,887 from the USPTO dated Jun. 8, 2022.
Notice of Allowance of U.S. Appl. No. 17/333,887 from the USPTO dated Nov. 10, 2022.
Communication dated Oct. 22, 2024, issued by the Korean Patent Office in Korean Application No. 10-2021-7016079.
Communication issued on Jun. 12, 2025 by the Korean Intellectual Property Office for Korean Patent Application No. 10-2021-7016079.

* cited by examiner

FIG. 10

| IntraHorVerDistThres [nTbS] | nTbS = 2 | nTbS = 3 | nTbS = 4 | nTbS = 5 | nTbS = 6 | nTbS = 7 |
|---|---|---|---|---|---|---|
| | 20 | 14 | 2 | 0 | 20 | 0 |

FIG. 11

| IntraHorVerDistThres [nTbS] | nTbS = 2 | nTbS = 3 | nTbS = 4 | nTbS = 5 | nTbS = 6 | nTbS = 7 |
|---|---|---|---|---|---|---|
| | 20 | 14 | 2 | 0 | 0 | 0 |

FIG. 12

| IntraHorVerDistThres [nTbS] | nTbS = 2 | nTbS = 3 | nTbS = 4 | nTbS = 5 | nTbS = 6 | nTbS = 7 |
|---|---|---|---|---|---|---|
| | N/A | A | B | C | D | E |

FIG. 13

| IntraHorVerDistThres [nTbS] | nTbS = 2 | nTbS = 3 | nTbS = 4 | nTbS = 5 | nTbS = 6 | nTbS = 7 |
|---|---|---|---|---|---|---|
| | 16 | A | B | C | D | E |

FIG. 15

| IntraHorVerDistThres [nTbS] | 4x4 | 8x4 or 4x8 | nTbS = 3 | nTbS = 4 | nTbS = 5 | nTbS = 6 | nTbS = 7 |
|---|---|---|---|---|---|---|---|
| | A | B | C | D | E | F | G |

VIDEO SIGNAL PROCESSING METHOD AND DEVICE USING INTRA PREDICTION FILTERING

CROSS-REFERENCE TO RELATED APPLICATIONS

This application is a continuation of U.S. application Ser. No. 18/146,642, which was filed on Dec. 27, 2022, which is a continuation of U.S. application Ser. No. 17/333,887, which was filed on May 28, 2021, now U.S. Pat. No. 11,632,543, issued on Apr. 18, 2023, and which is a continuation of PCT International Application No. PCT/KR2019/016639, which was filed on Nov. 28, 2019, and which claims priority under 35 U.S.C 119(a) to Korean Patent Application No. 10-2018-0150236 filed with the Korean Intellectual Property Office on Nov. 28, 2018, Korean Patent Application No. 10-2019-0007196 filed with the Korean Intellectual Property Office on Jan. 18, 2019, and Korean Patent Application No. 10-2019-0099887 filed with the Korean Intellectual Property Office on Aug. 14, 2019. The disclosures of the above patent applications are incorporated herein by reference in their entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with recent developments in media and data transmission media, a more efficient video signal processing method and apparatus are required.

DETAILED DESCRIPTION OF THE INVENTION

Technical Problem

An aspect of the present disclosure is to increase coding efficiency of a video signal. Another aspect of the present disclosure is to increase signaling efficiency related to a motion information set of a current block.

Technical Solution

In order to achieve the task as described above, the present disclosure provides a video signal processing device and a video signal processing method as follows.

According to an embodiment of the present disclosure, provided is a video signal processing method including: deriving an intra-prediction mode of a current block; configuring a reference sample around the current block; generating a prediction sample of the current block by using the reference sample on the basis of the intra-prediction mode; and reconstructing the current block on the basis of the prediction sample, wherein the generating of the prediction sample includes: on the basis of a width and a height of the current block, configuring a value of a filter flag specifying a filter coefficient of an interpolation filter applied to the reference sample; and performing filtering for the reference sample by using an interpolation filter having the filter coefficient specified by the filter flag.

As an embodiment, the value of the filter flag may be configured on the basis of a block size variable of the current block. The block size variable may be derived by summing up a value of log base 2 of the width, a value of log base 2 of the height, and applying a right shift operation by 1 for a sum value.

As an embodiment, if a vertical horizontal distance minimum value is larger than a predefined particular threshold value, the value of the filter flag may be configured to be 1, and otherwise, the value of the filter flag may be configured to be 0. The vertical horizontal distance minimum value may be derived to be a smaller value between an absolute value of a difference between the intra-prediction mode and a horizontal mode, and an absolute value of a difference between the intra-prediction mode and a vertical mode.

As an embodiment, the threshold value may be previously defined according to the block size variable.

As an embodiment, if a value of the block size variable is 2, the value of the filter flag may be configured to be 0.

As an embodiment, if a value of the block size variable is 2, the threshold value may be previously defined to be a value that is always larger than or equal to the vertical horizontal distance minimum value.

As an embodiment, the intra-prediction mode used to derive the vertical horizontal distance minimum value may include an intra-prediction mode of a case where a wide angle intra-prediction is used for the current block.

According to an embodiment of the present disclosure, provided is a video signal processing device including a processor, wherein the processor: derives an intra-prediction mode of a current block; configures a reference sample around the current block; generates a prediction sample of the current block by using the reference sample on the basis of the intra-prediction mode; and reconstructs the current block on the basis of the prediction sample, and wherein the processor: on the basis of a width and a height of the current block, configures a value of a filter flag specifying a filter coefficient of an interpolation filter applied to the reference sample; and performs filtering for the reference sample by using an interpolation filter having the filter coefficient specified by the filter flag, so as to generate the prediction sample.

As an embodiment, the filter flag value may be configured on the basis of a block size variable of the current block, and the block size variable may be derived by summing up a value of log base 2 of the width, and a value of log base 2 of the height, and applying a right shift operation by 1 for a sum value.

As an embodiment, if a vertical horizontal distance minimum value is larger than a predefined particular threshold value, the value of the filter flag may be configured to be 1, and otherwise, the value of the filter flag may be configured to be 0. The vertical horizontal distance minimum value may be derived to be a smaller value between an absolute value of a difference between the intra-prediction mode and a horizontal mode, and an absolute value of a difference between the intra-prediction mode and a vertical mode.

As an embodiment, the threshold value may be previously defined according to the block size variable.

As an embodiment, if a value of the block size variable is 2, the value of the filter flag may be configured to be 0.

As an embodiment, if a value of the block size variable is 2, the threshold value may be previously defined to be a value that is always larger than or equal to the vertical horizontal distance minimum value.

As an embodiment, the intra-prediction mode used to derive the vertical horizontal distance minimum value may include an intra-prediction mode of a case where a wide angle intra-prediction is used for the current block.

According to an embodiment of the present disclosure, provided is a video signal processing method including: decoding an intra-prediction mode of a current block; configuring a reference sample around the current block; generating a prediction sample of the current block by using the reference sample on the basis of the intra-prediction mode; deriving a residual block of the current block on the basis of the prediction sample; and decoding the residual block, wherein the generating of the prediction sample includes: on the basis of a width and a height of the current block, configuring a value of a filter flag specifying a filter coefficient of an interpolation filter applied to the reference sample; and performing filtering for the reference sample by using an interpolation filter having the filter coefficient specified by the filter flag.

According to an embodiment of the present disclosure, provided is a video signal processing method including: deriving an intra-prediction mode of a current block; acquiring a mode flag indicating whether an intra sub partition mode is applied to the current block, the intra sub partition mode indicating a mode in which the current block is split into multiple rectangular transform blocks; if the intra sub partition mode is applied to the current block, acquiring a split flag indicating a split type of the current block; splitting the current block into multiple rectangular transform blocks on the basis of the split type of the current block; and performing intra-prediction and reconstruction for each of the transform blocks on the basis of the intra-prediction mode, wherein the mode flag is parsed from a bitstream if a width and a height of the current block are smaller than or equal to a predefined maximum transform size.

As an embodiment, the split flag may be parsed from a bitstream if a value of the mode flag is 1.

As an embodiment, the split type may be determined to be one of horizontal splitting or vertical splitting on the basis of a value obtained by adding 1 to the split flag if the intra sub partition mode is applied to the current block.

As an embodiment, the acquiring of the split flag may further include: inferring 0 as a value of the split flag if there is no split flag, and the height of the current block is larger than the maximum transform size; and inferring 1 as a value of the split flag if there is no split flag, and the width of the current block is larger than the maximum transform size.

According to an embodiment of the present disclosure, provided is a video signal processing device including a processor, wherein the processor: derives an intra-prediction mode of a current block; acquires a mode flag indicating whether an intra sub partition mode is applied to the current block, the intra sub partition mode indicating a mode in which the current block is split into multiple rectangular transform blocks; if the intra sub partition mode is applied to the current block, acquires a split flag indicating a split type of the current block; splits the current block into multiple rectangular transform blocks on the basis of the split type of the current block; and performs intra-prediction and reconstruction for each of the transform blocks on the basis of the intra-prediction mode, wherein the mode flag is parsed from a bitstream if a width and a height of the current block are smaller than or equal to a predefined maximum transform size.

As an embodiment, the split flag may be parsed from a bitstream if a value of the mode flag is 1.

As an embodiment, the split type may be determined to be one of horizontal splitting or vertical splitting on the basis of a value obtained by adding 1 to the split flag if the intra sub partition mode is applied to the current block.

As an embodiment, the processor may: infer 0 as a value of the split flag if there is no split flag, and the height of the current block is larger than the maximum transform size; and infer 1 as a value of the split flag if there is no split flag, and the width of the current block is larger than the maximum transform size.

Advantageous Effects

According to an embodiment of the present disclosure, it is possible to increase coding efficiency of a video signal. Further, according to an embodiment of the present disclosure, a transform kernel suitable for a current transform block may be selected.

BRIEF DESCRIPTION OF THE DRAWINGS

FIG. 10 is a diagram illustrating an example of a threshold variable according to the size of a transform block, as an embodiment to which the present disclosure is applied.

FIG. 11 is a diagram illustrating an example of a threshold variable according to the size of a transform block, as an embodiment to which the present disclosure is applied.

FIG. 12 is a diagram illustrating an example of a threshold variable according to the size of a transform block, as an embodiment to which the present disclosure is applied.

FIG. 13 is a diagram illustrating an example of a threshold variable according to the size of a transform block, as an embodiment to which the present disclosure is applied.

FIG. 15 is a diagram illustrating an example of a threshold variable according to the size of a transform block, as an embodiment to which the present disclosure is applied.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily. In this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder. An apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. The term 'unit' is used as a meaning to refer to a basic unit of image processing or a specific position of a picture. It refers to an image region including both a luma component and a chroma component. In addition, the term 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
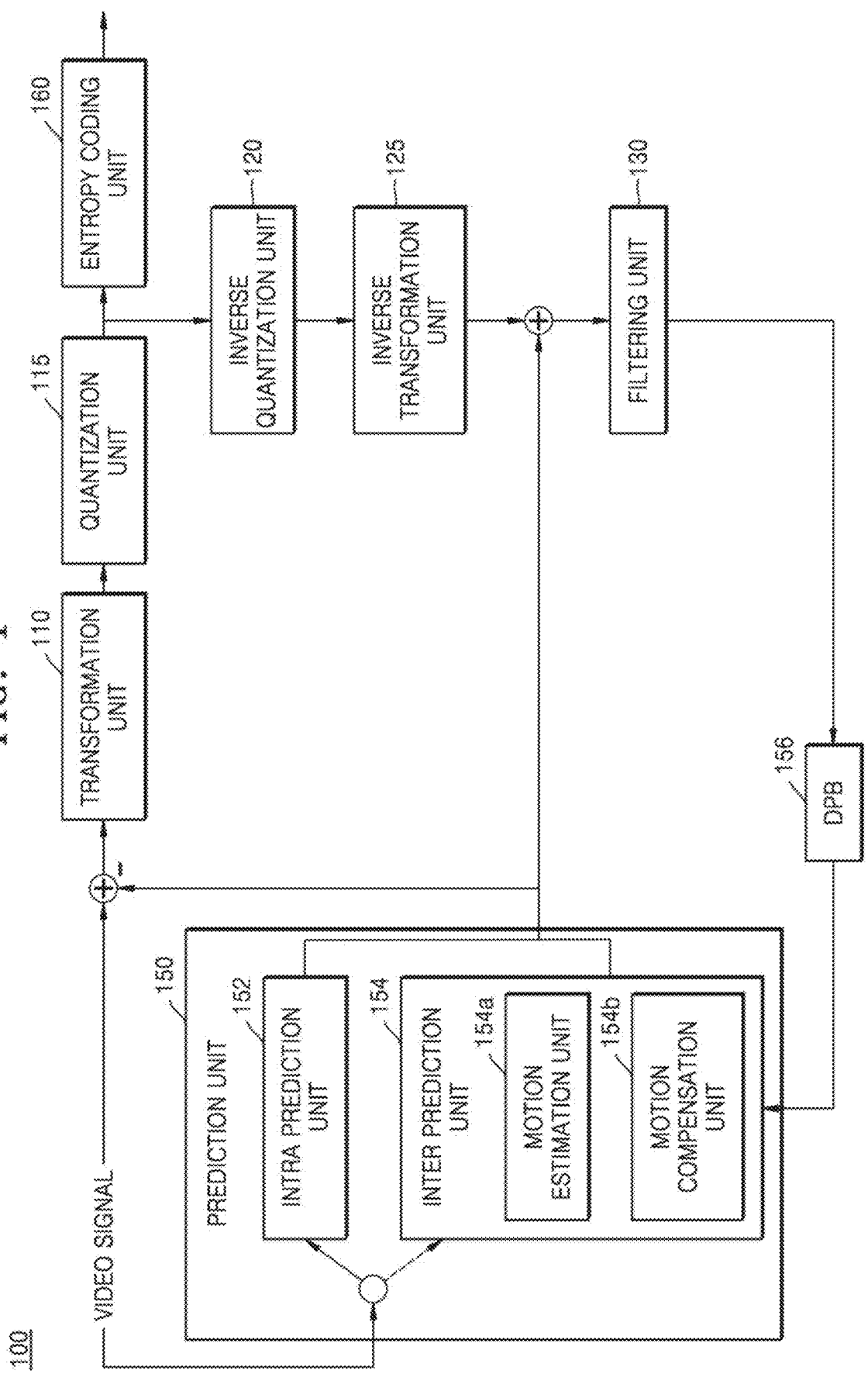
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal which is a difference between the inputted video signal and the predicted signal generated by the prediction unit 150. For example, a Discrete Cosine Transform (DCT), a Discrete Sine Transform (DST), or a Wavelet Transform may be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that may be used in the decoder should be used when performing prediction in the encoder. For this, the encoder performs a process of reconstructing the encoded current block again. The inverse quantization unit 120 inverse-quantizes the value of the transform coefficient and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is coded by using a method of predicting a picture via the prediction unit 150 by using a region that has been already coded, and adding, to the predicted picture, a residual value between an original picture and the predicted picture, thereby obtaining a reconstructed picture, is used. The intra prediction unit 152 performs intra prediction within a current picture and the inter prediction unit 154 predicts the current picture by using a reference picture stored in the decoding picture buffer 156. The intra prediction unit 152 performs intra prediction from reconstructed regions in the current picture and transfers intra coding information to the entropy coding unit 160. The inter prediction unit 154 may include a motion estimation unit 154a and a motion compensation unit 154b. The motion estimation unit 154a obtains a motion vector value of the current region by referring to a specific reconstructed region. The motion estimation unit 154a transfers location information (reference frame, motion vector, etc.) of the reference region to the entropy coding unit 160 so as to enable the location information to be included in a bitstream. The motion compensation unit 154b performs inter motion compensation by using the motion vector value transferred from the motion estimation unit 154a.

The prediction unit 150 includes an intra prediction unit 152 and an inter prediction unit 154. The intra prediction unit 152 performs intra prediction in the current picture and the inter prediction unit 154 performs inter prediction to predict the current picture by using the reference picture stored in the DBP 156. The intra prediction unit 152 performs intra prediction from reconstructed samples in the current picture and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information set (reference picture index, motion vector information, etc.) for the reference region to the entropy coding unit 160. The motion compensation unit 154b performs motion compensation by using the motion vector value transferred from the motion estimation unit 154a. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords and a length of a codeword may be variable. For example, frequently occurring symbols are represented by a short codeword and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
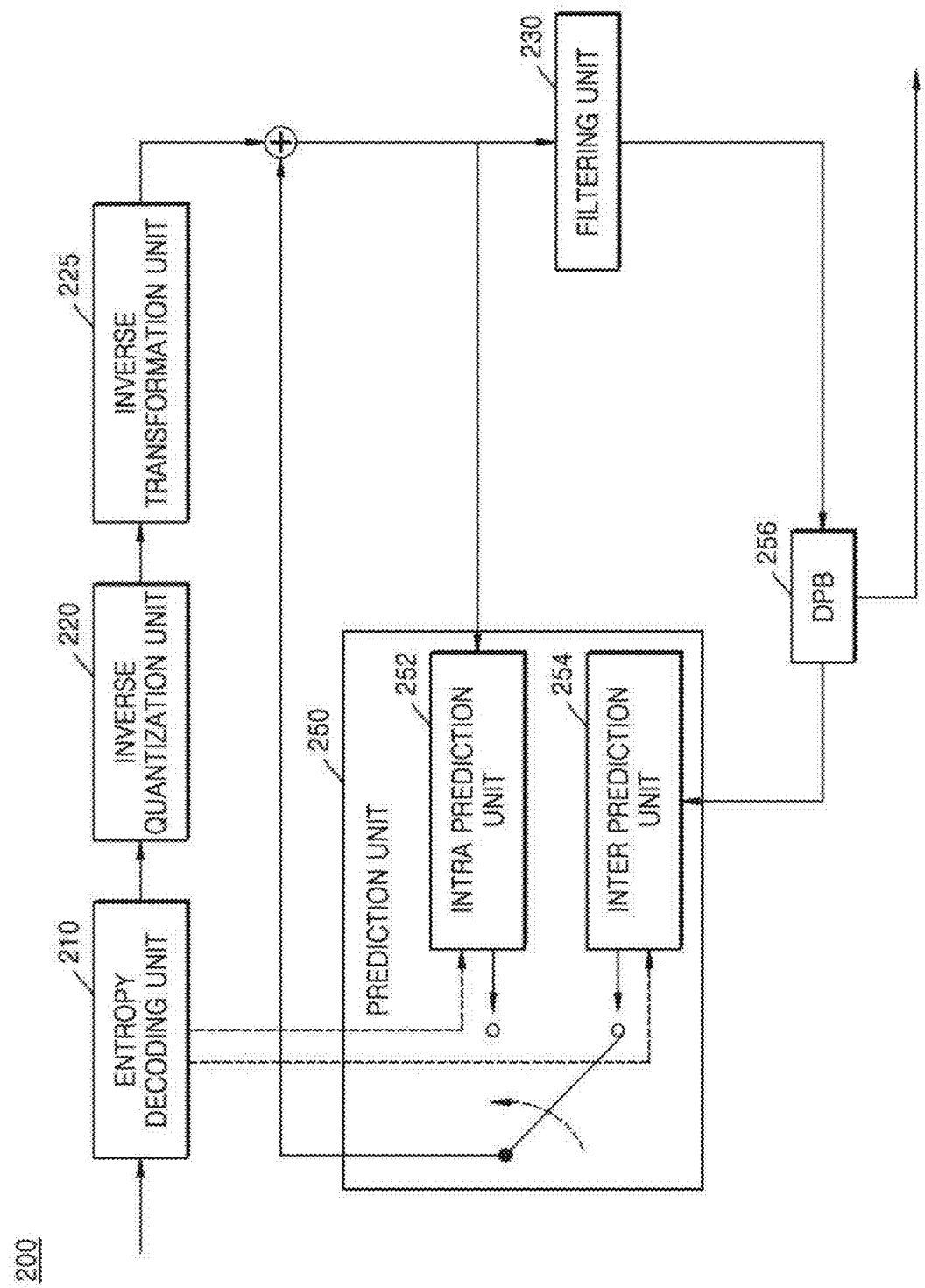
FIG. 2 is a schematic block diagram of a video signal decoding apparatus according to an embodiment of the present invention.

The schematic block diagram shown in FIG. 2 represents a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an 'I' picture (or, tile/slice), and a picture (or, tile/slice) that may perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or 'P' picture (or, tile/slice), and a picture (or tile/slice) using up to two motion vectors and a reference picture index is called a bi-predictive picture or a 'B' picture (or tile/slice). In other words, the 'P' picture (or, tile/slice) uses up to one motion information set to predict each block while the 'B' picture (or, tile/slice) uses up to two motion information sets to predict each block. Here, the motion information set includes one or more motion vectors with one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list and L1 prediction means prediction using one reference picture included in the L1 picture list. For this, one set of motion information (e.g., motion vector and reference picture index) may be required. In the bi-prediction method, up to two reference regions may be used and the two reference regions may exist in the same reference picture or may exist in different pictures. More specifically, the bi-prediction method contains up to two sets of motion information (e.g., a motion vector and a reference picture index) which may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof may be used as a predictor of the current block. For example, for a motion prediction with sub-pel unit pixel accuracy, an 8-tap interpolation filter for a luma signal and a 4-tap interpolation filter for a chroma signal may be used. However, the interpolation filter for motion prediction in sub-pel units is not limited thereto. From this sequence, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displays the blocks which logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
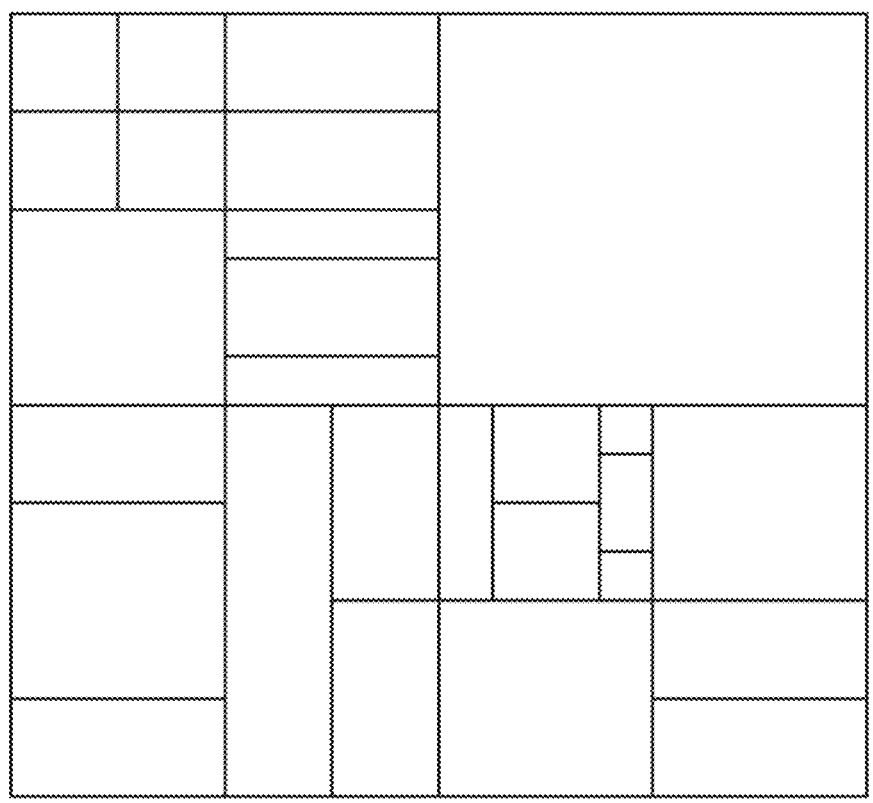
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an NXN block of luma samples and two blocks of chroma samples corresponding thereto. The coding tree unit may be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split may be performed recursively and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal binary split. This multi-type tree split may be performed recursively.

The leaf node of the multi-type tree may be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a high level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
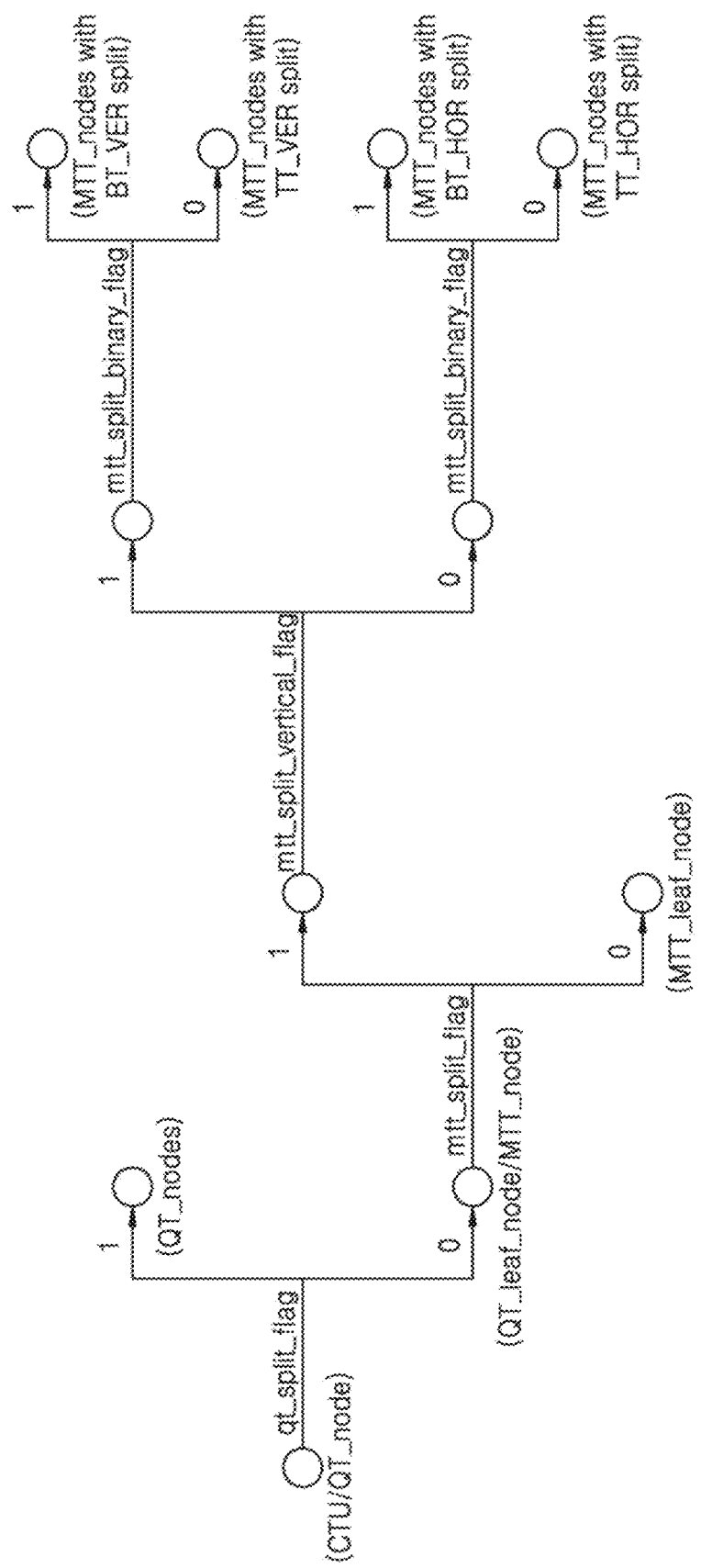
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and may be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
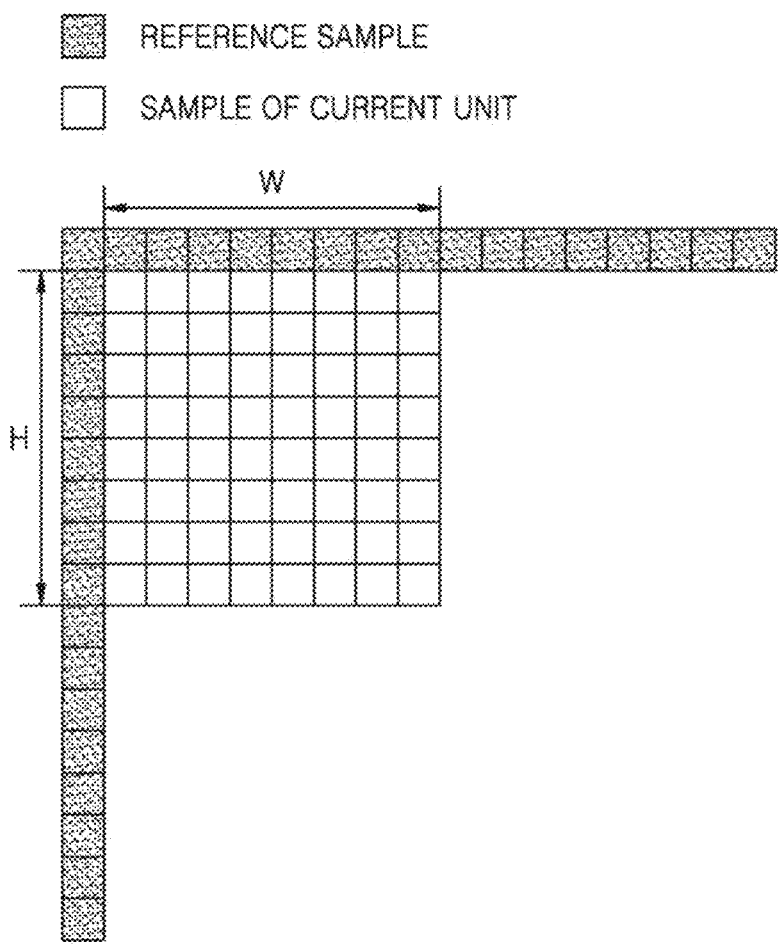
FIGS. 5 and 6 illustrate an intra-prediction method in more detail according to an embodiment of the present disclosure.
Figure 6:
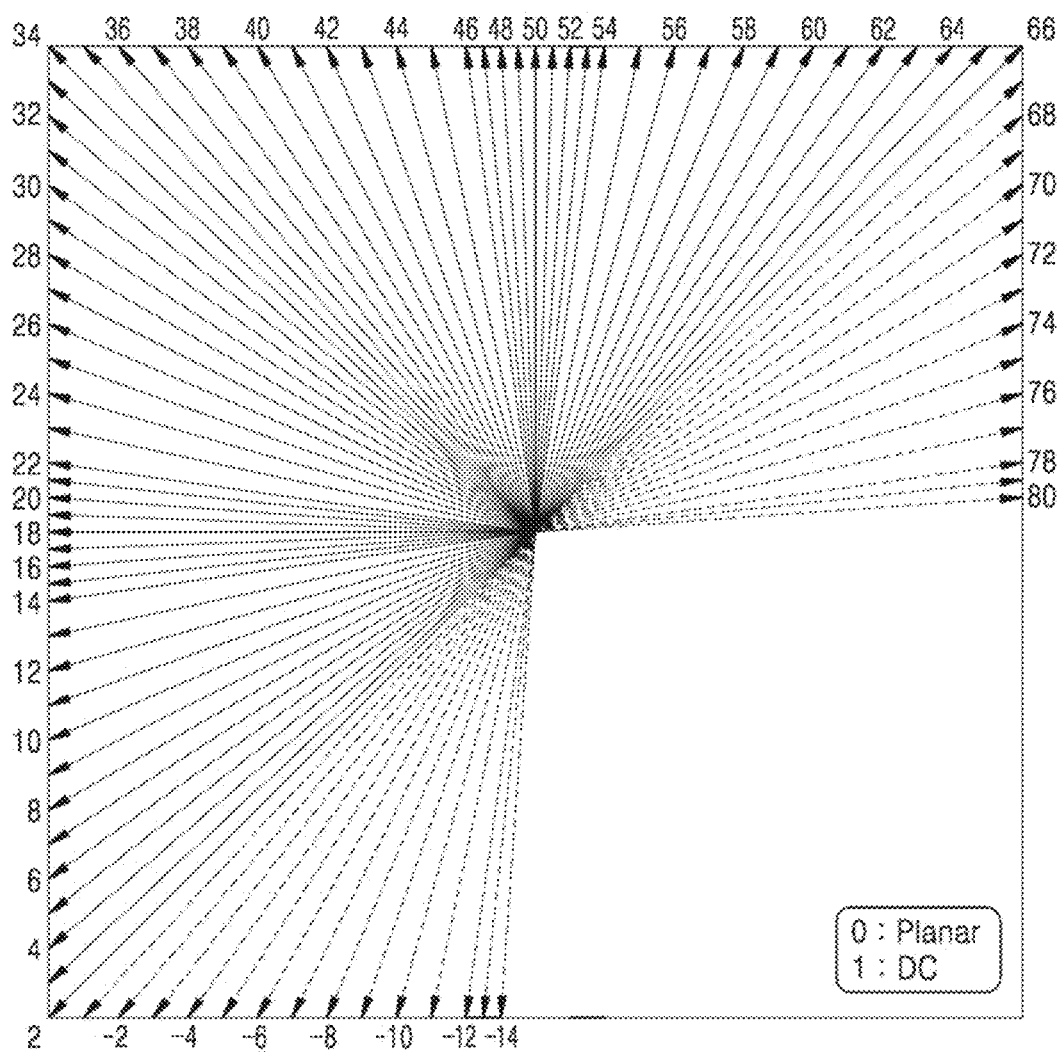

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block.

When at least some samples to be used as reference samples have not yet been reconstructed, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, according to an embodiment of the present disclosure, a pre-configured angle range may be differently configured according to the shape of a current block. For example, if the current block is a rectangular block, a wide angle mode indicating an angle exceeding 45 degrees or smaller than −135 degrees in the clockwise direction may be additionally used. If the current block is a horizontal block, an angle mode may indicate an angle within an angle range (i.e., a second angle range) between (45+a first offset) degrees and (−135+the first offset) degrees in the clockwise direction. Angle modes 67 to 76 (or modes 67 to 80 as illustrated in FIG. 6) beyond the first angle range may be additionally used. In addition, if the current block is a vertical block, an angle mode may indicate an angle within an angle range (i.e., a third angle range) between (45−a second offset) degrees and (−135−the second offset) degrees in the clockwise direction. Angle modes −10 to −1 (or modes −14 to −1 as illustrated in FIG. 6) beyond the first angle range may be additionally used. According to an embodiment of the present disclosure, the values of the first offset and the second offset may be differently determined according to a ratio between the width and the height of a rectangular block. In addition, the first offset and the second offset may be positive numbers.

According to an additional embodiment of the present disclosure, multiple angle modes constituting an intra-prediction mode set may include a basic angle mode and an extended angle mode. The extended angle mode may be determined on the basis of the basic angle mode.

According to an embodiment, the basic angle mode may correspond to a mode corresponding to an angle used for an intra-prediction following a conventional high efficiency video coding (HEVC) standard, and the extended angle mode may correspond to a mode corresponding to an angle newly added for an intra-prediction following a new generation video codec standard. More specifically, the basic angle mode may correspond to an angle mode corresponding to one of intra-prediction modes {2, 4, 6, . . . , and 66}, and the extended angle mode may correspond to an angle mode corresponding to one of intra-prediction modes {3, 5, 7, . . . , and 65}. That is, the extended angle mode may be an angle mode between the basic angle modes within the first angle range. Therefore, an angle indicated by the extended angle mode may be determined on the basis of an angle indicated by the basic angle mode.

According to another embodiment, the basic angle mode may be a mode corresponding to an angle within the pre-configured first angle range, and the extended angle mode may correspond to a wide angle mode beyond the first angle range. That is, the basic angle mode may correspond to an angle mode corresponding to one of intra-prediction modes {2, 3, 4, . . . , and 66}, and the extended angle mode may correspond to an angle mode corresponding to one of intra-prediction modes {−10, −9, . . . , and −1} and {67, 68, . . . , and 76}. An angle indicated by the extended angle mode may be determined to be an angle opposite to an angle indicated by the basic angle mode corresponding to the extended angle mode. Therefore, an angle indicated by the extended angle mode may be determined on the basis of an angle indicated by the basic angle mode. Meanwhile, the number of the extended angle modes is not limited thereto and additional extended angles may be defined according to the size and/or the shape of a current block. For example, the extended angle mode may be defined as an angle mode corresponding to one of intra-prediction modes {−14, −13, . . . , and −1} and {67, 68, . . . , and 80}. Meanwhile, the total number of intra-prediction modes included in an intra-prediction mode set may vary according to a configuration of the basic angle mode and the extended angle mode described above.

In the above embodiments, the gap between the extended angle modes may be configured on the basis of the gap between the basic angle modes corresponding to the extended angle modes. For example, the gap between extended angle modes {3, 5, 7, . . . , and 65} may be determined on the basis of the gap between basic angle modes {2, 4, 6, . . . , and 66} corresponding to the extended angle modes. In addition, the gap between extended angle modes {−10, −9, . . . , −1} may be determined on the basis of the gap between basic angle modes {56, 57, . . . , 65} corresponding to the extended angle modes at the opposite side, and the gap between extended angle modes {67, 68, . . . 76} may be determined on the basis of the gap between basic angle modes {3, 4, . . . , 12} corresponding to the extended angle modes at the opposite side. In the above embodiments, the angle gap between the extended angle modes may be configured to be the same as the angle gap between the basic angle modes corresponding to the extended angle modes. In addition, the number of the extended angle modes in an intra-prediction mode set may be configured to be equal to or smaller than that of the basic angle modes.

According to an embodiment of the present disclosure, the extended angle mode may be signaled on the basis of the basic angle mode. For example, a wide-angle mode (i.e., an extended angle mode) may be substituted for at least one angle mode (i.e., a basic angle mode) within the first angle range. The replaced basic angle mode may be an angle mode corresponding to the wide-angle mode at the opposite side. That is, the replaced basic angle mode is an angle mode corresponding to an angle opposite to an angle indicated by the wide-angle mode or an angle mode corresponding to an angle differing from the opposite angle by a pre-configured offset index. According to an embodiment of the present disclosure, the pre-configured offset index is 1. An intra-prediction mode index corresponding to the replaced basic angle mode may be mapped to the wide-angle mode again so as to signal the wide angle mode. For example, wide angle modes {−10, −9, . . . , and −1} may be signaled by intra-prediction mode indexes {57, 58, . . . , and 66}, respectively, and wide angle modes {67, 68, . . . , and 76} may be signaled by intra-prediction mode indexes {2, 3, . . . , and 11}, respectively. As described above, an intra-prediction mode index for the basic angle mode is allowed to signal the extended angle mode, and thus even if angle mode configurations used for intra-predictions of individual blocks are different from each other, the same set of intra-prediction mode indexes may be used for signaling of an intra-prediction mode. Therefore, signaling overhead due to the change in an intra-prediction mode configuration may be minimized.

Meanwhile, whether to use the extended angle mode may be determined on the basis of at least one of the shape and the size of a current block. According to an embodiment, if the size of a current block is greater than a pre-configured size, the extended angle mode is used for intra-prediction of the current block, and otherwise, only the basic angle mode may be used for intra-prediction of the current block. According to another embodiment, if a current block is a block which is not square, the extended angle mode is used for intra-prediction of the current block, and if the current block is a square block, only the basic angle mode may be used for intra-prediction of the current block.

An intra-prediction unit determines reference pixels and/or interpolated reference pixels which are to be used for intra-prediction of a current block, on the basis of intra-prediction mode information of the current block. If an intra-prediction mode index indicates a particular angle mode, a reference pixel or an interpolated reference pixel positioned to correspond to the particular angle from a current pixel of a current block is used to predict the current pixel. Therefore, different sets of reference pixels and/or interpolated reference pixels may be used for intra-prediction according to an intra-prediction mode. After an intra-prediction is performed on a current block by using reference pixels and intra-prediction mode information, the decoder may reconstruct pixel values of the current block by adding a residual signal of the current block obtained from an inverse transform unit, to an intra-prediction value of the current block.

According to an additional embodiment of the present disclosure, as described with reference to FIG. 6, an angle mode beyond the first angle range may be additionally used. In an embodiment, angle modes beyond the first angle range may be angle modes −14 to −1, or angle modes 67 to 80 as illustrated in FIG. 6. In addition, as described above, the number of the extended angle modes may vary according to the shape and/or the size of a current block, and the extended angle modes may extend up to angle mode 80 or angle mode −14 illustrated in FIG. 6. For example, the number of extended angles or the indexes of extended modes may be determined on the basis of a value based on a ratio between the width and the height of a current block. For example, the value based on the ratio between the width and the height of the current block may be Abs(Log2(width/height)), in which Abs( ) may indicate an absolute value operator. In addition, the current block may be a coding block, a prediction block, or a transform block. Alternatively, the current block may indicate a coding unit (CU), a transform unit (TU), or a prediction unit (PU).

Hereinafter, an inter-prediction method according to an embodiment of the present disclosure will be described with reference to FIG. 7. In the present disclosure, the inter-prediction method may include a normal inter-prediction method which is optimized for a translation motion, and an affine model-based inter-prediction method. In addition, a motion vector may include at least one of a normal motion vector for motion compensation according to the normal inter-prediction method and a control point motion vector for affine motion compensation.

Figure 7:
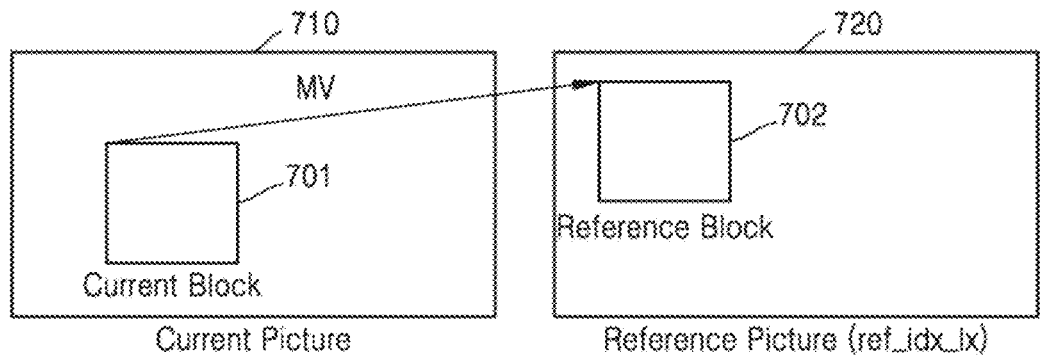
FIG. 7 is a diagram illustrating an inter-prediction method according to an embodiment of the present disclosure.

FIG. 7 is a diagram illustrating an inter-prediction method according to an embodiment of the present disclosure. As described above, a decoder may predict a current block by making reference to reconstructed samples of a different decoded picture. Referring to FIG. 7, the decoder may obtain a reference block 702 in a reference picture 720 based on a motion information set of a current block 701. In this instance, the motion information set may include a reference picture index and a motion vector 703. The reference picture index may indicate the reference picture 720 including a reference block for inter-prediction of the current block in a reference picture list. According to an embodiment, the reference picture list may include at least one of the above-mentioned L0 picture list or L1 picture list. The motion vector 703 may indicate an offset between the coordinate values of the current block 701 in a current picture 710 and coordinate values of the reference block 702 in the reference picture 720. The decoder may obtain a predictor of the current block 701 based on the sample values of the reference block 702 and may reconstruct the current block 701 using the predictor.

Particularly, an encoder may obtain the above-mentioned reference block by searching for a block similar to the current block from pictures which have earlier turns in the order of reconstruction. For example, the encoder may search for a reference block having the minimum sum which is obtained by adding differences between the current block and sample values in a predetermined search area. In this instance, in order to measure similarity between the current block and the samples of a reference block, at least one of a sum of absolute difference (SAD) or a sum of Hadamard transformed difference (SATD) may be used. Here, SAD may be a value obtained by adding the absolute values of the differences between samples included in two blocks. In addition, SATD may be a value obtained by adding the absolute values of Hadamard transform coefficients that are obtained by performing Hadamard transform on the differences between samples included in two blocks.

The current block may be predicted using one or more reference areas. As described above, the current block may be inter-predicted according to bi-prediction scheme that uses two or more reference areas. According to an embodiment, the decoder may obtain two reference blocks based on two motion information sets of the current block. In addition, the decoder may obtain a first predictor and a second predictor of the current block based on the sample values of each of the two obtained reference blocks. In addition, the decoder may reconstruct the current block using the first predictor and the second predictor. For example, the decoder may reconstruct the current block based on the average of the samples of each of the first predictor and the second predictor.

As described above, for the motion compensation of the current block, one or more motion information sets may be signaled. In this instance, similarity between motion information sets for motion compensation with respect to each of a plurality of blocks may be used. For example, a motion information set used for predicting the current block may be derived from a motion information set which was used for predicting any one of the other samples previously reconstructed. From this sequence described above, the encoder and the decoder may reduce signaling overhead.

For example, there may be a plurality of candidate blocks having the probability of being predicted based on a motion information set which is identical or similar to the motion information set of the current block. The decoder may generate a merge candidate list based on the plurality of candidate blocks. Here, the merge candidate list may include candidates corresponding to samples which have the probability of being predicted based on a motion information set related to the motion information set of the current block, among the samples reconstructed in advance of the current block. The encoder and the decoder may configure the merge candidate list of the current block according to a previously defined rule. In this instance, the merge candidate list configured by the encoder and the merge candidate list configured by the decoder may be identical to each other. For example, the encoder and the decoder may configure merge candidate lists of the current block based on the location of the current block in the current picture. A method of configuring the merge candidate lists of the current block by the encoder and the decoder will be described with reference to FIG. 9. In the present disclosure, the location of a predetermined block may be a relative location of a top-left sample of a predetermined block in a picture including the predetermined block.

Meanwhile, in order to improve coding efficiency, a method of quantizing a transform coefficient value obtained by transforming a residual signal and coding the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

Figure 8:
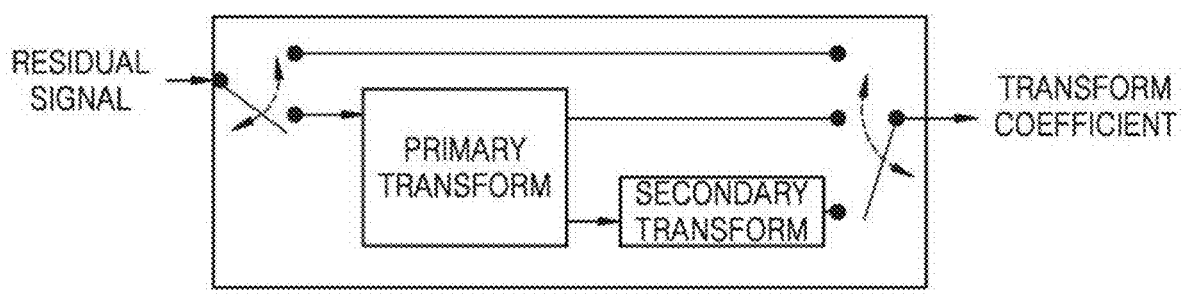
FIG. 8 is a diagram specifically illustrating a method for transforming a residual signal by an encoder.

FIG. 8 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transforming of the residual signal, such as transform matrix, transform array, transform function, and transform. According to an embodiment, the transform kernel may be any one of a plurality of available kernels. A transform kernel based on different transform types may be used for each of the vertical transform and the horizontal transform.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 8, the transform method described above may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether to perform secondary transform may be determined depending on the size of the current block or the size of the residual block. Transform kernels having different sizes may be used depending on the size of the current block or the size of the residual block. For example, 8×8 secondary transform may be applied to a block in which a length of a shorter side between a width or a height is shorter than a first preconfigured length. Further, 4×4 secondary transform may be applied to a block in which the length of the shorter side between the width or the height is longer than a second preconfigured length. Here, the first preconfigured length may be a value larger than the second preconfigured length but the present disclosure is not limited thereto. Unlike primary transform, secondary transform may not be performed separately into vertical transform and horizontal transform. This secondary transform may be referred to as a low frequency band non-separable transform (low frequency non-separable transform, LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may increase undesirably. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 8 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

Figure 9:
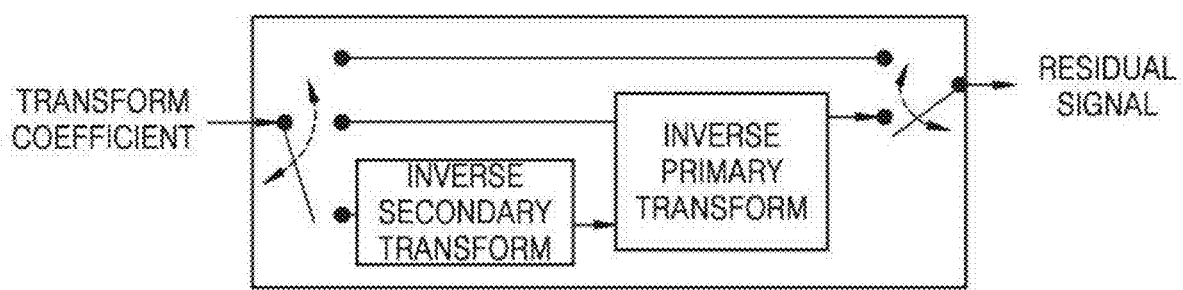
FIG. 9 is a diagram specifically illustrating a method for obtaining a residual signal by inverse transforming a transform coefficient by an encoder and a decoder.

FIG. 9 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both a primary inverse transform and a secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform a secondary inverse transform for a secondary transform. For example, when the transform block is a transform block of an intra-predicted block, the secondary inverse transform may be performed on the transform block. A secondary transform kernel used for the transform block may be determined based on an intra prediction mode corresponding to the transform block. As another example, whether to perform the secondary inverse transform may be determined based on the size of the transform block. The secondary inverse transform may be performed after the inverse quantization and before a primary inverse transform.

The inverse transform unit may perform a primary inverse transform on the inverse quantized transform coefficient, or a secondary inverse transformed transform coefficient. In the case of the primary inverse transform, vertical transform and horizontal transform may be performed separately as in the case of a primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

According to an embodiment of the present disclosure, a prediction angle of an intra-prediction mode may be defined according to a prediction mode index of the intra-prediction mode. In an embodiment, a mapping table between a prediction mode index and an angle may be defined as shown in Table 1 below. In the present detailed description, an intra-prediction mode index may be called a mode index, a prediction mode number, a mode number, etc.

TABLE 1

| | predModeIntra | | | | | | | | | | | | | | | | |
|---|---|---|---|---|---|---|---|---|---|---|---|---|---|---|---|---|---|
| | −10 | −9 | −8 | −7 | −6 | −5 | −4 | −3 | −2 | −1 | 2 | 3 | 4 | 5 | 6 | 7 | 8 |
| intraPredAngle | 114 | 93 | 79 | 68 | 60 | 54 | 49 | 45 | 39 | 35 | 32 | 29 | 26 | 23 | 21 | 19 | 17 |
| | predModeIntra | | | | | | | | | | | | | | | | |
| | 9 | 10 | 11 | 12 | 13 | 14 | 15 | 16 | 17 | 18 | 19 | 20 | 21 | 22 | 23 | 24 | 25 |
| intraPredAngle | 15 | 13 | 11 | 9 | 7 | 5 | 3 | 2 | 1 | 0 | −1 | −2 | −3 | −5 | −7 | −9 | −11 |
| | predModeIntra | | | | | | | | | | | | | | | | |
| | 26 | 27 | 28 | 29 | 30 | 31 | 32 | 33 | 34 | 35 | 36 | 37 | 38 | 39 | 40 | 41 | 42 |
| intraPredAngle | −13 | −15 | −17 | −19 | −21 | −23 | −26 | −29 | −32 | −29 | −26 | −23 | −21 | −19 | −17 | −15 | −13 |
| | predModeIntra | | | | | | | | | | | | | | | | |
| | 43 | 44 | 45 | 46 | 47 | 48 | 49 | 50 | 51 | 52 | 53 | 54 | 55 | 56 | 57 | 58 | 59 |
| intraPredAngle | −11 | −9 | −7 | −5 | −3 | −2 | −1 | 0 | 1 | 2 | 3 | 5 | 7 | 9 | 11 | 13 | 15 |

TABLE 1-continued

| | predModeIntra | | | | | | | | | | | | | | | | |
|---|---|---|---|---|---|---|---|---|---|---|---|---|---|---|---|---|---|
| | 60 | 61 | 62 | 63 | 64 | 65 | 66 | 67 | 68 | 69 | 70 | 71 | 72 | 73 | 74 | 75 | 76 |
| intraPredAngle | 17 | 19 | 21 | 23 | 26 | 29 | 32 | 35 | 39 | 45 | 49 | 54 | 60 | 68 | 79 | 93 | 114 |

In Table 1, predModeIntra is a parameter (or a variable) indicating an intra-prediction mode (or a prediction mode index, or a prediction mode number). In the present detailed description, predModeIntra may be called an intra-prediction mode. In addition, intraPredAngle is a parameter (or a variable) indicating an angle (or a prediction angle) of the intra-prediction mode. In the present detailed description, intraPredAngle may be called a prediction angle. In an embodiment, the prediction angle may be determined according to the intra-prediction mode. In addition, the encoder/decoder may determine a refernece sample in what position or at what angle is to be used for prediction, with reference to the current sample, on the basis of the prediction angle.

According to an embodiment of the present disclosure, Table 1 may show mapping between an angle parameter and a prediction mode index associated with a prediction angle of a prediction mode, as described above with reference to FIG. 6. According to an embodiment, the intra-prediction mode shown in Table 1 may show an index of a prediction mode to be used for actual prediction, which is transformed from a signaled index. For example, if a current block is a non-square block with respect to a signaled mode index, a transformation may be applied through the following procedure. In other words, in an embodiment, with respect to a non-square block having a width and a height which are different from each other, the intra-prediction mode may be corrected through a process as follows.

A. If all the following conditions are satisfied, an intra-prediction mode (predModeIntra) may be configured to be (predModeIntra (i.e., a signaled mode index)+65).
  a. If nTbW is larger than nTbH
  b. If the intra-prediction mode is equal to or larger than 2
  c. If the intra-prediction mode is smaller than (whRatio>1)? 12:8
B. Otherwise, if all the following conditions are satisfied, the intra-prediction mode may be configured to be (predModeIntra—67).
  a. If nTbH is larger than nTbW
  b. If the intra-prediction mode is equal to or smaller than 66
  c. The intra-prediction mode is larger than (whRatio>1)? 56:60

In the above process, nTbW indicates the width of a current processing block (a coding block or a transform block), and nTbH indicates the height of a current processing block. whRatio is a variable indicating a ratio between the width and the height. For example, whRatio may be configured by Min(Abs(Log2(nTbW/nTbH), 2). A?B:C indicates a calculation for deriving a value of B if A is true, and deriving a value of C if A is false.

According to an embodiment of the present disclosure, a prediction angle of an intra-prediction mode may be defined according to a prediction mode index of the intra-prediction mode. In an embodiment, a mapping table between a prediction mode index and an angle may be defined as shown in Table 2 below.

TABLE 2

| | predModeIntra | | | | | | | | | | | | | | | | |
|---|---|---|---|---|---|---|---|---|---|---|---|---|---|---|---|---|---|
| | −14 | −13 | −12 | −11 | −10 | −9 | −8 | −7 | −6 | −5 | −4 | −3 | −2 | −1 | 2 | 3 | 4 |
| intraPredAngle | 512 | 341 | 256 | 171 | 128 | 102 | 86 | 73 | 64 | 57 | 51 | 45 | 39 | 35 | 32 | 29 | 26 |

| | predModeIntra | | | | | | | | | | | | | | | | |
|---|---|---|---|---|---|---|---|---|---|---|---|---|---|---|---|---|---|
| | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |

| | predModeIntra | | | | | | | | | | | | | | | | |
|---|---|---|---|---|---|---|---|---|---|---|---|---|---|---|---|---|---|
| | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |

| | predModeIntra | | | | | | | | | | | | | | | | |
|---|---|---|---|---|---|---|---|---|---|---|---|---|---|---|---|---|---|
| | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |

| | predModeIntra | | | | | | | | | | | | | | | | |
|---|---|---|---|---|---|---|---|---|---|---|---|---|---|---|---|---|---|
| | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |

TABLE 2-continued

| | predModeIntra | | | | | | |
|---|---|---|---|---|---|---|---|
| | 73 | 74 | 75 | 76 | 77 | 78 | 79 | 80 |
| intraPredAngle | 73 | 86 | 102 | 128 | 171 | 256 | 341 | 512 |

In Table 2, predModeIntra is a parameter (or a variable) indicating an intra-prediction mode (or a prediction mode index, or a prediction mode number). In the present detailed description, predModeIntra may be called an intra-prediction mode. In addition, intraPredAngle is a parameter (or a variable) indicating an angle (or a prediction angle) of the intra-prediction mode. In the present detailed description, intraPredAngle may be called a prediction angle. In an embodiment, the prediction angle may be determined according to the intra-prediction mode. In addition, the encoder/decoder may determine, on the basis of the prediction angle, which position or angle at which a reference sample exists with respect to a current sample, the reference sample being to be used for a prediction.

According to an embodiment of the present disclosure, Table 2 may show mapping between an angle parameter and a prediction mode index associated with a prediction angle of a prediction mode, as described with reference to FIG. 6. According to an embodiment, the intra-prediction mode shown in Table 2 may show an index of a prediction mode to be used for actual prediction, which is transformed from a signaled index. For example, if a current block is a non-square block with respect to a signaled mode index, a transformation may be applied through the following procedure. In other words, in an embodiment, with respect to a non-square block having a width and a height which are different from each other, an intra-prediction mode may be corrected through the following process.

A. If all the following conditions are satisfied, wideAngle may be configured to be 1, and an intra-prediction mode (predModeIntra) may be configured to be (predModeIntra (i.e., a signaled mode index)+65).
   a. If nTbW is larger than nTbH
   b. If the intra-prediction mode is equal to or larger than 2
   c. The intra-prediction mode is smaller than (whRatio>1)? (8+2*whRatio):8

B. Otherwise, if all the following conditions are satisfied, wideAngle may be configured to be 1, and the intra-prediction mode may be configured to be (predModeIntra—67).
   a. If nTbH is larger than nTbW
   b. If the intra-prediction mode is equal to or smaller than 66
   c. The intra-prediction mode is larger than (whRatio>1)? (60-2*whRatio):60

In the above process, nTbW indicates the width of a current processing block (a coding block or a transform block), and nTbH indicates the height of a current processing block. whRatio is a variable (or a parameter) indicating a ratio between the width and the height. For example, whRatio may be configured by Min(Abs(Log2(nTbW/nTbH), 2). A?B:C indicates a calculation for deriving a value of B if A is true, and deriving a value of C if A is false. The term wideAngle is a variable (or a parameter) indicating whether a wide angle is applied to a current block.

According to an embodiment of the present disclosure, the intra-prediction angle described with reference to Table 1 and Table 2 may be used (or applied) according to the following method. For example, invAngle, which is an inverse angle parameter, may be derived on the basis of the prediction angle. More specifically, invAngle may be derived by Round(256*32/intraPredAngle). In addition, the encoder/decoder may generate a reference sample array on the basis of invAngle. In addition, the encoder/decoder may perform position-dependent intra-prediction sample filtering on the basis of invAngle. In addition, the values of variables iIdx and iFact for specifying the position of a reference sample (or a prediction sample) may be derived on the basis of an intra-prediction angle. In addition, a prediction sample may be derived on the basis of iIdx and iFact. In addition, a prediction sample may be derived on the basis of ref, iIdx, and iFact.

In an embodiment, the encoder/decoder may generate a prediction sample on the basis of an intra-prediction angle by applying the method described below. If the intra-prediction mode is equal to or larger than 34, the index variable iIdx and the multiplication factor iFact may be derived on the basis of Equation 1 below.

$$iIdx = ((y + 1 + refIdx) * intraPred\ Angle) >> 5 + refIdx \quad \text{[Equation 1]}$$

$$iFact = ((y + 1 + refIdx) * intraPred\ Angle)\ \&\ 31$$

In Equation 1, refIdx may be an index indicating which reference sample line is to be used for intra-prediction. In addition, a prediction sample may be derived by Equation 2 below.

$$pred\ Samples[x][y] = \text{Clip}\ 1Y \quad \text{[Equation 2]}$$
$$(((\text{summation}\{i\ \text{is from 0 to 3}\}(fT[i] * ref[x + iIdx + i])) +$$
$$32) >> 6)$$

In an embodiment, prediction sample deriving by Equation 2 may be performed in a case where cIdx is 0 (i.e., in a case where a current component is the luma component). In Equation 2, fT may be an interpolation filter coefficient. In addition, summation {i is from x to y} (eq(i)) indicates a calculation of summing up the values of eq(i) while changing i from x to y. In addition, Clip1Y calculation may have the same meaning as Equation 3 below.

$$\text{Clip}\ 1Y(x) = \text{Clip}\ 3(0, (1 << \text{Bit Depth}\ Y) - 1, x) \quad \text{[Equation 3]}$$
$$\text{Clip}\ 1C(x) = \text{Clip}\ 3(0, (1 << \text{Bit Depth}\ C) - 1, x)$$

Clip3(x, y, z) may be x if z<x, may be y if z>y, and otherwise, may be z.

In addition, a prediction sample may be derived according to the following process.
   If iFact is not 0, predSamples[x] [y] indicating a prediction sample value may be derived according to Equation 4 below.

$$pred\ Samples\ [x][y] = ((32 - i\ \text{Fact}) * ref\,[x + iIdx + 1] +$$
$$i\ \text{Fact} * ref\,[x + iIdx + 2] + 16) >> 5 \quad \text{[Equation 4]}$$

Otherwise, predSamples[x] [y] indicating a prediction sample value may be derived according to Equation 5 below.

$$pred\ Samples\ [x][y] = ref\,[x + iIdx + 1] \quad \text{[Equation 5]}$$

In an embodiment, deriving by Equation 4 and Equation 5 may be performed in a case where cIdx is not 0 (i.e., in a case where a current component is the chroma component). If the intra-prediction mode is smaller than 34, the index variable iIdx and the multiplication factor iFact may be derived on the basis of Equation 6 below.

$$iIdx = ((x + 1 + refIdx) * intraPred\ \text{Angle}) >> 5 \quad \text{[Equation 6]}$$
$$i\ \text{Fact} = ((x + 1 + refIdx) * intraPred\ \text{Angle})\ \&\ 31$$

In Equation 6, refIdx may be an index indicating which reference sample line is to be used for intra-prediction. In addition, a prediction sample may be derived as Equation 7 below.

$$pred\ Samples\ [x][y] = \text{Clip 1} \quad \text{[Equation 7]}$$
$$Y(((\text{summation }\{i \text{ is from 0 to 3}\}(fT[\,i\,] * ref\,[y + iIdx + i])) +$$
$$32) >> 6)$$

In an embodiment, prediction sample deriving by Equation 7 may be performed in a case where cIdx is 0 (i.e., in a case where a current component is the luma component). In Equation 2, fT may be an interpolation filter coefficient. In addition, summation {i is from x to y} (eq(i)) indicates a calculation of summing up the values of eq(i) while changing i from x to y.

In addition, a prediction sample may be derived according to the following process.

If iFact is not 0, predSamples[x] [y] indicating a prediction sample value may be derived according to Equation 8 below.

$$pred\ Samples\ [x][y] = ((32 - i\ \text{Fact}) * ref\,[y + iIdx + 1] + \quad \text{[Equation 8]}$$
$$i\ \text{Fact} * ref\,[y + iIdx + 2] + 16) >> 5$$

Otherwise, predSamples[x] [y] indicating a prediction sample value may be derived according to Equation 9 below.

$$pred\ Samples\ [x][y] = ref\,[y + iIdx + 1] \quad \text{[Equation 9]}$$

In an embodiment, deriving by Equation 8 and Equation 9 may be performed in a case where cdx is not 0 (i.e., in a case where a current component is the chroma component).

In comparison between Table 1 and Table 2 described above, intra-prediction modes −14 to −11 and 77 to 80 are added to Table 2 compared to Table 1. In addition, an intra-prediction angle value may be differently determined in Table 1 and Table 2 with respect to the same intra-prediction mode. For example, referring to Table 1 and Table 2, an intra-prediction value is differently defined (or configured) for intra-prediction modes −10 to −4, 6 to 14, 22 to 30, 38 to 46, 54 to 62, and 70 to 76.

Table 3 below shows an example of a prediction sample deriving process showing the embodiment described above in more detail.

TABLE 3

The values of the prediction samples predSamples[ x ][ y ], with x = 0..nTbW − 1, y = 0..nTbH − 1 are derived as follows:
- If predModeIntra is greater than or equal to 34, the following ordered steps apply:
  1. The reference sample array ref[ x ] is specified as follows:
    - The following applies:
      ref[ x ] = p[ −1 − refIdx + x ][ −1 − refIdx ], with x = 0..nTbW + refIdx    (8-90)
    - If intraPredAngle is less than 0, the main reference sample array is extended as follows:
      - When ( nTbH * intraPredAngle ) >> 5 is less than −1,
        ref[ x ] = p[ −1 − refIdx ][ −1 − refIdx + ( ( x * invAngle + 128 ) >> 8 ) ],
        with x = −1..( nTbH * intraPredAngle ) >> 5    (8-91)
        ref[ ( ( nTbH * intraPredAngle ) >> 5 ) − 1 ] = ref[ ( nTbH * intraPredAngle ) >> 5 ]    (8-92)
        ref[ nTbW + 1 + refIdx ] = ref[ nTbW + refIdx ]    (8-93)
    - Otherwise,
      ref[ x ] = p[ −1 − refIdx + x ][ −1 − refIdx ], with x = nTbW + 1 + refIdx..refW + refIdx    (8-94)
      ref[ −1 ] = ref[ 0 ]    (8-95)
    - The additional samples ref[ refW + refIdx + x ] with x = 1..Max( 1, nTbW / nTbH ) * refIdx + 1 ) are derived as follows:
      ref[ refW + refIdx + x ] = p[ −1 + refW ][ −1 − refIdx ]    (8-96)
  2. The values of the prediction samples predSamples[ x ][ y ], with x = 0..nTbW − 1, y = 0..nTbH − 1 are derived as follows:
    - The index variable iIdx and the multiplication factor iFact are derived as follows:
      iIdx = ( ( y + 1 + refIdx ) * intraPredAngle ) >> 5 + refIdx    (8-97)
      iFact = ( ( y + 1 + refIdx ) * intraPredAngle ) & 31    (8-98)
    - If cIdx is equal to 0, the following applies:
      - The interpolation filter coefficients fT[ j ] with j = 0..3 are derived as follows:
        fT[ j ] = filterFlag ? fG[ iFact ][ j ] : fC[ iFact ][ j ]    (8-99)
      - The value of the prediction samples predSamples[ x ][ y ] is derived as follows:
        predSamples[ x ][ y ] = Clip1Y( ( ( $\Sigma_{i=0}^{3}$ fT[ i ] * ref[ x + iIdx + 1 ] ) + 32 ) >> 6 )    (8-100)

TABLE 3-continued

- Otherwise (cIdx is not equal to 0), depending on the value of iFact, the following applies:
  - If iFact is not equal to 0, the value of the prediction samples predSamples[ x ][ y ] is derived as follows:
    predSamples[ x ][ y ] =
      ( ( 32 − iFact ) * ref[ x + iIdx + 1 ] + iFact * ref[ x + iIdx + 2 ] + 16 ) >> 5         (8-101)
  - Otherwise, the value of the prediction samples predSamples[ x ][ y ] is derived as follows:
    predSamples[ x ][ y ] = ref[ x + iIdx + 1 ]         (8-102)
- Otherwise (predModeIntra is less than 34), the following ordered steps apply:
  1. The reference sample array ref[ x ] is specified as follows:
     - The following applies:
       ref[ x ] = p[ −1 − refIdx ][ −1 − refIdx + x ], with x = 0..nTbH + refIdx         (8-103)
     - If intraPredAngle is less than 0, the main reference sample array is extended as follows:
       - When ( nTbW * intraPredAngle ) >> 5 is less than −1,
         ref[ x ] = p[ −1 − refIdx + ( ( x * invAngle + 128) >> 8 ) ][ −1 − refIdx ],
           with x = −1..( nTbW * IntraPredAngle ) >> 5         (8-104)
         ref[ ( ( nTbW * intraPredAngle ) >> 5 ) − 1 ] = ref[ ( nTbW * intraPredAngle ) >> 5 ]         (8-105)
         ref[ nTbG + 1 + refIdx ] = ref[ nTbH + refIdx ]         (8-106)
     - Otherwise,
       ref[ x ] = p[ −1 − refIdx ][ −1 − refIdx + x ], with x = nTbH + 1 + refIdx..refH + refIdx         (8-107)
       ref[ −1 ] = ref[ 0 ]         (8-108)
     - The additional samples ref[ refH + refIdx + x ] with x = 1..( Max( 1, nTbW / nTbH ) * refIdx + 1) are
       derived as follows:
       ref[ refH + refIdx + x ] = p[ −1 + refH ][ −1 − refIdx]         (8-109)
  2. The values of the prediction samples predSamples[ x ][ y ], with x = 0..nTbW − 1, y = 0..nTbH − 1 are derived as
     follows:         (8-110)
     - The index variable iIdx and the multiplication factor iFact are derived as follows:
       iIdx = ( ( x+ 1 + refIdx ) * intraPredAngle) >> 5
       iFact = ( ( x + 1 + refIdx ) * intraPredAngle ) & 31         (8-111)
     - If cIdx is equal to 0, the following applies:         (8-112)
       -The interpolation filter coefficients fT[ j ] with j = 0..3 are derived as follows:
       fT[ j ] = filterFlag ? fG[ iFact ][ j ] : fC[ iFact ][ j ]
     - The value of the prediction samples predSamples[ x ][ y ] is derived as follows:         (8-113)
       predSamples[ x ][ y ] = Clip1Y( ( ( $\Sigma_{i=0}^{3}$fT[ i ] * ref[ y + iIdx + i ] ) + 32 ) >> 6 )
     - Otherwise (cIdx is not equal to 0), depending on the value of iFact, the following applies:
       - If iFact is not equal to 0, the value of the prediction samples predSamples[ x ][ y ] is derived as follows:
         predSamples[ x ][ y ] =
           ( ( 32 − iFact ) * ref[ y + iIdx + 1 ] + iFact * ref[ y + iIdx + 2 ] + 16 ) >> 5         (8-114)
       - Otherwise, the value of the prediction samples predSamples[ x ][ y ] is derived as follows:
         predSamples[ x ][ y ] = ref[ y + iIdx + 1 ]         (8-115)

In Table 3. p[x] [y] may indicate a peripheral reference sample. In addition, the top-left coordinates of a current block may be defined as (0,0). Referring to Table 3, the encoder/decoder may derive a prediction sample of a current block according to the process shown in Table 3. The encoder/decoder may apply different deriving methods according to the intra-prediction mode of a current block. Specifically, the encoder/decoder may derive a reference sample array (this may be referred to as a main reference sample) on the basis of a prediction mode of a current block and may derive a prediction sample of the current block on the basis of a derived reference sample. The method described above with reference to Equation 1 to Equation 9 may be applied.

Hereinafter, a filter flag (filterFlag) configuring method according to an embodiment of the present disclosure will be described. A filter flag (or a filtering flag) according to various embodiments (including all the above and below embodiments) of the present disclosure may be a parameter (or a variable, or a syntax element) indicating whether a filter (or filtering) is applied. Alternatively, the filter flag may be a parameter for determining the type of a filter. For example, the filter flag may be a value for determining a filter coefficient. For example, the encoder/decoder may determine filter coefficient fT described above with reference to Table 1 to Table 3, on the basis of the filter flag. In addition, the filter may be at least one of a smoothing filter, an interpolation filter, a DCT filter, and/or a Gaussian filter.

According to an embodiment of the present disclosure, the filter flag may be determined on the basis of the intra-prediction mode. Alternatively, in an embodiment, the filter flag may be determined on the basis of the intra-prediction mode and a threshold variable (or parameter). The threshold variable may indicate a parameter which is previously defined (or configured) for comparison with a minimum value of a difference between a current intra-prediction mode and a horizontal/vertical mode. In the present detailed description, the threshold variable may be expressed by a threshold, a filtering threshold, an intra horizontal vertical distance threshold, intraHorVerDistThres, etc., and the present disclosure is not limited to such names. In addition, in the present detailed description, the minimum value between the difference between the current intra-prediction mode and the horizontal mode, and the difference between the current intra-prediction mode and the vertical mode may be called a vertical horizontal distance minimum value, minDistVerHor, etc., and the present disclosure is not limited to such names.

According to an embodiment of the present disclosure, if the intra-prediction mode is a directional mode, the filter flag may be determined on the basis of the intra-prediction mode and a predefined threshold variable. The intra-prediction mode that is a directional mode may have a prediction mode index (or a prediction mode number), the value of which is not a value corresponding to the planar mode and the DC mode. For example, the intra-prediction mode corresponding to the planar mode may be 0 and the intra-prediction mode corresponding to the DC mode may be 1. In addition, the filter flag may be determined on the basis of the difference in the indexes between the intra-prediction mode and the vertical mode, or the difference in the indexes between the intra-prediction mode and the horizontal mode. For example, the vertical mode index and the horizontal mode index may be 50 and 18, respectively (see FIG. 6 described above). For example, the filter flag may be determined by comparing, with the threshold variable, the difference in the indexes between the intra-prediction mode and the vertical mode, or the difference in the indexes between the intra-prediction mode and the horizontal mode. For example, the filter flag may be determined on the basis of whether a result value of Equation 10 below is true or false.

$$\text{Min}(\text{Abs}(pred\text{Mode }Intra - \text{vertical mode index}), \quad \text{[Equation 10]}$$
$$\text{Abs}(pred\text{Mode }Intra - \text{horizontal mode index})) >$$
$$intraHorVerDistThres$$

If a minimum value of the difference between the current intra-prediction mode and the horizontal/vertical mode is larger than the threshold variable intraHorVerDistThres, the result value of Equation 10 may be true, and otherwise, the result value may be false. In an embodiment, the encoder/decoder may configure 1 as the filter flag if the condition of Equation 10 is true. If the condition of Equation 10 is false, and another condition is also false, the encoder/decoder may configure 0 as the filter flag. For example, another condition may correspond to whether the intra-prediction mode corresponds to a wide angle, and another condition may be determined on the basis of a wide angle variable (wideAngle) value described above. An intra-prediction mode may mean an intra-prediction mode which is transformed from a signaled mode index intra-prediction mode if a current block is a non-square block, as described above with reference to Table 1 and Table 2. That is, the intra-prediction mode may indicate the intra-prediction mode described above with reference to Table 1 and Table 2. Alternatively, the intra-prediction mode may be a value corresponding to an actual prediction angle index shown in FIG. 6.

In addition, according to an embodiment, the threshold variable may be determined on the basis of the width and the height of a current block. For example, the current block may be a transform block. For example, the threshold variable may be defined according to an nTbS value. nTbS indicates a variable indicating the size of a transform block. That is, nTbS may be determined on the basis of the width and the height of a current block (a transform block). For example, nTbS may be defined as Equation 11 below.

$$(\text{Log }2(nTbW) + \text{Log }2(nTbH)) >> 1 \quad \text{[Equation 11]}$$

In Equation 11, nTbW and nTbH indicate the width and the height of a current block, respectively.

According to an embodiment of the present disclosure, the filter flag variable may be derived according to the following process.
A. If one or more of the following conditions are true, the filter flag may be configured to be 0.
a. If the intra-prediction mode is identical to INTRA_DC
b. If the intra-prediction mode is identical to INTRA_PLANAR, and nTbW*nTbH is equal to or smaller than 32
c. If cIdx is not 0
B. Otherwise, if the intra-prediction mode is identical to INTRA_PLANAR, and nTbW*nTbH is larger than 32, the filter flag may be configured to be 1.
C. Otherwise, the following stages may be applied.
a. The variable minDistVerHor is configured by Min(Abs(predModeIntra −50), Abs(predModeIntra −18)).
b. intraHorVerDistThres[nTbS] is defined as a table.
c. The filter flag may be derived according to the following method.
1) If minDistVerHor is larger than intraHorVerDistThres[nTbS] or a wideAngle value is 1, the filter flag is configured to be 1, and otherwise, the filter flag is configured to be 0.

Referring to the filter flag variable deriving process described above, if the intra-prediction mode corresponds to the DC mode, the filter flag may be configured to be 0. In addition, if the intra-prediction mode corresponds to the planar mode, the filter flag may be configured on the basis of a block size. In addition, if the color component of a current block is the chroma component, the filter flag may be configured to be 0. The color component may be indicated by cIdx, cIdx 0 may indicate a luma component, and a value other than cIdx 0 may indicate the chroma component. If the intra-prediction mode is not the planar mode or the DC mode, minDistVerHor may be configured by Min(Abs(predModeIntra −50), Abs(predModeIntra −18)). In addition, the threshold variable (intraHorVerDistThres) may be previously defined and the threshold variable may be defined according to nTbS. If a value of the variable minDist VerHor is larger than the threshold variable, the encoder/decoder may configure 1 as the filter flag. Alternatively, if a wide angle variable (wideAngle) value is 1, the encoder/decoder may configure 1 as the filter flag. In addition, if a minDistVerHor value is not larger than the threshold variable, and a wide angle variable (wideAngle) value is 0, the encoder/decoder may configure 0 as the filter flag.

According to another embodiment of the present disclosure, the filter flag variable may be derived according to the following process.
A. If the intra-prediction mode is identical to INTRA_ANGULAR2, INTRA_ANGULAR34, or INTRA_ANGULAR66, or refIdx is not 0, the filter flag is configured to be 0.
B. Otherwise, the following stages may be applied.
a. The variable minDistVerHor is configured by Min(Abs(predModeIntra −50), Abs(predModeIntra −18)).
b. The variable intraHor VerDistThres[nTbS] is defined as a table.
c. The filter flag may be derived according to the following method.
1) If minDistVerHor is larger than intraHorVerDistThres[nTbS] or a wideAngle value is 1, the filter flag is configured to be 1, and otherwise, the filter flag is configured to be 0.

Referring to the filter flag variable deriving process described above, if the intra-prediction mode has a predefined particular value, the filter flag may be configured to be 0. For example, the predefined particular value may include three diagonal angles. For example, the particular value may be defined to be the indexes 2, 34, and 66 on the basis of the intra-prediction mode described with reference to FIG. 6.

In addition, in a case where the encoder/decoder performs an intra-prediction by using a reference sample (or a reference sample line), which is not adjacent to a current block, among multiple reference sample lines, the encoder/decoder may configure 0 as the filter flag. The encoder/decoder may express, using refIdx, whether or not a reference sample which is not adjacent to a current block is used. In an embodiment of the present disclosure, the filter flag may be determined on the basis of the intra-prediction mode and the threshold variable. In addition, the threshold variable may be determined on the basis of the width and the height of a current block. In addition, the intra-prediction mode may indicate the intra-prediction mode of Table 1 and Table 2 described above, as described in the aforementioned embodiment. Alternatively, the intra-prediction mode may be a value corresponding to an actual prediction angle index shown in FIG. 6.

Referring to the filter flag variable deriving process described above, if the intra-prediction mode corresponds to the prediction index 2, 34, or 66, the encoder/decoder may configure 0 as the filter flag, and if refIdx does not indicate a reference sample line which is the most adjacent to a current block (i.e., if refIdx is not 0), the encoder/decoder may configure 0 as the filter flag. Otherwise, minDist VerHor may be configured by Min(Abs(predModeIntra −50), Abs (predModeIntra −18)). In addition, the threshold variable (intraHor VerDistThres) may be previously defined and the threshold variable may be defined according to nTbS. If a value of the variable minDist VerHor is larger than the threshold variable, the encoder/decoder may configure 1 as the filter flag. Alternatively, if a wide angle variable (wideAngle) value is 1 (i.e., if the intra-prediction mode corresponds to a wide angle prediction), the encoder/decoder may configure 1 as the filter flag. Otherwise (i.e., if the filter flag has not been determined according to the above conditions), the encoder/decoder may configure 0 as the filter flag.

FIG. 10 is a diagram illustrating an example of a threshold variable according to the size of a transform block, as an embodiment to which the present disclosure is applied. According to an embodiment of the present disclosure, the threshold variable in the filter flag variable deriving process described above may be defined as shown in FIG. 10. In addition, the threshold variable may be defined according to an nTbS value. The vartiable nTbS indicates the size of a transform block and nTbS may be determined on the basis of the width and the height of a current block (a transform block). For example, nTbS may be defined as Equation 11 described above.

In an embodiment, the value of the threshold variable may be previously defined according to an nTbS value as shown in FIG. 10. The value may be defined to include a case where nTbS is 2. The threshold variable may be defined for a case where nTbS is 2 or more. A threshold variable value for each nTbS may be previously defined as shown in FIG. 10. In addition, nTbS 6 may be a value associated with a maximum transform size. For example, the maximum transform size may be 2^6=64.

FIG. 11 is a diagram illustrating an example of a threshold variable according to the size of a transform block, as an embodiment to which the present disclosure is applied. According to an embodiment of the present disclosure, the threshold variable in the filter flag variable deriving process described above may be defined as shown in FIG. 11. In addition, referring to FIG. 11, the threshold variable may be defined as described with reference to FIG. 10. In an embodiment, the value of the threshold variable may be previously defined according to an nTbS value as shown in FIG. 10. The value may be defined to include a case where nTbS is 2. The threshold variable may be defined for a case where nTbS is 2 or more. A threshold variable value for each nTbS may be previously defined as shown in FIG. 10. Referring to FIG. 11, if nTbS is equal to or larger than a particular value, the threshold variable may be 0, and for example, the particular value may be 5.

In an embodiment, referring to FIG. 10 and FIG. 11, when nTbS is large, the threshold variable value may tend to become smaller. In addition, when a block size is large, nTbS may tend to become larger. In addition, as a threshold variable value becomes smaller, the filter flag may relatively often be configured to be 1. Therefore, when a block size is large, the filter flag may relatively often be configured to be 1. In addition, as described above, nTbS may be defined as Equation 11 and nTbS values for 4×4, 8×4, and 4×8 blocks may all be 2. If a threshold variable value is 0 (i.e., the threshold variable value is defined to be 0 according to an nTbs value), a minDistVerHor value may always be larger than the threshold variable except for the case where the intra-prediction mode is the vertical mode or the horizontal mode. The filter flag may be configured to be 1. As described above, minDist VerHor is a variable indicating a minimum value of the difference between the intra-prediction mode and the horizontal/vertical mode.

According to an embodiment of the present disclosure, there may be a case where a minDist VerHor value is smaller than or equal to the threshold variable with respect to all the intra-prediction modes. That is, the encoder/decoder may define a threshold to be a value larger than minDist VerHor values of all the intra-prediction modes. In other words, the encoder/decoder may configure a threshold defined regardless of the intra-prediction mode to be not satisfied, according to the size of a transform block. Accordingly, the encoder/decoder may determine whether to apply filtering to a transform block having a particular size regardless of the intra-prediction mode. In an embodiment, a threshold variable value larger than minDist VerHor values of all intra-prediction modes having a wide angle variable value of 0 (i.e., wide angle prediction is not applied) may be defined. For example, referring to FIG. 10 and FIG. 11, a threshold variable value may be 20 when nTbS is 2. In this case, the minDist VerHor values of all the intra-prediction modes having a wide angle variable value of 0 may be equal to or smaller than the threshold variable.

As in the above embodiment, if a threshold value larger than minDist VerHor values of all the intra-prediction modes is defined, there may occur a problem in that unnecessary comparison operations are performed. Hereinafter, a method for solving this problem will be described.

According to an embodiment, if a block size satisfies a particular condition, the encoder/decoder may configure the filter flag on the basis of the intra-prediction mode and the threshold variable. For example, a particular condition for a block size may correspond to a case where the block size is larger than a predefined particular size. For example, the particular condition for a block size may correspond to a condition for an nTbS value. For example, a block size is greater than or equal to 8×8, the encoder/decoder may configure the filter flag on the basis of the intra-prediction mode and the threshold variable. Alternatively, if nTbS defined by Equation 11 is larger than 2, or is equal to or larger than 3, the encoder/decoder may configure the filter flag on the basis of the intra-prediction mode and the threshold variable. If a condition based on the intra-prediction mode and the threshold variable is satisfied, the encoder/decoder may configure 1 as the filter flag.

In addition, in an embodiment, if a block size satisfies a particular condition, the encoder/decoder may configure 0 as the filter flag. For example, a particular condition for a block size may correspond to a case where the block size is smaller than a predefined particular size. For example, the particular condition for a block size may correspond to a condition for an nTbS value. For example, if a block size is smaller than 8×8, the encoder/decoder may configure 0 as the filter flag. Alternatively, if nTbS defined by Equation 11 is 2, is smaller than or equal to 2, or is smaller than 3, the encoder/decoder may configure 0 as the filter flag. In an embodiment, the filter flag may be derived according to the following process.

If minDist VerHor is larger than intraHorVerDistThres [nTbS] (if nTbS is larger than 2), or wideAngle is 1, the filter flag may be configured to be 1.

Otherwise, the filter flag may be configured to be 0.

In the process described above, if minDist VerHor is larger than the threshold variable when nTbS is larger than 2, the encoder/decoder may configure 1 as the filter flag, or if a wideAngle value is 1, the encoder/decoder may configure 1 as the filter flag value. Otherwise, the filter flag may be configured to be 0. The process may be applied by being combined with an embodiment relating to the determination of the filter flag in a case where the intra-prediction mode is a particular mode (e.g., a DC, planar, diagonal modes, etc.) and an embodiment relating to the determination of the filter flag according to the position of a reference sample line, described above. For example, the encoder/decoder may configure the filter flag as below.

A. If an intra-prediction mode is identical to INTRA_ANGULAR2, INTRA_ANGULAR34, or INTRA_ANGULAR66, or refIdx is not 0, the filter flag is configured to be 0.

B. Otherwise, the following stages may be applied.

a. The variable minDistVerHor is configured by Min(Abs (predModeIntra −50), Abs(predModeIntra −18)).

b. The variable intraHor VerDistThres[nTbS] is defined as a table.

c. The filter flag may be derived according to the following method.

ca. If minDist VerHor is larger than intraHor VerDistThres [nTbS] of a case where nTbS is larger than 2, or wideAngle is 1, the filter flag is configured to be 1.

cb. Otherwise, the filter flag is configured to be 0.

The filter flag is derived as in the above embodiment. Accordingly, an operation (or a calculation) of comparing minDistVerHor with the threshold variable in a case where nTbS is 2 may be omitted, and compression efficiency may be enhanced.

In addition, in an embodiment, the filtering deriving embodiment described above may be applied to both the luma component and the chroma component. In another embodiment, the encoder/decoder may apply the above filtering deriving embodiment to the luma component, and may perform an operation of comparing minDist VerHor and the threshold variable, with respect to the chroma component when a block size condition different from that of the luma component is satisfied. For example, an operation of comparing minDist VerHor and the threshold variable may be performed with respect to the luma component when nTbS is larger than a, and may be performed with respect to the chroma component when nTbS is larger than b. For example, a may be smaller than b (a<b). For example, a may be 2, and b may be 3. In addition, the above method may be applied only when the threshold variable is defined individually for each of the luma component and the chroma component. In addition, for example, whether the threshold variable is defined individually for each of the luma component and the chroma component may be determined with respect to a color format.

As described above, if a threshold value is defined to be larger than minDist VerHor values of all the intra-prediction modes, there may occur a problem in that unnecessary comparison operations are performed. Hereinafter, another method for solving this problem will be described.

If a block size satisfies a particular condition, the encoder/decoder may configure the filter flag on the basis of the intra-prediction mode and the threshold variable. According to an embodiment of the present disclosure, if a block size satisfies a particular condition, the encoder/decoder may configure 0 as the filter flag. For example, a particular condition for a block size may correspond to a case where the block size is smaller than a predefined particular size. For example, the particular condition for a block size may correspond to a condition for an nTbS value. For example, if a block size is smaller than 8×8, the encoder/decoder may configure 0 as the filter flag. Alternatively, if nTbS defined by Equation 11 is 2, is smaller than or equal to 2, or is smaller than 3, the encoder/decoder may configure 0 as the filter flag. In an embodiment, the filter flag may be derived according to the following process.

If nTbS is 2, the filter flag may be configured to be 0.

Otherwise, if minDist VerHor is larger than intraHorVerDistThres[nTbS], or wideAngle is 1, the filter flag may be configured to be 1.

Otherwise, the filter flag may be configured to be 0.

In the process described above, the encoder/decoder may configure the filter flag to be 0 if nTbS is 2. Otherwise, the encoder/decoder may configure 1 as the filter flag if minDist VerHor is larger than the threshold variable, or may configure 1 as the filter flag if wideAngle is 1. Otherwise, the encoder/decoder may configure 0 as the filter flag. The process may be applied by being combined with an embodiment relating to the determination of the filter flag in a case where the intra-prediction mode is a particular mode (e.g., a DC, planar, diagonal modes, etc.) and an embodiment relating to the determination of the filter flag according to the position of a reference sample line, described above. For example, the encoder/decoder may configure the filter flag as below.

A. If an intra-prediction mode is identical to INTRA_ANGULAR2, INTRA_ANGULAR34, or INTRA_ANGULAR66, or refIdx is not 0, the filter flag is configured to be 0.

B. Otherwise, the following stages may be applied.

a. The variable minDistVerHor is configured by Min(Abs (predModeIntra −50), Abs(predModeIntra −18)).

b. The variable intraHor VerDistThres[nTbS] is defined as a table.

c. The filter flag may be derived according to the following method.

a. If minDistVerHor is larger than intraHorVerDistThres [nTbS], or wideAngle is 1, the filter flag is configured to be 1.

cb. Otherwise, the filter flag is configured to be 0.

In yet another embodiment, the encoder/decoder may configure the filter flag as below.

A. If an intra-prediction mode is identical to INTRA_ANGULAR2, INTRA_ANGULAR34, or INTRA_ANGULAR66, or refIdx is not 0, the filter flag is configured to be 0.

B. Otherwise, the following stages may be applied.

a. The variable minDist VerHor is configured by Min(Abs (predModeIntra −50), Abs(predModeIntra −18)).

b. The variable intraHor VerDistThres[nTbS] is defined as a table.

c. The filter flag may be derived according to the following method.
  ca. If nTbS is 2, the filter flag may be configured to be 0.
  cb. Otherwise, if minDistVerHor is larger than intraHorVerDistThres[nTbS], or wideAngle is 1, the filter flag is configured to be 1.
  cc. Otherwise, the filter flag is configured to be 0.

The filter flag is derived as in the above embodiment. Accordingly, an operation (or a calculation) of comparing minDistVerHor with the threshold variable if nTbS is 2 may be omitted, and compression efficiency may be enhanced.

In an embodiment, the filtering deriving embodiment described above may be applied to both the luma component and the chroma component. In another embodiment, the encoder/decoder may apply the above filtering deriving embodiment to the luma component, and may configure the filter flag to be 0 with respect to the chroma component when a block size condition different from that of the luma component is satisfied. For example, the encoder/decoder may configure the filter flag to be 0 with respect to the luma component if nTbS is smaller than or equal to a, and may configure the filter flag to be 0 with respect to the chroma component if nTbS is smaller than or equal to b. For example, a may be smaller than b (a<b). For example, a may be 2, and b may be 3. In addition, the above method may be applied only when the threshold variable is defined individually for each of the luma component and the chroma component. In addition, for example, whether the threshold variable is defined individually for each of the luma component and the chroma component may be determined with respect to a color format.

FIG. 12 is a diagram illustrating an example of a threshold variable according to the size of a transform block, as an embodiment to which the present disclosure is applied. According to an embodiment of the present disclosure, as described in the above filter flag variable deriving process, the encoder/decoder may perform a filter flag configuration based on minDistVerHor and the threshold variable on the basis of a block size, or may not perform the same. Therefore, the tables described above with reference to FIG. 10 and FIG. 11 may be modified as illustrated in FIG. 12. For example, a threshold variable value corresponding to the block sizes 4×4, 8×4, and 4×8 may not exist. Alternatively, a threshold variable value corresponding to the area of a block, which is equal to or smaller than 32, may not exist. Referring to FIG. 12, a threshold variable value corresponding to an nTbS value which is 2 may not exist. In addition, as described above, nTbS may be defined as Equation 11. According to an embodiment of the present disclosure, therefore, a space (or a memory) in which threshold data is stored may be saved.

FIG. 13 is a diagram illustrating an example of a threshold variable according to the size of a transform block, as an embodiment to which the present disclosure is applied. According to an embodiment of the present disclosure, as described in the above filter flag variable deriving process, the encoder/decoder may apply a filter flag configuration regardless of whether a wide angle is applied. For example, regardless of whether the intra-prediction mode corresponds to a wide angle, the encoder/decoder may configure the filter flag to be 1 if a condition of comparing the threshold variable and a minDistVerHor value based on the intra-prediction mode is satisfied, and otherwise, the encoder/decoder may configure the filter flag to be 0. The value of the threshold variable may be defined to be different from the threshold variable described above with reference to FIG. 10 to FIG. 12.

Referring to FIG. 13, if minDist VerHor is larger than the threshold variable, the encoder/decoder may configure 1 as the filter flag, and otherwise, the encoder/decoder may configure 0 as the filter flag. In addition, this configuration may be applied by being combined with an embodiment relating to the determination of the filter flag in a case where the intra-prediction mode is a particular mode (e.g., a DC, planar, diagonal modes, etc.) and an embodiment relating to the determination of the filter flag according to the position of a reference sample line, described above. For example, the encoder/decoder may configure the filter flag as below.

A. If an intra-prediction mode is identical to INTRA_ANGULAR2, INTRA_ANGULAR34, or INTRA_ANGULAR66, or refIdx is not 0, the filter flag is configured to be 0.

B. Otherwise, the following stages may be applied.
  a. The variable minDistVerHor is configured by Min(Abs(predModeIntra −50), Abs(predModeIntra −18)).
  b. The variable intraHor VerDistThres[nTbS] is defined as a table.
  c. The filter flag may be derived according to the following method.
    ca. If minDist VerHor is larger than intraHor VerDistThres[nTbS], the filter flag is configured to be 1.
    cb. Otherwise, the filter flag is configured to be 0.

According to an embodiment, a threshold variable value for 4×4, 8×4, and 4×8 blocks may be smaller than those described with reference to FIG. 10 and FIG. 11. For example, a threshold variable value for 4×4, 8×4, and 4×8 blocks may be 16. In this case, in all the cases where the intra-prediction mode is equal to or larger than 67, and equal to or smaller than −1, minDist VerHor may be derived to be larger than the threshold variable. Accordingly, the encoder/decoder may configure 1 as the filter flag. In addition, in an embodiment, as described above, nTbS may be defined as Equation 11. Therefore, an nTbS value for 4×4, 8×4, and 4×8 blocks may be determined to be 2. In addition, a threshold variable value corresponding to nTbS of 3 or more may be smaller than a value corresponding to nTbS of 2. Therefore, if nTbS is equal to or larger than 3, in all the cases where the intra-prediction mode is larger than or equal to 67 and is smaller than or equal to −1, minDist VerHor may be derived to be a value larger than the threshold variable.

Referring to FIG. 13, a case where a threshold variable value is configured to be 16 when nTbS is 2 is illustrated as an example. As another embodiment, a threshold variable value may be differently configured according to an intra-prediction mode value. For example, if an nTbS value is 2, a threshold variable value may be differently configured according to an intra-prediction mode value. For example, a threshold variable value may be differently configured between a case where an intra-prediction mode value is equal to or larger than a predefined particular value, and a case where the intra-prediction mode value is smaller than the particular value. For example, if an intra-prediction mode value is a negative number, a threshold variable value for nTbS of 2 may be configured to be 18. That is, a threshold variable value may be differently configured between a case where an intra-prediction mode value is equal to or larger than a particular value which is 2 or more (or 0 or more), and a case where the intra-prediction mode value is smaller than the particular value. For example, the respective threshold variable values may be 16 and 18. For example, the method in which the threshold variable is differently configured according to the intra-prediction mode may be applied when nTbS is 2.

Figure 14:
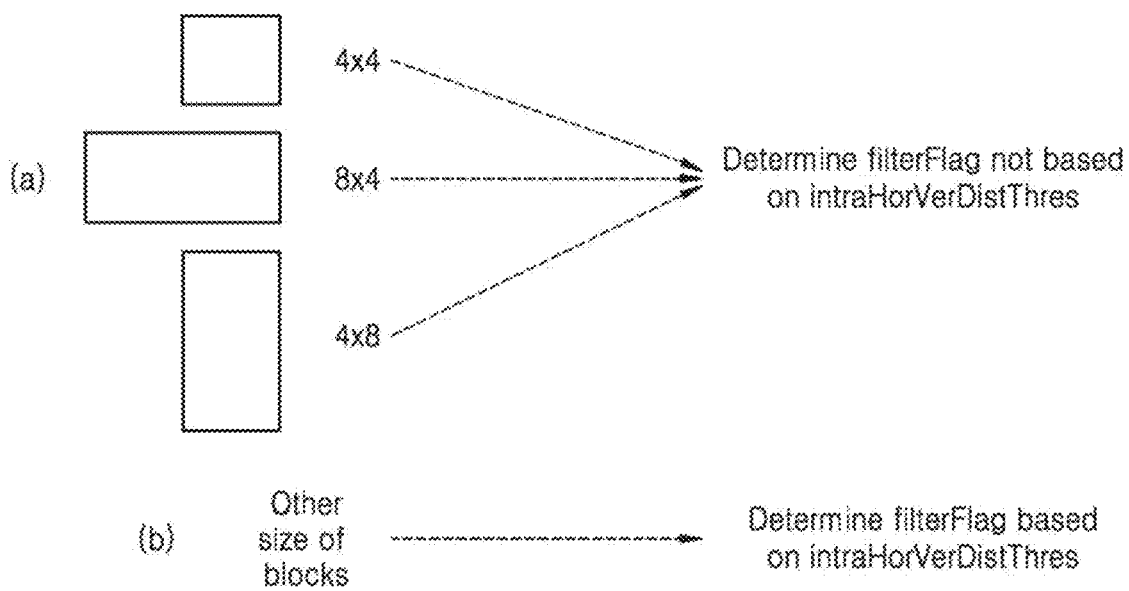
FIG. 14 is a diagram illustrating a filter flag configuring method according to an embodiment of the present disclosure.

FIG. 14 is a diagram illustrating a filter flag configuring method according to an embodiment of the present disclosure. As described above, when the filter flag is configured, the encoder/decoder may determine the filter flag on the basis of the intra-prediction mode and the threshold variable if a block size satisfies a predefined particular condition, and otherwise, the encoder/decoder may determine the filter flag regardless of the threshold variable. If the embodiments described above with reference to FIG. 10 to FIG. 13 are applied, the encoder/decoder may configure the filter flag for 4×4, 8×4, and 4×8 blocks (i.e., blocks having an nTbS value of 2) according to a block size condition. Therefore, as illustrated in FIG. 14, the filter flag may not be determined on the basis of the threshold variable with respect to 4×4, 8×4, and 4×8 blocks, and the filter flag may be configured on the basis of the threshold variable with respect to the blocks having sizes different therefrom.

FIG. 15 is a diagram illustrating an example of a threshold variable according to the size of a transform block, as an embodiment to which the present disclosure is applied. According to an embodiment of the present disclosure, the threshold variable for a block (i.e., a rectangular block or a non-square block) other than a square may be defined separately from the threshold variable for a square block. For example, the threshold variable for a 4×8 or 8×4 block may be defined to be different from the threshold variable for a 4×4 block or the threshold variable for a 8×8 block. In an embodiment, the threshold variable for a 4×8 or 8×4 block may be defined to be different from the threshold variable for a 4×4 block or the threshold variable for a 8×8 block and the threshold variable for blocks having sizes different therefrom may be defined without distinction between square blocks and non-square blocks. Referring to FIG. 15, the threshold variable for a 4×8 or 8×4 block may be defined to be different from those of blocks having sizes different therefrom.

As described above, according to Equation 11, nTbS values for N×N, 2N×N, and N×2N blocks may be identically determined. In addition, in a case where a threshold variable table as in FIG. 10 and FIG. 11 described above is used, if nTbS is 2, the encoder/decoder may always configure the filter flag to be 0 with respect to the intra-prediction mode which does not correspond to a wide angle. Therefore, in a case where nTbS is 2, the encoder/decoder may configure different filtering conditions by distinguishing between a case of the size 4×4 and the other cases. According to an embodiment, A, B, and C may be configured to be different from each other in FIG. 15. According to another embodiment, B and C may be defined to be the same value in FIG. 15. Therefore, the filter flag of a case of 8×4 and 4×8 blocks may be determined according to the same condition as that of a 8×8 block.

Figure 16:
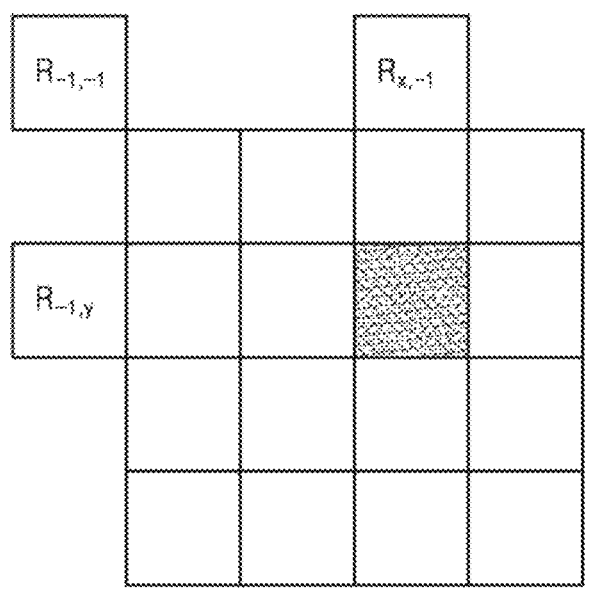
FIG. 16 is a diagram illustrating a position-dependent prediction sample filtering method according to an embodiment of the present disclosure.

FIG. 16 is a diagram illustrating a position-dependent prediction sample filtering method according to an embodiment of the present disclosure. In the present detailed description, position-dependent prediction sample filtering may be called a position-dependent intra-prediction combination (PDPC). In addition, according to an embodiment of the present disclosure, the PDPC may be a method for combining an intra-prediction and reference samples. The combining method may be based on a position in a block. For example, the encoder/decoder may generate a prediction sample according to a linear combination between an intra-prediction and reference samples.

According to an embodiment of the present disclosure, the PDPC may be a technology for combining a filtered sample and an unfiltered sample to generate a prediction sample. A method of combining a filtered sample and an unfiltered sample may be determined on the basis of the positions in a block. The combining method may include a weighted value used when a filtered sample and an unfiltered sample are weighted-summed.

In addition, according to an embodiment of the present disclosure, the encoder/decoder may apply the PDPC to a pre-configured intra-prediction mode. For example, the pre-configuration intra-prediction mode may include a planar mode, a DC mode, a vertical mode, a horizontal mode, a diagonal mode, a mode adjacent to the diagonal mode, etc. In addition, the diagonal mode may be a diagonal mode corresponding to the index 2 or 66 in FIG. 6 described above. If the PDPC is applied, a prediction sample may be derived using Equation 12 below.

$$pred(x, y) = (wL \times R_{-1,y} + wT \times R_{x,-1} - wTL \times R_{-1,-1} + \quad \text{[Equation 12]}$$
$$(64 - wL - wT + wTL) \times pred(x, y) + 32) \gg 6$$

In Equation 12, the notation (x, y) may mean a set of coordinates of a prediction sample. In addition, (x, y) may be coordinates when the top-left coordinates of a current block are put as (0,0). In addition, in Equation 12, R may indicate a reference sample. $R\_\{x,-1\}$ and $R\_\{-1,y\}$ may be reference samples positioned above and at the left of a prediction sample to be calculated, respectively, and $R\_\{-1,-1\}$ may be a reference sample positioned at the top-left corner of a current block. In addition, the term 'pred' may be a prediction sample. Referring to Equation 12, a prediction sample and a reference sample are linearly combined. A weighted value may be expressed by wL, wT, −wTL, (64-wL-wT+wTL), etc. The weighted value may be configured as a position-dependent value. In addition, the weighted values may be determined by different methods according to a prediction mode. For example, a weighted value for the DC mode may be determined by Equation 13 below.

$$wT = 32 \gg ((y \ll 1) \gg \text{shift}), \quad \text{[Equation 13]}$$
$$wL = 32 \gg ((x \ll 1) \gg \text{shift}),$$
$$wTL = (wL \gg 4) + (wT \gg 4),$$
$$\text{with shift} = (\log 2 (\text{width}) - 2 + \log 2 (\text{height}) - 2 + 2) \gg 2$$

In addition, in an embodiment, with respect to the planar mode, wTL may be equal to 0 (wTL=0). In addition, with respect to the horizontal mode, wTL may be equal to wT (wTL=wT). In addition, with respect to the vertical mode, wTL may be equal to wL (wTL=wL). Other weighted values may be determined to be the same as the values for the DC mode. In addition, in an embodiment, a weighted value for a top-right diagonal mode (index 66) and for a bottom-left diagonal mode (index 2) may be determined using Equation 14 below.

$$wT = 16 \gg ((y' \ll 1) \gg \text{shift}), \quad \text{[Equation 14]}$$
$$wL = 16 \gg ((x' \ll 1) \gg \text{shift}), wTL = 0$$

In Equation 14, for a calculation of pred(x',y'), x may equal to x'+y'+1 (x=x'+y'+1), and y may equal to x'+y'+1 (y=x'+y'+1). In addition, weighted values for a mode adjacent to a prediction mode having the index 2 may be determined using Equation 15 below.

$$wT = 32 >> ((y' << 1) >> \text{shift}), wL = 0, wTL = 0 \quad \text{[Equation 15]}$$

In addition, weighted values for a mode adjacent to a prediction mode having the index 66 may be determined using Equation 16 below.

$$wL = 32 >> ((x' << 1) >> \text{shift}), wT = 0, wTL = 0 \quad \text{[Equation 16]}$$

Figure 17:
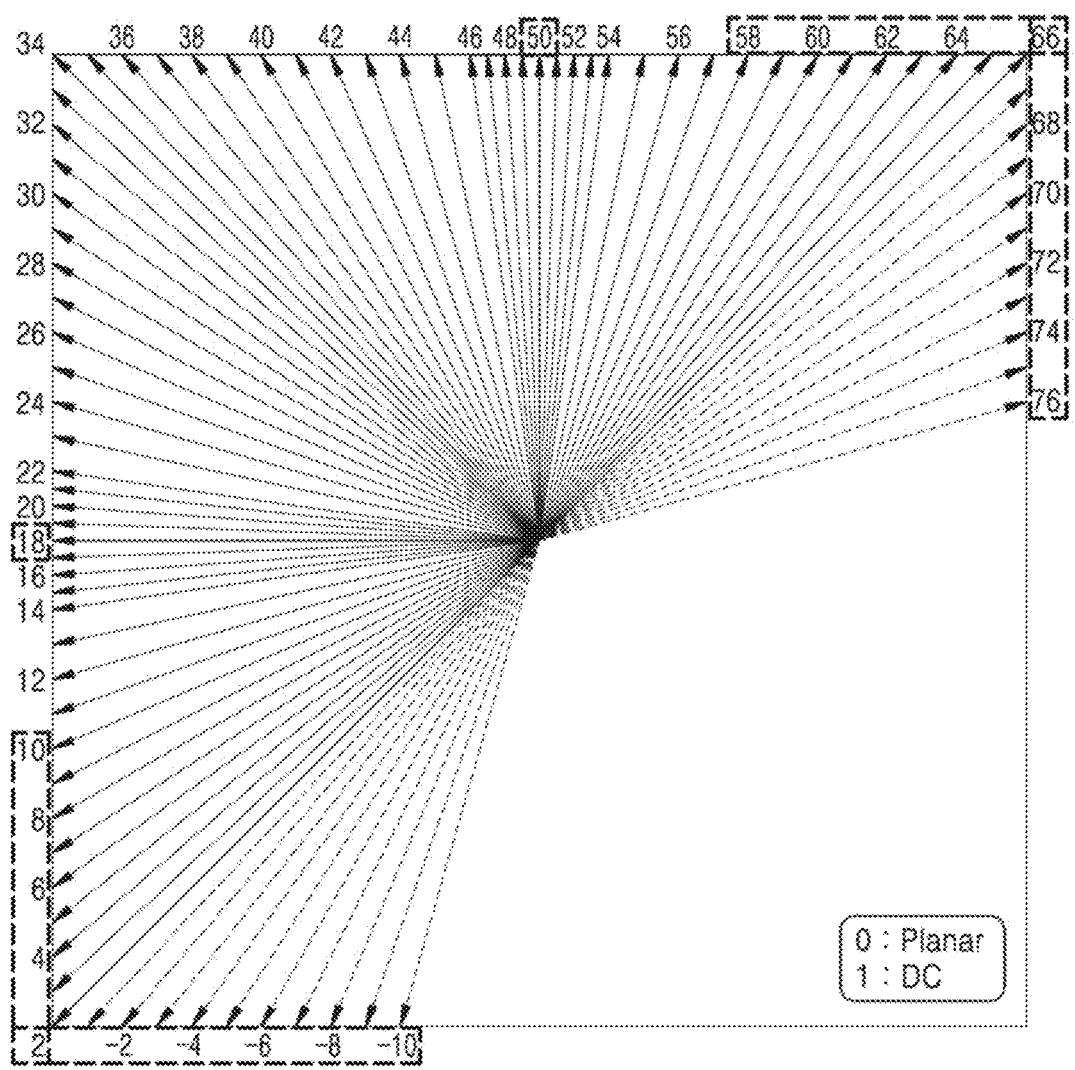
FIG. 17 is a diagram illustrating a position-dependent prediction sample filtering condition according to an embodiment of the present disclosure.

FIG. 17 is a diagram illustrating a position-dependent prediction sample filtering condition according to an embodiment of the present disclosure. As described above with reference to FIG. 16, the encoder/decoder may apply the PDPC to a pre-configured intra-prediction mode. Referring to FIG. 17, the intra-prediction mode having indexes indicated by dotted lines may be included in the pre-configured intra-prediction mode. Therefore, referring to FIG. 17, if the intra-prediction mode is 18 or 50, is equal to or smaller than 10, or is larger than or equal to 58, the encoder/decoder may apply the PDPC. In addition, if the intra-prediction mode corresponds to the planar mode or the DC mode, the encoder/decoder may apply the PDPC. In addition, if the intra-prediction mode corresponds to a wide angle, the encoder/decoder may apply the PDPC. In addition, the encoder/decoder may apply the PDPC only when refIdx indicating the position of a reference sample line is a pre-configured value. The intra-prediction mode used herein may indicate the index of a prediction mode used for actual prediction. FIG. 17 may be a diagram illustrated on the basis of the modes described above with reference to FIG. 6. Referring to FIG. 17, if the intra-prediction mode is 0, 1, 18, or 50, is smaller than or equal to 10, or is larger than or equal to 58, the PDPC may be applied.

Figure 18:
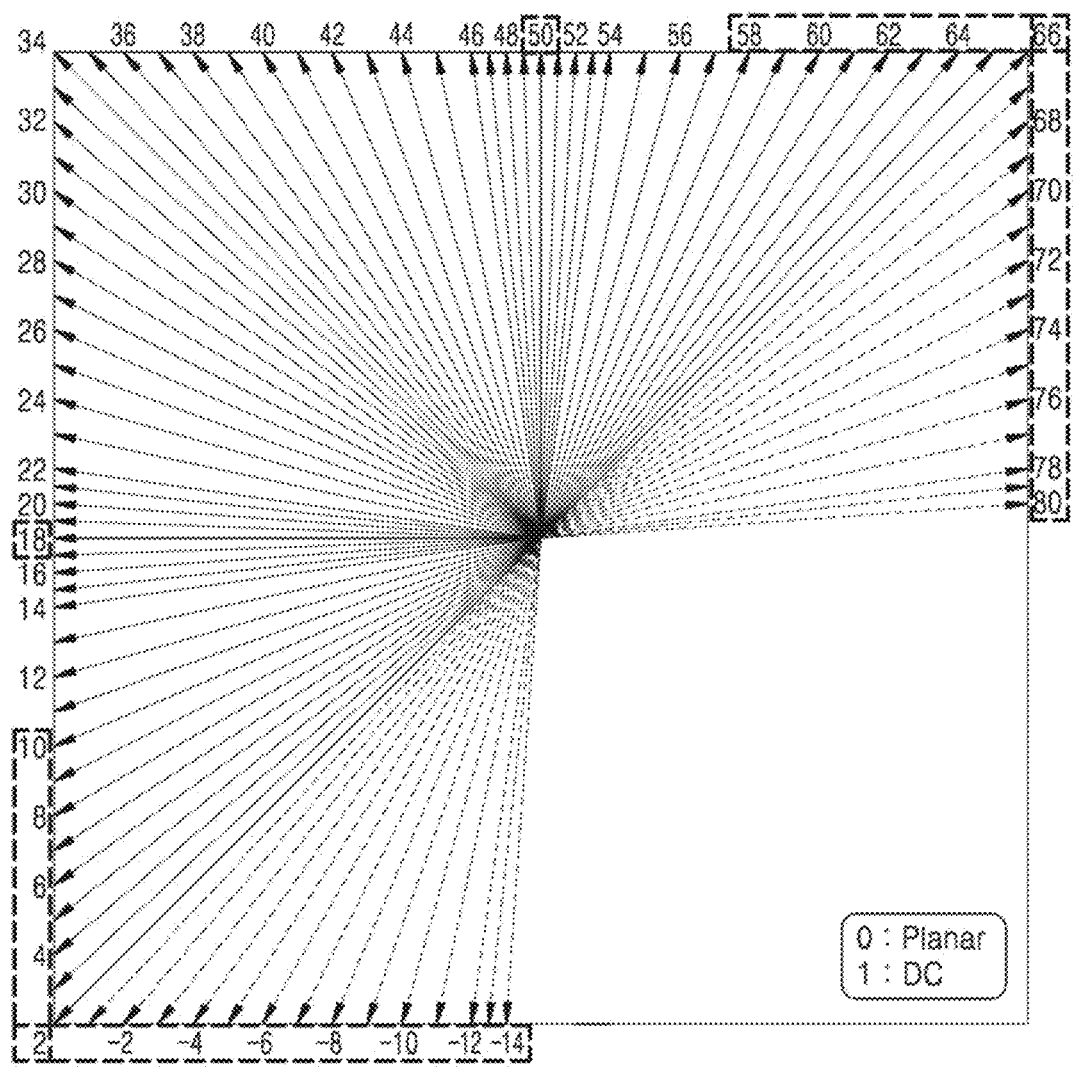
FIG. 18 is a diagram illustrating a position-dependent prediction sample filtering condition according to an embodiment of the present disclosure.

FIG. 18 is a diagram illustrating a position-dependent prediction sample filtering condition according to an embodiment of the present disclosure. As described with reference to FIG. 16, the encoder/decoder may apply the PDPC to a pre-configured intra-prediction mode. Referring to FIG. 18, the intra-prediction mode having indexes indicated by dotted lines may be included in the pre-configured intra-prediction mode. Therefore, referring to FIG. 18, if the intra-prediction mode is 18 or 50, or is equal to or smaller than 10 or is larger than or equal to 58, the encoder/decoder may apply the PDPC. In addition, if the intra-prediction mode corresponds to the planar mode or the DC mode, the encoder/decoder may apply the PDPC. In addition, if the intra-prediction mode corresponds to a wide angle, the encoder/decoder may apply the PDPC. In addition, the encoder/decoder may apply the PDPC when refIdx indicating the position of a reference sample line is a pre-configured particular value. The intra-prediction mode used herein may indicate the index of a prediction mode used for actual prediction. FIG. 18 may be a diagram illustrated on the basis of the modes described above with reference to FIG. 6. Referring to FIG. 18, if the intra-prediction mode is 0, 1, 18, or 50, or is equal to or smaller than 10 or is larger than or equal to 58, the encoder/decoder may apply the PDPC. When the PDPC is applied, additional calculations are required. Therefore, if the PDPC is applied to many modes, complexity may be increased. As in the embodiment proposed in the present disclosure, complexity may be alleviated and compression efficiency may be increased by limiting a prediction mode to which the PDPC is applied.

Figure 19:
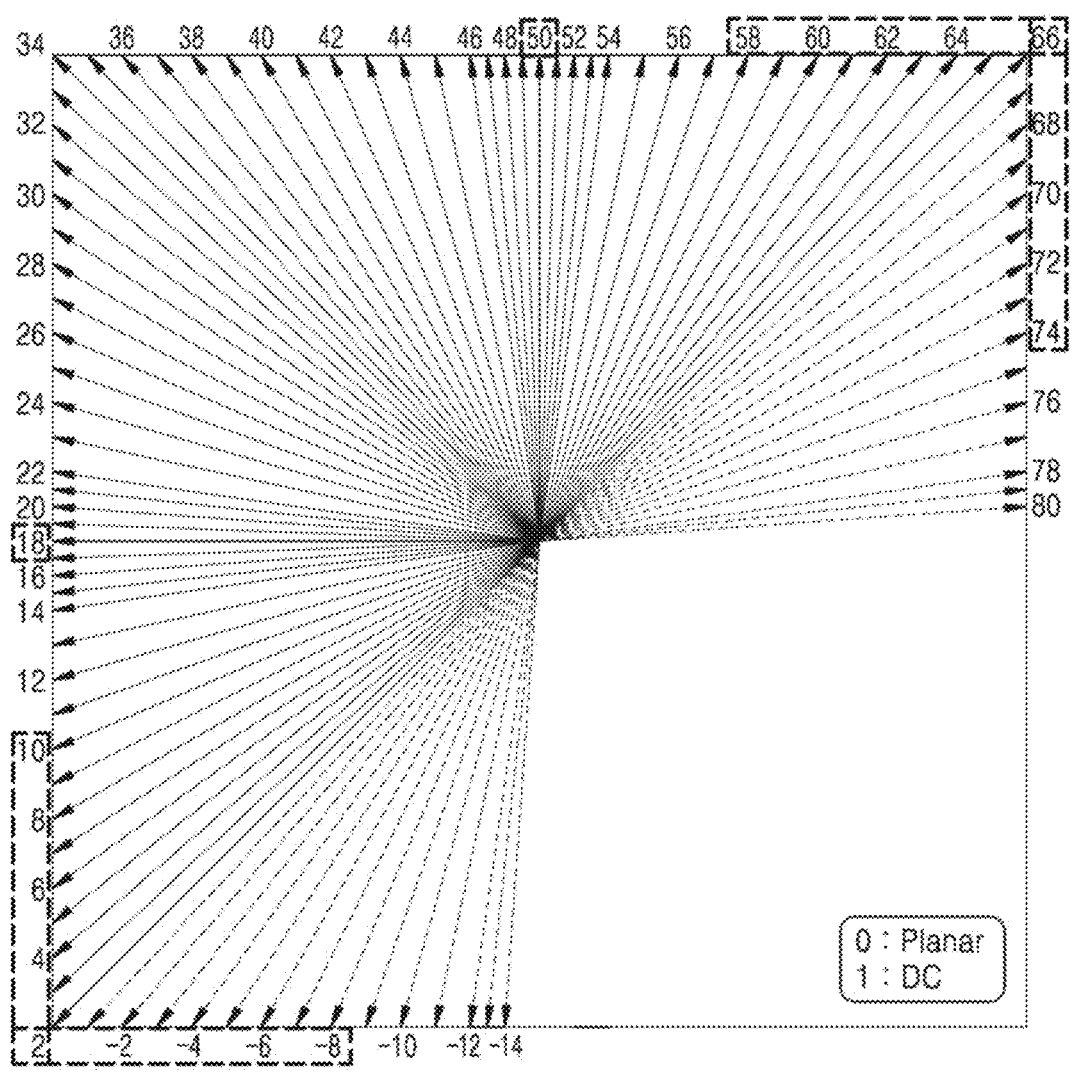
FIG. 19 is a diagram illustrating a position-dependent prediction sample filtering condition according to an embodiment of the present disclosure.

FIG. 19 is a diagram illustrating a position-dependent prediction sample filtering condition according to an embodiment of the present disclosure. Referring to FIG. 19, the number and positions of modes adjacent to prediction modes having the indexes 66 and 2, to which the PDPC is applied, may be defined to be symmetrical at both sides of each of the indexes 66 and 2. For example, the encoder/decoder may apply the PDPC to a prediction mode having an intra-prediction mode value from (66−n) to (66+n). Alternatively, the encoder/decoder may apply the PDPC to a prediction mode having an intra-prediction mode value from (2−2−n) to (2+n). n may be a positive number. Referring to FIG. 19, the encoder/decoder may apply the PDPC when the intra-prediction mode is equal to or larger than 58 and is equal to or smaller than 74. In addition, the encoder/decoder may apply the PDPC when the intra-prediction mode is equal to or smaller than 10 and is equal to or larger than −8. Accordingly, the PDPC may not be applied when the intra-prediction mode is equal to or larger than 75 or is equal to or smaller than −9.

Therefore, if one of the following conditions is satisfied, the encoder/decoder may apply the PDPC.

If the intra-prediction mode is identical to INTRA_PLANAR

If the intra-prediction mode is identical to INTRA_DC

If the intra-prediction mode is identical to INTRA_ANGULAR18

If the intra-prediction mode is identical to INTRA_ANGULAR50

If the intra-prediction mode is equal to or smaller than INTRA_ANGULAR10, and if the intra-prediction mode is larger than or is equal to INTRA_ANGULAR-8

If the intra-prediction mode is equal to or larger than INTRA_ANGULAR58, and if the intra-prediction mode is smaller than or is equal to INTRA_ANGULAR74

As an embodiment, in the embodiment of FIG. 19 described above to the embodiment of FIG. 22 described below, the encoder/decoder may apply the PDPC even when the intra-prediction mode is the planar, DC, vertical, or horizontal mode.

Figure 20:
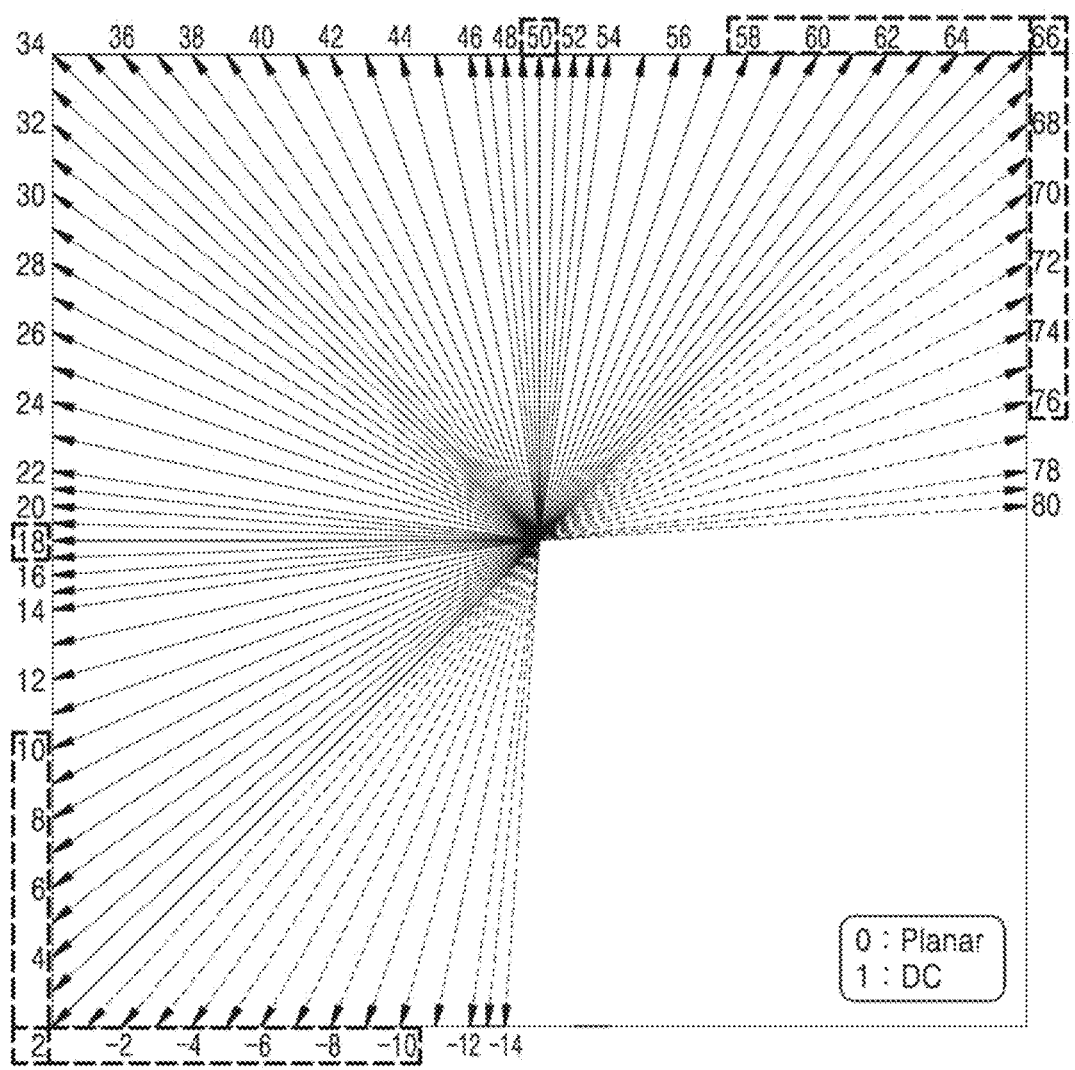
FIG. 20 is a diagram illustrating a position-dependent prediction sample filtering condition according to an embodiment of the present disclosure.

FIG. 20 is a diagram illustrating a position-dependent prediction sample filtering condition according to an embodiment of the present disclosure. Referring to FIG. 20, a PDPC-applied angle part among diagonal mode-adjacent prediction angles within the part corresponding to wide angles may include the indexes described above with reference to FIG. 18. Therefore, the encoder/decoder may not apply the PDPC when the index of the intra-prediction mode is larger than or equal to 77 and is smaller than or equal to −11. Specifically, if one of the following conditions is satisfied, the encoder/decoder may apply the PDPC.

If the intra-prediction mode is identical to INTRA_PLANAR

If the intra-prediction mode is identical to INTRA_DC

If the intra-prediction mode is identical to INTRA_ANGULAR18

If the intra-prediction mode is identical to INTRA_ANGULAR50

If the intra-prediction mode is equal to or smaller than INTRA_ANGULAR10, and if the intra-prediction mode is larger than or is equal to INTRA_ANGULAR-10

If the intra-prediction mode is equal to or larger than INTRA_ANGULAR58, and if the intra-prediction mode is smaller than or is equal to INTRA_ANGULAR76

Figure 21:
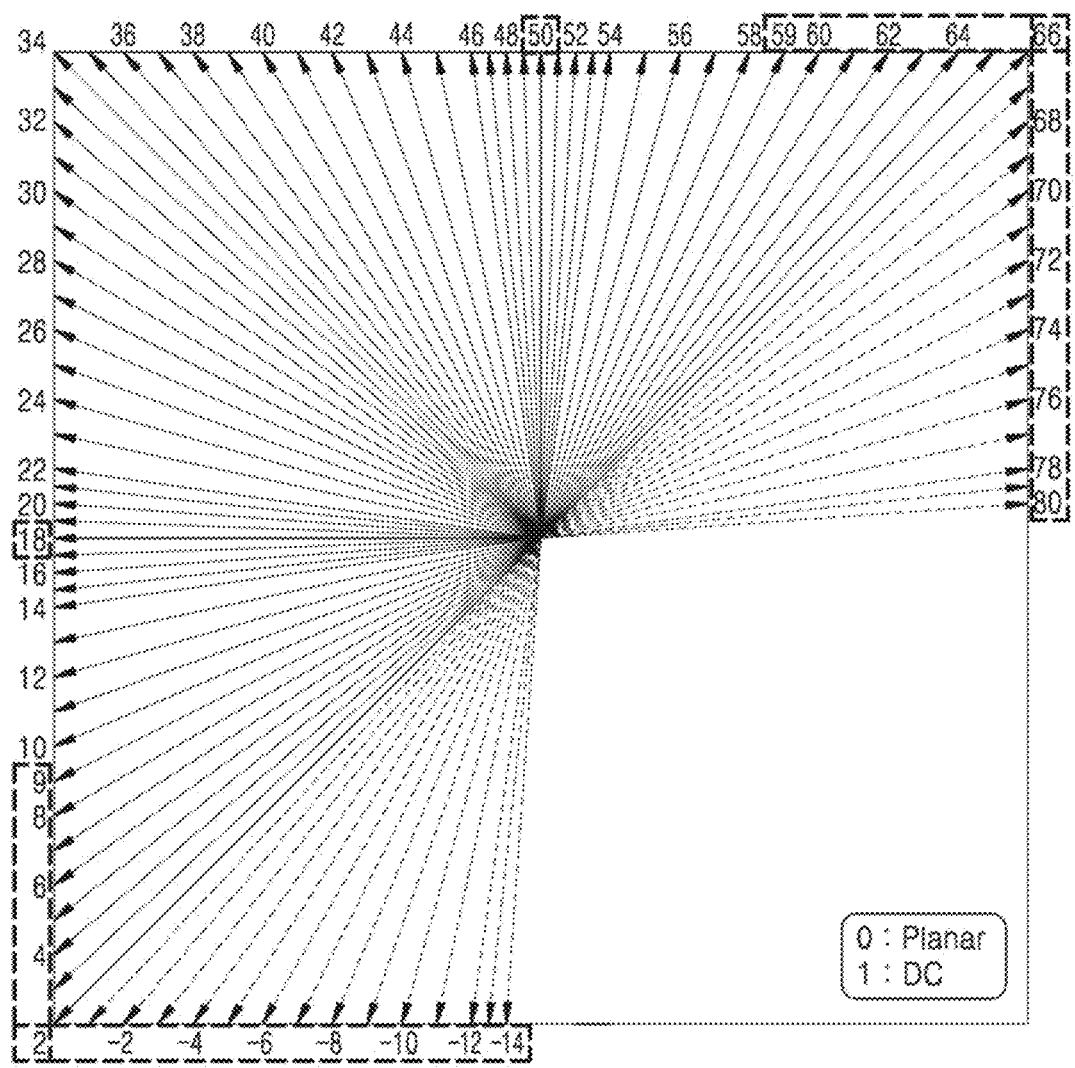
FIG. 21 is a diagram illustrating a position-dependent prediction sample filtering condition according to an embodiment of the present disclosure.

FIG. 21 is a diagram illustrating a position-dependent prediction sample filtering condition according to an embodiment of the present disclosure. When an angle adjacent to a PDPC-applied diagonal mode described with reference to FIG. 18 described above is maintained, the encoder/decoder may apply the PDPC according to an embodiment as illustrated in FIG. 21. Specifically, in a case of FIG. 18, the PDPC is applied to a prediction angle of 13 or more. Therefore, even in a case of the angle modes as illustrated in FIG. 6, the encoder/decoder may apply the PDPC to a prediction angle of 13 or more. Referring to Table 1 and Table 2 described above, when the intra-prediction mode is larger than or equal to 59, or is smaller than or equal to 9, a prediction angle may be 13 or more.

Therefore, according to an embodiment of the present disclosure, as illustrated in FIG. 21, the encoder/decoder may apply the PDPC when the intra-prediction mode is larger than or equal to 59 or is smaller than or equal to 9. The encoder/decoder may not apply the PDPC when the intra-prediction mode is equal to 58 or 10. Specifically, if one of the following conditions is satisfied, the encoder/decoder may apply the PDPC.

If the intra-prediction mode is identical to INTRA_PLANAR

If the intra-prediction mode is identical to INTRA_DC

If the intra-prediction mode is identical to INTRA_ANGULAR18

If the intra-prediction mode is identical to INTRA_ANGULAR50

If the intra-prediction mode is equal to or smaller than INTRA_ANGULAR9

If the intra-prediction mode is equal to or larger than INTRA_ANGULAR59

Figure 22:
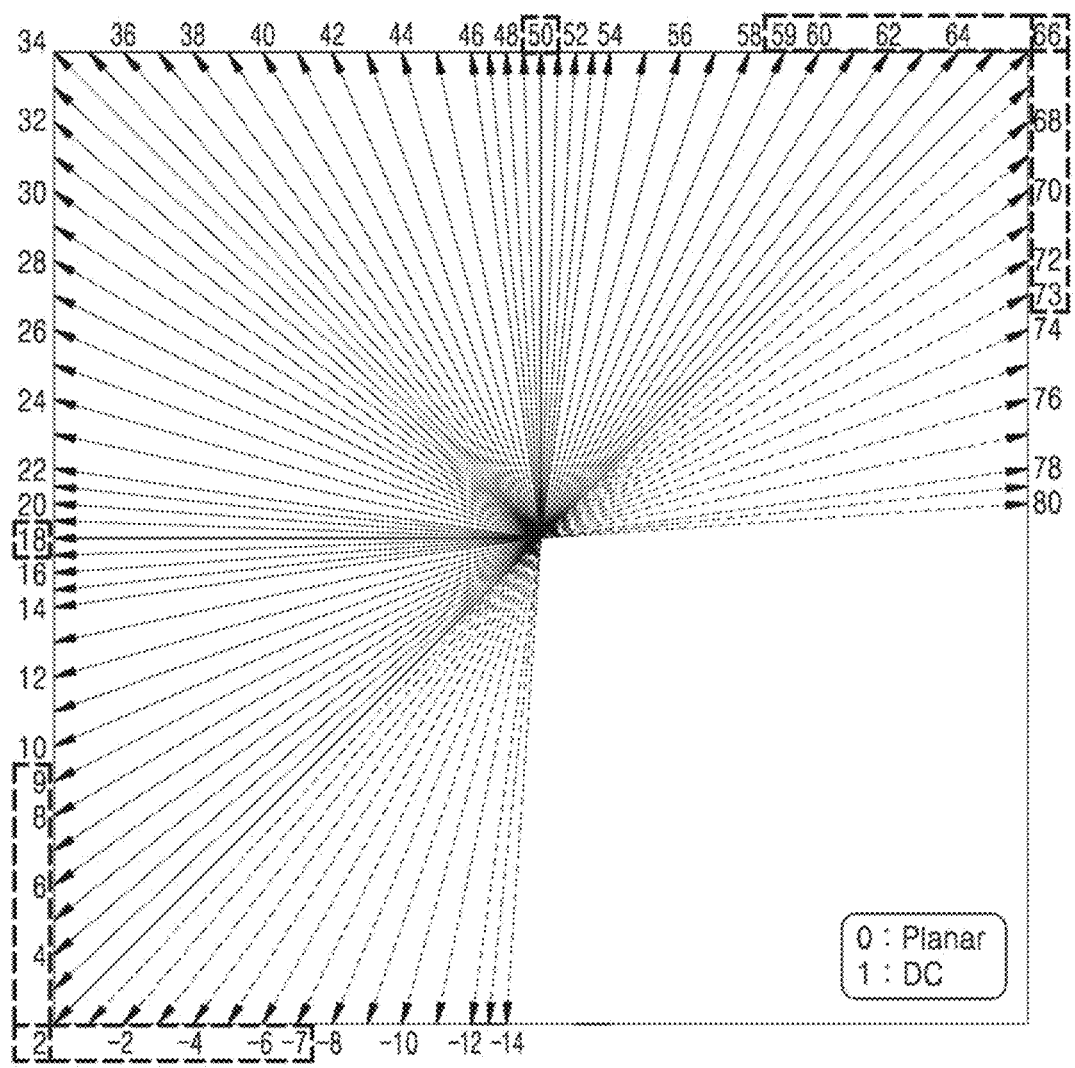
FIG. 22 is a diagram illustrating a position-dependent prediction sample filtering condition according to an embodiment of the present disclosure.

FIG. 22 is a diagram illustrating a position-dependent prediction sample filtering condition according to an embodiment of the present disclosure. The encoder/decoder may determine whether to apply the PDPC by combining the embodiments of FIG. 21 and FIG. 19 or combining the embodiments of FIG. 21 and FIG. 20. According to an embodiment of the present disclosure, smaller complexity may show compared to the embodiment described above with reference to FIG. 17 or FIG. 18. Referring to FIG. 22, the encoder/decoder may apply the PDPC to a prediction mode which has a prediction angle of 13 or more and is positioned to be symmetrical with respect to a diagonal mode. That is, the encoder/decoder may apply the PDPC when the intra-prediction mode is equal to or larger than 59 and is equal to or smaller than 73. In addition, the encoder/decoder may apply the PDPC when the intra-prediction mode is equal to or smaller than 9 and is equal to or larger than −7. Accordingly, the encoder/decoder may not apply the PDPC when the intra-prediction mode is equal to 58 or is larger than or equal to 74. In addition, the encoder/decoder may not apply the PDPC when the intra-prediction mode is equal to 10 or is smaller than or equal to −8. Specifically, if one of the following conditions is satisfied, the encoder/decoder may apply the PDPC.

If the intra-prediction mode is identical to INTRA_PLANAR

If the intra-prediction mode is identical to INTRA_DC

If the intra-prediction mode is identical to INTRA_ANGULAR18

If the intra-prediction mode is identical to INTRA_ANGULAR50

If the intra-prediction mode is equal to or smaller than INTRA_ANGULAR9, and if the intra-prediction mode is larger than or is equal to INTRA_ANGULAR-7

If the intra-prediction mode is equal to or larger than INTRA_ANGULAR59, and if the intra-prediction mode is smaller than or is equal to INTRA_ANGULAR73

According to another embodiment of the present disclosure, the encoder/decoder may apply the PDPC while maintaining a range applied as a wide angle in FIG. 18 with a prediction angle of 13 or more. That is, the encoder/decoder may apply the PDPC when the intra-prediction mode is equal to or larger than 59 and is equal to or smaller than 76. In addition, the encoder/decoder may apply the PDPC when the intra-prediction mode is equal to or smaller than 9 and is equal to or larger than −10. Accordingly, the encoder/decoder may not apply the PDPC when the intra-prediction mode is equal to 58 or is larger than or equal to 77. In addition, the encoder/decoder may not apply the PDPC when the intra-prediction mode is equal to 10 or is smaller than or equal to −11. Specifically, if one of the following conditions is satisfied, the encoder/decoder may apply the PDPC.

If the intra-prediction mode is identical to INTRA_PLANAR

If the intra-prediction mode is identical to INTRA_DC

If the intra-prediction mode is identical to INTRA_ANGULAR18

If the intra-prediction mode is identical to INTRA_ANGULAR50

If the intra-prediction mode is equal to or smaller than INTRA_ANGULAR9, and if the intra-prediction mode is larger than or is equal to INTRA_ANGULAR-10

If the intra-prediction mode is equal to or larger than INTRA_ANGULAR59, and if the intra-prediction mode is smaller than or is equal to INTRA_ANGULAR76

Figure 23:
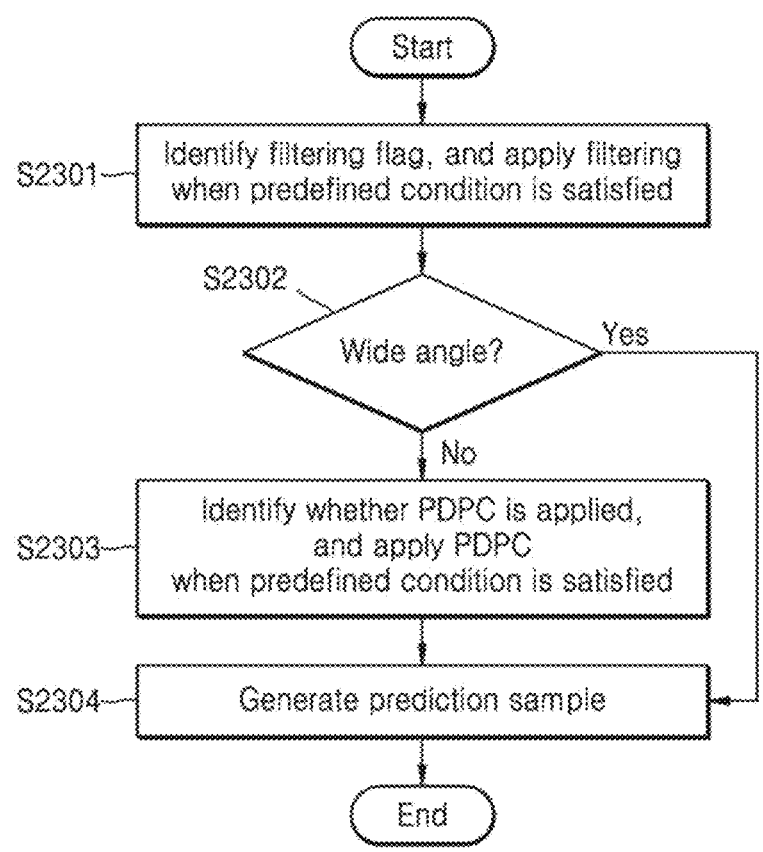
FIG. 23 is a flowchart illustrating an example of an intra-prediction filtering method according to an embodiment of the present disclosure.

FIG. 23 is a flowchart illustrating an example of an intra-prediction filtering method according to an embodiment of the present disclosure. The PDPC and filtering described above with reference to FIG. 10 to FIG. 15 may have similar effects. In the present detailed description, filtering described above with reference to FIG. 10 to FIG. 15 may mean filtering determined by the filter flag. Therefore, according to an embodiment of the present disclosure, if filtering by the filter flag is applied or if particular filtering determined by the filter flag is applied, the encoder/decoder may not apply the PDPC. Alternatively, if the PDPC is applied, the encoder/decoder may not apply filtering by the filter flag or may not apply particular filtering determined by the filter flag. As an embodiment, if the intra-prediction mode corresponds to a wide angle, the filter flag may be configured to be a pre-configured value. Therefore, if the intra-prediction mode corresponds to a wide angle, the encoder/decoder may not apply the PDPC. That is, according to an embodiment of the present disclosure, the encoder/decoder may determine whether to apply the PDPC, on the basis of the filter flag. The filter flag may be the filter flag described above with reference to FIG. 10 to FIG. 15.

Referring to FIG. 23, the encoder/decoder may determine and identify a filter flag on the basis of an intra-prediction mode or the width and the height of a block and may perform filtering if configured conditions are satisfied (S2301). The encoder/decoder may identify whether the intra-prediction mode corresponds to a wide angle (S2302). If the intra-prediction mode corresponds to a wide angle, a prediction sample may be generated without performing a PDPC (S2304). If the intra-prediction mode does not correspond to a wide angle, the encoder/decoder may identify whether a condition to perform a PDPC is satisfied, and if the condition to perform a PDPC is satisfied, the encoder/decoder may perform a PDPC and then generate a prediction sample (S2303 and S2304).

Figure 24:
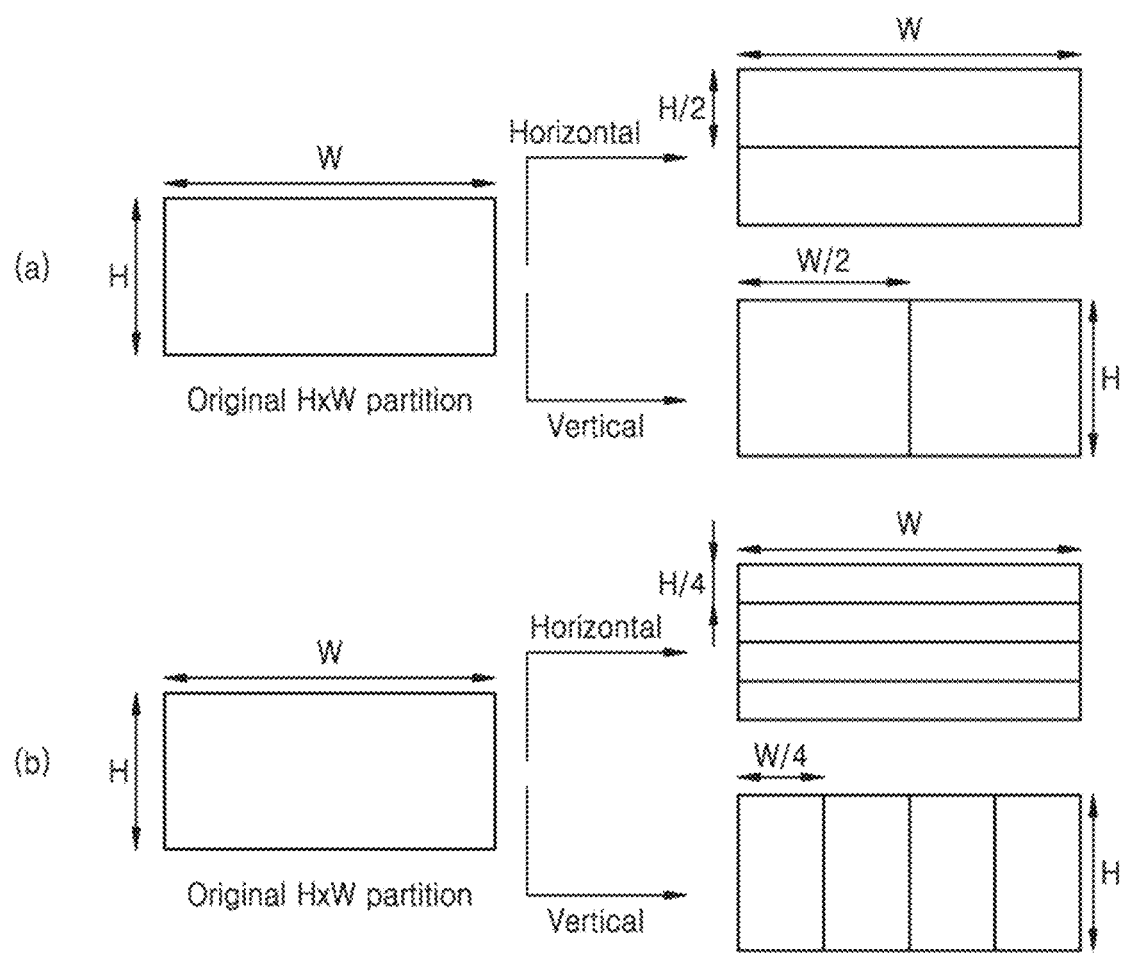
FIG. 24 is a diagram of an example of an intra sub-partitions coding method according to an embodiment of the present disclosure.

FIG. 24 is a diagram of an example of an intra sub-partitions coding method according to an embodiment of the present disclosure. In the present disclosure, the intra sub-partitions coding mode may be called ISP, an intra sub partition mode, etc. In addition, in the present disclosure, sub-partitioning may be called partitioning, sub-splitting, splitting, etc. In addition, in the present disclosure, a sub partition may indicate a sub-partitioned block, and may be called a sub block, a split block, a sub-split block, etc.

According to an embodiment of the present disclosure, ISP may correspond to a method for splitting a coding unit (a current block) into sub blocks (sub partitions) to perform prediction-coding. In addition, according to an embodiment of the present disclosure, if ISP is performed, the encoder/decoder may perform vertical or horizontal splitting. Referring to FIG. 24, an example of vertical or horizontal splitting is illustrated. If a coding unit is horizontally split, the width of a sub partition or a sub block may be the same as that of the coding unit before the partitioning. In addition, if a coding unit is vertically split, the height of a sub partition may be the same as that of the coding unit before the partitioning.

In addition, according to an embodiment of the present disclosure, sub-partitioning may be performed according to a pre-configured number and shape. In addition, the pre-configured number and shape may be determined on the basis of a block size. For example, the encoder/decoder may restrict the use of ISP for a pre-configured block size. For example, the encoder/decoder may restrict the use of ISP for a block size smaller than a predefined threshold. For example, the encoder/decoder may restrict the use of ISP for a 4×4 block. In addition, the encoder/decoder may perform sub-partitioning on the basis of a pre-configured number according to a pre-configured block size. For example, the encoder/decoder may perform sub-partitioning on a block having a size smaller than a particular threshold, to have N1 sub partitions and may perform sub-partitioning on a block having a size equal to or larger than the threshold to have N2 sub partitions. In addition, N2 may be larger than N1. For example, the threshold may be 8×8. In addition, N1 may be 2. In addition, N2 may be 4. Therefore, according to a combination with the above embodiment, ISP may not be performed for a 4×4 block, sub-partitioning may be performed for 4×8 and 8×4 blocks to each have two sub partitions, and sub-partitioning may be performed for the remaining blocks to each have four sub partitions.

Referring to FIG. 24, FIG. 24(a) illustrates an example of sub-partitioning allowing two sub partitions, and FIG. 24(b) illustrates an example of sub-partitioning allowing four sub partitions. According to an embodiment of the present disclosure, if sub-partitioning is horizontally performed to generate N blocks, a value obtained by dividing the height of a coding unit by N may be the same as the height of a sub partition. In addition, if a sub-partitioning is vertically performed to generate N blocks, a value obtained by dividing the width of a coding unit by N may be the same as the width of a sub partition.

According to an embodiment of the present disclosure, the decoder may entropy-decode, inverse-quantize, and inverse-transform coefficients sent from the encoder in each sub partition in ISP, so as to generate a residual signal. An intra-prediction is performed for a sub-partition, and the residual signal is added to a prediction signal, thereby generating a reconstruction signal. Therefore, the reconstruction signal of the sub partition may be used to generate a prediction signal of another sub partition later, and this procedure may be repeated. Through this repeated procedure, a more accurate prediction signal is generated so that a coding efficiency may be enhanced.

According to an embodiment, when ISP is used, there may be multiple processing orders. Processing orders may r be orders for performing prediction/reconstruction on multiple sub partitions. In an embodiment, the processing orders may include a normal order and a reversed order. In the normal order, a firstly processed sub partition may be a sub partition including a top-left sample of a CU. In addition, in a case of horizontal sub-partitioning, the encoder/decoder may perform prediction/reconstruction downwardly therefrom and in a case of vertical sub-partitioning, the encoder/decoder may perform the same in the right direction therefrom. In addition, in the reversed order, a firstly processed sub partition may be a sub partition including a bottom-left sample of a CU, and a prediction/reconstruction may be performed upwardly therefrom. In addition, a firstly processed sub partition may be a sub partition including the top-left sample of a CU, and a prediction/reconstruction may be performed in the left direction therefrom.

In addition, in an embodiment, whether ISP is available may be different according to whether multiple reference lines are used in an intra-prediction, or according to which line is used among multiple reference lines. For example, if a line which has an index other than 0 among multiple reference lines is used, the encoder/decoder may determine not to use ISP. In addition, a block size of a coefficient group for which entropy-coding of a sub partition is performed may vary. For example, the encoder/decoder may configure a coefficient group to have 16 samples. For example, a relation between a block size/a coefficient group size may be as follows: (1×N, N≥16/1×16), (N×1, N≥16/16×1), (2×N, N≥8/2×8), (N×2, N>8/8×2), (all the other possible M×N/4×4 cases).

In addition, in an embodiment, if ISP is used, at least one sub partition among sub partitions may have a non-zero coded block flag (CBF). Therefore, if the number of sub partitions is n, (n−1) number of sub partitions which are firstly processed have a zero CBF, the encoder/decoder may determine that an n-th sub partition has a non-zero CBF. In the present disclosure, a cu_cbf value of the non-zero CBF may be 1. In addition, in the present disclosure, a cu_cbf value of the zero CBF may be 0. In addition, cu_cbf may be a value indicating whether a syntax related to transformation exists. Furthermore, the syntax related to transformation may have a transform tree syntax structure. In addition, the syntax related to transformation may be a syntax signaled through a transform tree (transform_tree). In addition, if cu_cbf is 0, there may be no syntax related to transformation. In addition, if cu_cbf is 1, there may exist a syntax related to transformation. If cu_cbf is 1, the encoder/decoder may perform a coding process for a transform tree. If there is no cu_cbf, a cu_cbf value may be determined on the basis of cu_skip_flag. For example, if cu_skip_flag is 1, cu_cbf may be 0. In addition, if cu_skip_flag is 0, cu_cbf may be 1.

As described above, cu_skip_flag may indicate whether a skip mode is used, and if the skip mode is applied, there may be no residual signal. That is, the skip mode may indicate a mode of directly performing reconstruction without adding a residual signal to a prediction signal. Therefore, if cu_skip_flag is 1, there may be no syntax related to transformation.

According to an embodiment of the present disclosure, when intra-prediction is not used, the decoder may parse cu_cbf. In the case that cu_skip_flag is 0, the decoder may parse cu_cbf. If merge_flag is 0, the decoder may parse cu_cbf. The merge_flag indicates a syntax element indicating whether a merge mode is applied. The conditions described above may be combined and then performed. For example, if the current prediction mode is not MODE_INTRA and merge_flag is 0, the decoder may parse cu_cbf. Alternatively, if the current prediction mode is MODE_INTER and merge_flag is 0, the decoder may parse cu_cbf. The reason is that if an inter prediction is applied rather than a merge mode, the skip mode may be used, or may not be used.

In an embodiment, if ISP is used, the encoder/decoder may use a limited intra-prediction mode. For example, if ISP is used, the encoder may signal a prediction mode used for intra-prediction of a current block in an MPM list, to the decoder. Moreover, if ISP is used, the encoder/decoder may not use the DC mode. In addition, if ISP is used, the encoder/decoder may use different signaling or different MPM list configuring methods according to which partitioning is used among horizontal/vertical sub-partitioning. In a case of ISP horizontal splitting, the encoder/decoder may prioritize the horizontal intra mode. In contrast, in a case of ISP vertical splitting, the encoder/decoder may prioritize the vertical mode.

Table 4 below shows an example of a coding unit syntax structure according to an embodiment of the present disclosure.

TABLE 4

| | Descriptor |
|---|---|
| coding unit( x0, y0, cbWidth, cbHeight, treeType ) { | |
|   if( tile group type != 1 ) { | |
|     if( treeType != DUAL TREE CHROMA ) | |
|       cu_skip_flag[ x0 ][ y0 ] | ae(v) |
|     if( cu skip flag[ x0 ][ y0 ] = = 0 ) | |
|       pred_mode_flag | ae(v) |
|   } | |
|   if( CuPredMode[ x0 ][ y0 ] = = MODE INTRA ) { | |
|     if( pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm flag[ x0 ][ y0 ] ) { | |
|       while( !byte alinged( ) ) | |
|         pcm_alignment_zero_bit | f(1) |
|       pcm sample( cbWidth, cbHeight, treeType) | |
|     } else { | |
|       if( treeType = = SINGLE TREE || treeType = = DUAL TREE LUMA ) { | |
|         if( ( y0% CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY || cbHeigbt <= MaxTbSizeY ) && | |
|           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|           cbWidth <= MaxTbSizeY && cbHeight <= MaxTbSizeY ) | |
|           intra_subpartitions_split_flag[ x0 ][ y0 ] | ae(v) |
|         if (intra_luma_ref_idx[ x0 ][ y0 ] = = 0 && | |
|           intra subpartitions mode flag[ x0 ][ y0 ] = = 0 ) | |
|           intra_luma_mpm_flag[ x0 ][ y0 ] | ae(v) |
|         if( intra luma mpm flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE TREE || treeType = = DUAL TREE CHROMA ) | |
|         intra_chroma_pred_mode[ x0 ][ y0 ] | ae(v) |
|     } | |
|   } else if( treeType != DUAL TREE CHROMA ) {/* MODE INTER */ | |
|   } | |
|   if( !pcm flag[ x0 ][ y0 ] ) { | |
|     if( CuPredMode[ x0 ][ y0 ] != MODE INTRA && cu skip flag[ x0 ][ y0 ] = = 0 ) | |
|       cu_cbf | ae(v) |
|     if( cu cbf ) | |
|       transform tree( x0, y0, cbWidth, cbHeight, TreeType ) | |
|   } | |
| } | |

Referring to Table 4, an intra-prediction and ISP-related syntax may be signaled through a coding unit syntax. In Table 4, an inter prediction-related syntax may be omitted from the coding unit syntax structure. In Table 4, intra_subpartitions_mode_flag may be signaling (or a syntax element) indicating whether to use (or apply) ISP. If intra_subpartitions_mode_flag is 1, this may indicate that ISP is used. That is, if intra_subpartitions_mode_flag is 1, this may indicate that a current block is split into sub partitions so as to be transformed and reconstructed.

Referring to Table 4, in an embodiment of the present disclosure, a condition to parse intra_subpartitions_mode_flag may be previously defined. Alternatively, a condition enabling the use of ISP may be previously defined. For example, as described above, a condition relating to which reference line is used among multiple reference lines may be previously defined. Referring to Table 4, intra_luma_ref_idx is a syntax element indicating which reference sample line is used among multiple reference lines. There may be a condition related to a block size. For example, a condition for a case where the width of a current block is smaller or equal to MaxTbSizeY, or the height thereof is smaller or equal to Max TbSize Y may be defined. The variable (or parameter) Max TbSize Y indicates the maximum size of a transform block. The width and the height of a current block may be expressed as cbWidth and cbHeight, respectively.

Referring to Table 4, the decoder may parse intra_subpartitions_mode_flag in a case of (cbWidth<=MaxTbSizeY||cbHeight<=MaxTbSize Y). In addition, the decoder may parse intra_subpartitions_mode_flag in a case of (cbWidth*cbHeight>MinTbSizeY*MinTbSizeY). According to an embodiment, MaxTbSizeY and MinTbSizeY may be variables (or parameters) indicating the maximum and minimum transformable sizes, respectively. In an embodiment, according to a combination between the above conditions, if (cbWidth<=MaxTbSizeY||cbHeight<=Max TbSize Y) && (cbWidth*cbHeight>MinTbSize Y*MinTbSize Y) is satisfied, the decoder may parse intra_subpartitions_mode_flag. If there is no intra_subpartitions_mode_flag, the decoder may determine (or infer) that ISP is not used. That is, if there is no intra_subpartitions_mode_flag, the decoder may infer 0 as the value thereof. MaxTbSizeY may be a value related to the maximum transformable size. MinTbSizeY may be a value related to the minimum transformable size.

According to an embodiment of the present disclosure, intra_subpartitions_split_flag may be a signaling (or a syntax element) indicating whether sub-partitioning is performed horizontally or vertically. In addition, intra_subpartitions_split_flag may be parsed if intra_subpartitions_mode_flag is 1. In addition, intra_subpartitions_split_flag may be parsed if a pre-configured block size condition is satisfied. For example, the pre-configured block size configuration may correspond to (cbWidth<=MaxTbSizeY && cbHeight<=MaxTbSizeY). In addition, if there is no intra_subpartitions_split_flag, the decoder may infer 0 as the value thereof. In addition, intra_subpartitions_split_flag of 0 may indicate horizontal splitting, and intra_subpartitions_split_flag of 1 may indicate vertical splitting.

According to an embodiment of the present disclosure, the encoder/decoder may determine whether to perform sub-partitioning and the split direction of the sub-partitioning on the basis of an ISP mode flag (i.e., intra_subpartitions_mode_flag) and an ISP split flag (i.e., intra_subpartitions_split_flag). That is, as described above with reference to Table 4, intra_subpartitions_split_flag may exist. In addition, the split direction may be determined on the basis of intra_subpartitions_split_flag. In addition, whether to perform splitting and the split direction may be determined on the basis of intra_subpartitions_split_flag and intra_subpartitions_mode_flag. Table 5 below is a table showing an example of an ISP split type.

TABLE 5

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

Referring to Table 5, the encoder/decoder may determine not to split a current coding block in a case where intra_subpartitions_mode_flag is 0. In addition, an IntraSubPartitionsSplitType value may be 0 and a split type may be expressed as ISP_NO_SPLIT. The IntraSubPartitionsSplitType indicates a variable (or parameter) indicating a sub partition split type. The encoder/decoder may determine to split a current coding block in a case where intra_subpartitions_mode_flag is 1. Also, the encoder/decoder may determine whether the splitting is horizontal splitting or vertical splitting on the basis of intra_subpartitions_split_flag. Referring to Table 5, an IntraSubPartitionsSplitType value may be configured by (1+intra_subpartitions_split_flag). If IntraSubPartitionsSplitType is 1, horizontal splitting may be performed, and the type of splitting may be expressed as ISP_HOR_SPLIT. If IntraSubPartitionsSplitType is 2, vertical splitting may be performed, and the type of splitting may be expressed as ISP_VER_SPLIT.

However, in the embodiments of Table 4 and Table 5 described above, there may be a case where only one of the width or the height of a current coding block is smaller than or equal to MaxTbSizeY, and the other one is larger than MaxTbSizeY. Even in this case, the decoder may parse intra_subpartitions_mode_flag. That is, even in this case, ISP may be used. However, there may be no intra_subpartitions_split_flag because a condition to parse intra_subpartitions_split_flag is not satisfied. In this case, intra_subpartitions_split_flag may be inferred to be a pre-configured value. Therefore, an ISP split type may be fixed to be horizontal splitting or vertical splitting. If intra_subpartitions_split_flag is inferred to be 0 as in the embodiment described above, the ISP split type may be fixed to be the horizontal direction. In this case, there occurs a problem in which transformation may not be easy when the width of a current coding block is larger than MaxTbSizeY. Hereinafter an embodiment for solving this problem will be described.

According to an embodiment of the present disclosure, if there is no intra_subpartitions_split_flag, the encoder/decoder may infer the value thereof on the basis of a block size. Alternatively, when there is no intra_subpartitions_split_flag, the value thereof may be inferred on the basis of Max TbSize Y and the width or the height of a current coding block. Alternatively, when there is no intra_subpartitions_split_flag, the encoder/decoder may make an inference on the basis of whether the width or the height of a current coding block is larger than or is smaller than MaxTbSize Y. Alternatively, when there is no intra_subpartitions_split_flag, the encoder/decoder may make an inference on the basis of which one of the width or the height of a current coding block is larger than Max TbSize Y. Alternatively, when there is no intra_subpartitions_split_flag, the encoder/decoder may make an inference to transform a sub partition in both the horizontal direction and the vertical direction. Alternatively, when there no is intra_subpartitions_split_flag, the encoder/decoder may make an inference such that both the width and the height of a sub partition are smaller than or are equal to Max TbSizeY.

In an embodiment, if cbHeight (i.e., the height of a current coding block) is larger than MaxTbSizeY (cbHeight>MaxTbSize Y), the encoder/decoder may perform splitting such that the height of a sub partition is smaller than or equal to MaxTbSizeY. If cbHeight is larger than MaxTbSize Y (cbHeight>MaxTbSizeY), the encoder/decoder may infer horizontal splitting. If cbWidth (i.e., the width of a current coding block) is larger than MaxTbSizeY (cbWidth>MaxTbSize Y), the encoder/decoder may perform splitting such that the width of a sub partition is smaller than or equal to MaxTbSize Y. If cbWidth is larger than MaxTbSizeY (cbHeight>MaxTbSizeY), the encoder/decoder may infer vertical splitting.

In an embodiment of the present disclosure, the encoder/decoder may infer intra_subpartitions_split_flag on the basis of the width or the height of a current coding block according to the following methods.

For example, if cbHeight is larger than MaxTbSizeY (cbHeight>MaxTbSizeY), intra_subpartitions_split_flag may be inferred to be 0. Otherwise, if cbWidth is larger than Max TbSize Y (cbWidth>Max TbSize Y), intra_subpartitions_split_flag may be inferred to be 1. Otherwise, intra_subpartitions_split_flag may be inferred to be 0.

Alternatively, for example, if cbHeight is larger than MaxTbSize Y (cbHeight>MaxTbSizeY), intra_subpartitions_split_flag may be inferred to be 1. Otherwise, intra_subpartitions_split_flag may be inferred to be 0.

Alternatively, for example, if cbWidth is larger than MaxTbSizeY (cbWidth>MaxTbSizeY), intra_subpartitions_split_flag may be inferred to be 1. Otherwise, intra_subpartitions_split_flag may be inferred to be 0.

Alternatively, for example, if cbWidth is smaller than or equal to MaxTbSize Y (cbWidth<=MaxTbSizeY) and cbHeight is smaller than or equal to MaxTbSize Y (cbHeight<=MaxTbSizeY), intra_subpartitions_split_flag may be inferred to be 0. Otherwise, if cbHeight is larger than MaxTbSizeY (cbHeight>MaxTbSizeY), intra_subpartitions_split_flag may be inferred to be 1. Otherwise, intra_subpartitions_split_flag may be inferred to be 0.

In the above embodiments, intra_subpartitions_split_flag of 0 indicates horizontal splitting, intra_subpartitions_split_flag of 1 indicates vertical splitting, and a case where ISP_HOR_SPLIT and ISP_VER_SPLIT are 1 and 2, respectively has been described. However, even if horizontality and verticality are expressed by opposite values, embodiments may be applied by the same method described above.

Table 6 below shows an example of a coding unit syntax structure according to an embodiment of the present disclosure.

TABLE 6

| | Descriptor |
|---|---|
| coding unit( x0, y0, cbWidth, cbHeight, treeType ) { | |
|   if( tile group type != I ) { | |
|     if( treeType != DUAL TREE CHROMA ) | |
|       cu_skip_flag[ x0 ][ y0 ] | ae(v) |
|     if( cu skip flag[ x0 ][ y0 ] = = 0 ) | |
|       pred_mode_flag | ae(v) |
|   } | |
|   if( CuPredMode[ x0 ][ y0 ] = = MODE INTRA ) { | |
|     if( pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm flag[ x0 ][ y0 ] ) { | |
|       while( !byte_aligned( ) ) | |
|         pcm_alignment_zero_bit | f(1) |
|       pcm sample( cbWidth, cbHeight, treeType) | |
|     } else { | |
|       if( treeType = = SINGLE TREE | | treeType = = DUAL TREE LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY && cbHeight <= MaxTbSizeY ) && | |
|           ( cbWidth * cbHeight > MinTbSizeY * MinTbSizeY )) | |
|           intra_subpartitions_mode_flag[ x0 ][ y0 ] | ae(v) |
|         if( intra subpartitions mode flag[ x0 ][ y0 ] = = 1 ) | |
|           intra_subpartitions_split_flag[ x0 ][ y0 ] | ae(v) |
|         if (intra_luma_ref_idx[ x0 ][ y0 ] = = 0 && | |
|           intra subpartitions mode flag[ x0 ][ y0 ] = = 0 ) | |
|           intra_luma_mpm_flag[ x0 ][ y0 ] | ae(v) |
|         if( intra luma mpm flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE TREE | | treeType = = DUAL TREE CHROMA ) | |
|         intra_chroma_pred_mode[ x0 ][ y0 ] | ae(v) |
|     } | |
|   } else if( treeType != DUAL TREE CHROMA ) { /* MODE INTER */ | |
|   } | |

TABLE 6-continued

| | Descriptor |
|---|---|
| if( !pcm flag[ x0 ][ y0 ] ) {<br>  if( CuPredMode[ x0 ][ y0 ] != MODE INTRA && cu skip flag[ x0 ][ y0 ] = = 0 )<br>    cu_cbf<br>  if( cu cbf )<br>    transform tree( x0, y0, cbWidth, cbHeight, treeType )<br>  }<br>} | ae(v) |

Table 6 shows an example of a syntax structure for solving the problems described with reference to Table 4 and Table 5. According to an embodiment, a condition for parsing intra_subpartitions_mode_flag and a condition for parsing intra_subpartitions_split_flag may be defined to be the same. Alternatively, conditions related to a block size among conditions for parsing intra_subpartitions_mode_flag and conditions for parsing intra_subpartitions_split_flag may be defined to be the same. Alternatively, an intra_subpartitions_mode_flag parsing condition may be included in an intra_subpartitions_split_flag parsing condition. Alternatively, a condition related to a block size among intra_subpartitions_mode_flag parsing conditions may be included in a condition related to a block size among intra_subpartitions_split_flag parsing conditions. Alternatively, if intra_subpartitions_mode_flag is 1, the decoder may parse intra_subpartitions_split_flag regardless of whether other conditions are satisfied.

Referring to Table 6, if both the width and the height of a current coding block are smaller than or equal to MaxTbSizeY, ISP may be applicable. That is, if both the width and the height of a current coding block are smaller than or equal to MaxTbSizeY, the decoder may parse intra_subpartitions_mode_flag. In addition, if intra_subpartitions_mode_flag is 1, the decoder may parse intra_subpartitions_split_flag without identifying whether other conditions are satisfied.

In another embodiment, even if both the width and the height of a current coding block are larger than MaxTbSizeY (i.e., cbWidth>MaxTbSizeY && cbHeight>MaxTbSize Y), parsing of intra_subpartitions_mode_flag may be possible. In this case, both the width and the height of a current coding block are larger than MaxTbSizeY, and thus horizontal splitting and/or vertical splitting may both be applicable. The encoder/decoder may infer a split type on the basis of another condition without signaling for a split type.

Table 7 below shows an example of a coding unit syntax structure according to an embodiment of the present disclosure.

TABLE 7

| | Descriptor |
|---|---|
| coding unit( x0, y0, cbWidth, cbHeight, treeType ) {<br>  if( tile group type != I ) {<br>    if( treeType != DUAL TREE CHROMA )<br>      cu_skip_flag[ x0 ][ y0 ]<br>    if( cu skip flag[ x0 ][ y0 ] = = 0 )<br>      pred_mode_flag<br>  }<br>  if( CuPredMode[ x0 ][ y0 ] = = MODE INTRA ) {<br>    if( pcm_enabled_flag &&<br>      cbWidth >= MinIpcmCbSizeY && cbWidth <= MaxIpcmCbSizeY &&<br>      chHeight >= MinIpcmCbSizeY && cbHeight <= MaxIpcmCbSizeY )<br>      pcm_flag[ x0 ][ y0 ]<br>    if( pcm flag[ x0 ][ y0 ] ) {<br>      while( !byte aligned( ) )<br>        pcm_alignment_zero_bit<br>      pcm sample( cbWidth, chHeight, treeType)<br>    } else {<br>      if( treeType = = SINGLE TREE \| \| treeType = = DUAL TREE LUMA ) {<br>        if( (y0 % CtbSizeY 1 ) > 0 )<br>          intra_luma_ref_idx[ x0 ][ y0 ]<br>        if (intra_luma_ref_idx[ x0 ][ y0 ] = = 0 &&<br>          ( cbWidth <= N*MaxTbSizeY \| \| chHeight N*MaxTbSizeY ) &&<br>          ( cbWidth * cbHeight > MinTbSizeY * MinTbSizeY ))<br>          intra_subpartitions_mode_flag[ x0 ][ y0 ]<br>        if( intra_subpartitions_mode_flag[ x0 ][ y0 ] = = 1 &&<br>          cbWidth <= MaxTbSizeY && chHeight <= MaxTbSizeY )<br>          intra_subpartitions_split_flag[ x0 ][ y0 ]<br>        if (intra_luma_ref_idx[ x0 ][ y0 ] = = 0 &&<br>          intra subpartitions mode flag[ x0 ][ y0 ] = = 0 )<br>          intra_luma_mpm_flag[ x0 ][ y0 ]<br>        if( intra luma mpm flag[ x0 ][ y0 ] )<br>          intra_luma_mpm_idx[ x0 ][ y0 ]<br>        else<br>          intra_luma_mpm_remainder[ x0 ][ y0 ]<br>      }<br>      if( treeType = = SINGLE TREE \| \| treeType = = DUAL TREE CHROMA )<br>        intra_chroma_pred_mode[ x0 ][ y0 ]<br>    } | ae(v)<br><br>ae(v)<br><br><br><br><br><br>ae(v)<br><br>f(1)<br><br><br><br><br>ae(v)<br><br><br><br>ae(v)<br><br><br>ae(v)<br><br><br>ae(v)<br><br>ae(v)<br><br>ae(v)<br><br><br>ae(v) |

TABLE 7-continued

| | Descriptor |
|---|---|
| ```
  } else if( treeType != DUAL TREE CHROMA ) { /* MODE INTER */
  }
  if( !pcm_flag[ x0 ][ y0 ] ) {
    if( CuPredMode[ x0 ][ y0 ] != MODE_INTRA && cu_skip_flag[ x0 ][ y0 ] = = 0 )
      cu_cbf
    if( cu_cbf )
      transform_tree( x0, y0, cbWidth, cbHeight, treeType )
  }
}
``` | ae(v) |

As described above, N sub partitions may be generated in ISP. Transformation is performed in a unit of sub partitions in ISP. Therefore, according to an embodiment of the present disclosure, even in a case where the width and the height of a current coding block are larger than MaxTbSizeY, if the width and the height of a sub partition are smaller than or equal to MaxTbSizeY, it may be possible to use ISP. Therefore, referring to FIG. 21, if the width or the height of a current coding block is smaller than or equal to N*Max TbSizeY, the decoder may parse intra_subpartitions_mode_flag. Alternatively, if the width or the height of a current coding block is smaller than or equal to N*MaxTbSizeY, the encoder/decoder may use ISP. N may have a random integer value.

Even in this particular case, there may occur a problem as described with reference to Table 4 and Table 5. To solve this problem, the embodiment described with reference to Table 6 may be applied. For example, if the width or the height of a current coding block is larger than N*MaxTbSizeY, the encoder/decoder may determine (or infer) both the width and the height of a sub partition to be smaller than or equal to Max TbSize Y. Alternatively, if the width or the height of a current coding block is larger than N*MaxTbSizeY, it may be determined (or inferred) that vertical splitting and horizontal splitting are performed, respectively.

According to an embodiment of the present disclosure, if ISP is used, a transformation kernel may be determined on the basis of the intra-prediction mode (predModeIntra). Alternatively, if ISP is used, a horizontal transform type (trTypeHor) or a vertical transform type (trTypeVer) indicating a transformation kernel may be determined on the basis of the intra-prediction mode (predModeIntra). In addition, the encoder/decoder may use the DC mode for ISP. In this case, a transformation kernel of the DC mode may be configured to be the same as that of the planar mode. For example, in a case where the planar mode is used when ISP is used, if the horizontal transformation type and the vertical transformation type are 1 and 1, respectively, even when the DC mode is used, the horizontal transform type and the vertical transform type may be determined to be 1 and 1, respectively. In another embodiment, the encoder/decoder may determine 0 and 0 as the horizontal transform type and the vertical transform type, respectively, in a case where the DC mode is used when ISP is used.

Figure 25:
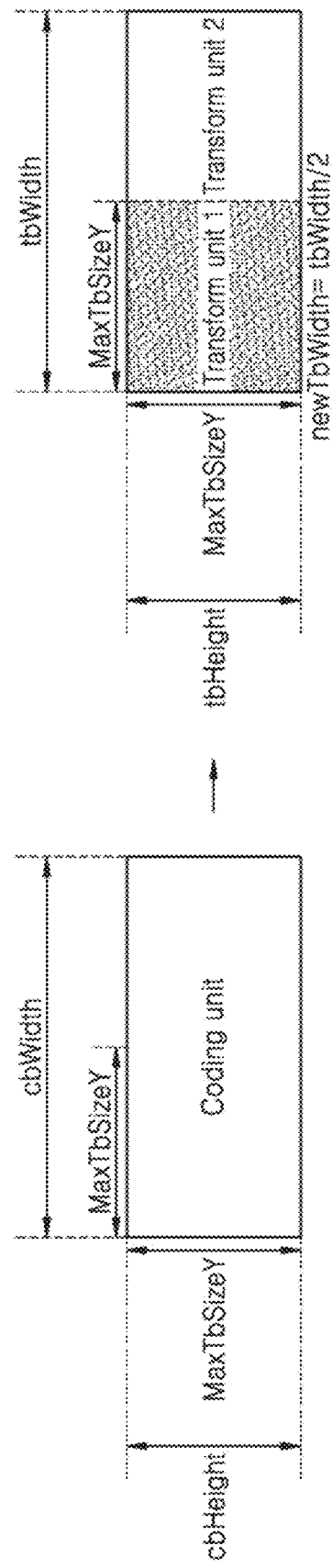
FIG. 25 is a diagram illustrating a coding unit and a transform unit according to an embodiment of the present disclosure.

FIG. 25 is a diagram illustrating a coding unit and a transform unit according to an embodiment of the present disclosure. According to an embodiment of the present disclosure, there may be a unit (i.e., a unit of transformation processing) of blocks in which a transformation is performed. According to an embodiment, the unit of blocks in which a transformation is performed may be equal to or smaller than a coding unit or a unit of blocks in which a prediction is performed. In the present detailed description, the unit of blocks in which a transformation is performed may be called a transform unit (TU). In addition, the size of a transform unit may be limited by a maximum transform size. For example, the width or the height of a transform unit may be limited by a maximum transform size. More specifically, the width or the height of a transform unit may be determined to be equal to or smaller than a maximum transform size. In addition, the maximum transform size may vary according to the luma component and the chroma component.

In an embodiment, if a coding unit (CU) or a prediction unit (PU) is larger than the maximum transform size, the CU or the PU may be split into multiple TUs. If there is a TU, among the multiple TUs, which is greater than the maximum transform size, the TU greater than the maximum transform size may be split and thus multiple TUs may be generated. All multiple TUs generated through this procedure may be equal to or smaller than the maximum transform size. In the present disclosure, being greater than the maximum transform size may mean that the width or the height is larger than the maximum transform size, and being equal to or smaller than the maximum transform size may mean that both the width and the height are smaller than or equal to the maximum transform size. According to an embodiment, an operation of splitting a TU on the basis of the maximum transform size may be performed in a stage such as performing an intra-prediction, or processing of a residual signal. The operation of splitting a TU on the basis of the maximum transform size may be recursively performed and may be performed until the TU becomes smaller than or equal to the maximum transform size.

Referring to FIG. 25, the width and the height of a coding unit may be expressed as cbWidth and cbHeight, respectively. In addition, the width and the height of a TU may be tbWidth and tbHeight, respectively. In addition, MaxTbSizeY may be the maximum transform size. More specifically, MaxTbSizeY may be the maximum transform size with respect to the luma component. The tbWidth and tbHeight of a TU before splitting may be cbWidth and cbHeight, respectively. A TU may be split according to whether tbWidth or tbHeight is larger than the maximum transform size, and tbWidth or tbHeight may be updated. In an embodiment of FIG. 25, cbWidth may be larger than MaxTbSize Y (cbWidth>MaxTbSizeY). In this case, a TU may be split, and tb Width and tbHeight of the TU before splitting may be cb Width and cbHeight, respectively. Therefore, tbWidth is larger than MaxTbSize Y (tbWidth>MaxTbSizeY) and thus a TU may be split into a first transform unit and a second transform unit. The newTbWidth indicating the width of a new TU may be defined by tbWidth/2. In the present disclosure, a unit and a block may be used together. In addition, a unit may be a concept of including one or more blocks. For example, a unit may be a concept of including a block related to luminance and one or more blocks related to chroma.

Table 8 below shows an example of a decoding process for a coding unit for which intra-prediction coding has been performed, according to an embodiment of the present disclosure.

TABLE 8

8.4 Decoding process for coding units coded in intra prediction mode
8.4.1 General decoding process for coding units coded in intra prediction mode
Inputs to this process are:
- a luma location ( xCb, yCb ) specifying the top-left sample of the current coding block relative to the top-left luma
  sample of the current picture,
- a variable cbWidth specifying the width of the current coding block in luma samples,
- a variable cbHeight specifying the height of the current coding block in luma samples,
- a variable treeType specifying whether a single or a dual tree is used and if a dual tree is used, it specifies whether the
  current tree corresponds to the luma or chroma components.
Output of this process is a modified reconstructed picture before in-loop filtering.
The derivation process for quantization parameters as specified in clause 8.7.1 is invoked with the luma location
( xCb, yCb ), the width of the current coding block in luma samples cbWidth and the height of the current coding block in
luma samples cbHeight, and the variable treeType as inputs.
When treeType is equal to SINGLE_TREE or treeType is equal to DUAL_TREE_LUMA, the decoding process for luma
samples is specified as follows:
    1. The variable MipSizeId[ x ][ y ] for x = xCb..xCb + cbWidth − 1 and y = yCb..yCb + cbHeight − 1 is derived as
       follows:
       - If both cbWidth and cbHeight are equal to 4, MipSizeId[ x ][ y ] is set equal to 0.
       - Otherwise, if both cbWidth and cbHeight are less than or equal to 8, MipSizeId[ x ][ y ] is set equal to 1.
       - Otherwise, MipSizeId[ x ][ y ] is set equal to 2.
    2. The luma intra prediction mode is derived as follows:
       - If intra_mip_flag[ xCb ][ yCb ] is equal to 1, IntraPredModeY[ x ][ y ] with x = xCb..xCb + cbWidth − 1
         and y = yCb..yCb + cbHeight − 1 is set to be equal to intra_mip_mode[ xCb ][ yCb ].
       - Otherwise, the derivation process for the luma intra prediction mode as specified in clause 8.4.2 is invoked
         with the luma location ( xCb, yCb ) the width of the current coding block in luma samples cbWidth and the
         height of the current coding block in luma samples cbHeight as input.
    3. The variable predModeIntra is set equal to IntraPredModeY[ xCb ][ yCb ]
    4. The general decoding process for intra blocks as specified in clause 8.4.5.1 is invoked with the sample location
       ( xTb0, yTb0 ) set equal to the luma location ( xCb, yCb ), the variable nTbW set equal to cbWidth, the variable
       nTbH set equal to cbHeight, predModeIntra, treeType, and the variable cIdx set equal to 0 as inputs, and the
       output is a modified reconstructed picture before in-loop filtering.
When treeType is equal to SINGLE_TREE or treeType is equal to DUAL_TREE_CHROMA, and when
ChromaArrayType is not equal to 0, the decoding process for chroma samples is specified as follows:
    1. The derivation process for the chroma intra prediction mode as specified in clause 8.4.3 is invoked with the luma
       location ( xCb, yCb ), the width of the current coding block in luma samples cbWidth and the height of the current
       coding block in luma samples cbHeight as input.
    2. The general decoding process for intra blocks as specified in clause 8.4.5.1 is invoked with the sample location
       ( xTb0, yTb0 ) set equal to the chroma location ( xCb / SubWidthC , yCb / SubHeightC ), the variable nTbW set
       equal to ( cbWidth / SubWidthC ), the variable nTbH set equal to ( cbHeight / SubHeightC ), the variable
       predModeIntra set equal to IntraPredMode[ xCb ][ yCb ], treeType, and the variable cIdx set equal to 1, and the
       output is a modified reconstructed picture before in-loop filtering.
    3. The general decoding process tor intia blocks as specified in clause 8.4.5.1 is invoked with the sample location
       ( Tb0, yTb0 ) set equal to the chroma location ( xCb / SubWidthC , yCb / SubHeightC ) the variable nTbW set
       equal to ( cbWidth / SubWidth ), the variable nTbH set equal to ( cbHeight / SubHeightC ), the variable
       predModeIntra set equal to IntraPredMode[ xCb ][ yCb ], treeType, and the variable cIdx set equal to 2, and the
       output is a modified reconstructed picture before in-loop filtering According to an embodiment of the present disclosure, the process in Table 8 may invoke the process of Table 9 described below. The process in Table 8 may include a decoding process for the luma component, and a decoding process for the chroma component. In addition, processing of the chroma component may include processing of a Cb component and processing of a Cr component. Furthermore, in connection with processing of the luma component and processing of the chroma component in clause 8.4.1 in Table 8, the procedure of clause 8.4.5.1 in Table 9 described below may be performed by using different inputs.

Referring to Table 8, cbWidth and cbHeight in clause 8.4.1 may indicate the width and the height of a current coding block, respectively, and the values thereof may be based on a luma sample. That is, for example, if the size of a luma block is 16×16, the size of a corresponding chroma block may be 8×8 according to a color format, and cbWidth and cbHeight values for the chroma coding block may be 16 and 16, respectively. In addition, (xCb, yCb) may show the coordinates of a current coding block. The values thereof may indicate the coordinates of a top-left sample of the current coding block and may be expressed on the basis of the coordinates of a top-left sample of a current picture. In addition, (xCb, yCb) may be values expressed on the basis of a luma sample.

Referring to clause 8.4.1 in Table 8, the decoder may perform processing on the luma component if a tree type (treeType) is SINGLE_TREE or DUAL_TREE_LUMA. In the procedure, the decoder may invoke the decoding process of Table 9 described below. A sample location input may be (xCb, yCb), and the width and the height thereof may be cbWidth and cbHeight, respectively. In addition, if the tree type is SINGLE_TREE or DUAL_TREE_CHROMA, the decoder may perform processing on the chroma component. In the procedure, the decoder may invoke the decoding process of Table 9 described below and may invoke a decoding process for each of Cb and Cr components. A sample location input may be (xCb/SubWidthC, yCb/SubHeightC) and the width and the height thereof may be cbWidth/SubWidthC and cbHeight/SubHeightC. Moreover, cIdx may be a value other than 0, and may be 1 for Cb and may be 2 for Cr. The SubWidthC and SubHeightC may be pre-configured values based on a color format. The values of SubWidthC and SubHeightC may be 1 or 2 and may be a value corresponding to the relation between the luma component and the chroma component.

Therefore, when the decoding process of Table 9 described below is performed, an input may be transformed such that the luma component corresponds to the luma component, and the chroma component corresponds to the chroma component. That is, width (nTbW), height (nTbH), coordinates (xTb0, yTb0) in clause 8.4.5.1 in Table 9 described later may be based on the number of chroma samples when the decoding process is performed for the chroma component. Width (nTbW), height (nTbH), and coordinates (xTb0, yTb0) may be based on the number of luma samples when the decoding process is performed for the luma component.

According to an embodiment of the present disclosure, the tree type may indicate a block partitioning relation between the luma component and the chroma component or indicate which component for which processing is performed currently. For example, if the tree type is SINGLE_TREE, the block partitioning of the luma component and the block partitioning of the chroma component may be the same. Alternatively, if the tree type is SINGLE_TREE, the block partitioning of the luma component and the block partitioning of the chroma component may be dependent on each other. In addition, if the tree type is SINGLE_TREE, processing of the luma component and processing of the chroma component may both be performed. In addition, if the tree type is DUAL_TREE_LUMA or DUAL_TREE_CHROMA, the block partitioning of the luma component and the block partitioning of the chroma component may be different from each other. Alternatively, if the tree type is DUAL_TREE_LUMA or DUAL_TREE_CHROMA, the block partitioning of the luma component and the block partitioning of the chroma component may be dependent on each other. In addition, if the tree type is DUAL_TREE_LUMA, processing of the luma component may be performed. In addition, if the tree type is DUAL_TREE_CHROMA, processing of the chroma component may be performed.

Table 9 below shows an example of a decoding process for an intra block according to an embodiment of the present disclosure.

TABLE 9

8.4.5 Decoding process for intra blocks
8.4.5.1 General decoding process for intra blocks
Inputs to this process are:
- a sample location ( xTb0, yTb0 ) specifying the top-left sample of the current transform block relative to the top-left sample of the current picture,
- a variable nTbW specifying the width of the current transform block,
- a variable nTbH specifying the height of the current transform block,
- a variable predModeIntra specifying the intra prediction mode,
- a variable cIdx specifying the colour component of the current block,
Output of this process is a modified reconstructed picture before in-loop filtering.
The maximum transform block width maxTbWidth and height maxTbHeight are derived as follows:
    maxTbWidth = ( cIdx == 0 ) ? MaxTbSizeY : MaxTbSizeY / SubWidthC     (8-41)
    maxTbHeight = ( cIdx == 0 ) ? MaxTbSizeY : MaxTbSizeY / SubHeightC     (8-42)
The luma sample location is derived as follows:
    ( xTbY, yTbY ) = ( cIdx == 0 ) ? ( xTb0, yTb0 ) : ( xTb0 * SubWidthC, yTb0 * SubHeightC )     (8-43)
Depending on maxTbSize, the following applies:
(A) - If IntraSubPartitionsSplitType is equal to ISP_NO_SPLIT and nTbW is greater than maxTbWidth or nTbH is greater than maxTbHeight, the following ordered steps apply.
    1. The variables newTbW and newTbH are derived as follows:
        newTbW = ( nTbW > maxTbWidth ) ? ( nTbW / 2 ) : nTbW     (8-44)
        newTbH = ( nTbH > maxTbHeight ) ? ( nTbH / 2 ) : nTbH     (8-45)
    2. The general decoding process for intra blocks as specified in this clause is invoked ...
(B) - Otherwise, the following ordered steps apply:
    - The variables nW, nH, nPbW, pbFactor, xPartInc and yPartInc are derived as follows:
        nW = IntraSubPartitionsSplitType == ISP_VER SPLIT ? nTbW / NumIntraSubPartitions : nTbW     (8-46)
        nH = IntraSubPartitionsSplitType == ISP_HOR_SPLIT ? nTbH / NumIntraSubPartitions : nTbH     (8-47)
        xPartInc = ISP_VER SPLIT ? 1 : 0     (8-48)
        yPartInc = ISP_HOR_SPLIT ? 1 : 0     (8-49)
        nPbW = Max( 4 , nW )     (8-50)
        pbFactor = nPbW / nW     (8-51)
    - The variables xPartIdx and yPartIdx are set equal to 0.
    - For i = 0..NumIntraSubPartitions − 1, the following applies:
        1. The variables xPartIdx and yPartIdx are updated as follows:
            xPartIdx = xPartIdx + xPartInc     (8-52)
            yPartIdx = yPartIdx + yPartInc     (8-53)
            xPartPbIdx = xPartIdx % pbFactor     (8-54)
    2. When xParPbIdx is equal to 0, the intra sample prediction process as specified in clause 8.4.5.2 is invoked with the location ( xTbCmp, yThCmp ) set equal to ( xTb0 − nW * xPartIdx, yTb0 + nH * yPartIdx ), the intra prediction mode predModeIntra, the transform block width nTbW and height nTbH set equal to nPbW and nH, the coding block width nCbW and height nCbH set equal to nTbW and nTbH and the variable cIdx as inputs, and the output is an (nPbW)×(nH) array predSamples.
    3. The scaling and transformation process as specified in clause 8.7.2 is invoked with the luma location ( xTbY, yTbY ) set equal to ( xTbY + nW * xPartIdx, yTbY + nH * yPartIdx ), the variable cIdx, the transform width nTbW and the transform height nTbH set equal to nW and nH as inputs, and the output is an (nW)×(nH) array resSamples.
    4. The picture reconstruction process for a colour component as specified in clause 8.7.5 is invoked with the transform block location ( xTbComp, yTbComp ) set equal to
     ( xTb0 + nW * xPartIdx, yTb0 + nH * yPartIdx ), the transform block width nTbW, the transform block height nTbH set equal to nW and nH, the variable cIdx, the (nW)×(nH) array predSamples[ x ][ y ] with x = xPartPbIdx * nW..( xPartbIdx + 1 ) * nW − 1, y = 0..nH − 1, and the (nW)×(nH) array resSamples as inputs, and the output is a modified reconstructed picture before in-loop filtering.

The decoding process for an intra block according to Table 9 may include TU splitting described above. In Table 9, TU splitting described above may be performed before the stage of clause 8.4.5.1. Referring to Table 9, maxTbWidth and maxTbHeight may correspond to the maximum transform sizes corresponding to a color component, and may correspond to width and height, respectively. As described above, MaxTbSize Y may be a maximum transform size with respect to the luma component. Therefore, with respect to the chroma component (i.e., cIdx is not 0), max TbWidth may be MaxTbSize Y/SubWidthC, and maxTbHeight may be MaxTbSizeY/SubHeightC. In addition, both maxTbWidth and maxTbHeight may be MaxTbSizeY with respect to the luma component. These are shown by the equations (8-41) and (8-42). In addition, there may be a procedure of transforming coordinates to be luma-based values. The equation (8-43) may show the procedure and the values may be calculated on the basis of cIdx, SubWidthC, and SubHeightC. The result thereof may be (xTbY, yTbY).

Referring to Table 9, if 1) IntraSubPartitionsSplitType is ISP_NO_SPLIT, and 2) nTbW is larger than max TbWidth, or nTbH is larger than max TbHeight, operations (1,2) in the area indicated by (A) may be performed. These operations may correspond to TU splitting described with reference to FIG. 25. In addition, an operation of retrieving the process in Table 9 again may be included in the area (A) in Table 9. The decoder may invoke a decoding process for a TU which has been split. As described above, if IntraSubPartitionsSplitType is ISP_NO_SPLIT, ISP may not be used. Otherwise, that is, if 1) IntraSubPartitionsSplitType is not ISP_NO_SPLIT, or 2) nTbW is smaller than or equal to max TbWidth, and nTbH is smaller than or equal to max TbHeight, an operation in the area indicated by (B) in Table 9 may be performed. Therefore, if ISP is used, the decoder may perform a decoding process in the area indicated by (B). In the area (B), an intra-prediction (number 2 in area (B)), a scaling (or inverse quantization), a transformation (number 3 in area (B)), a reconstruction (number 4 in area (B)), etc. may be performed.

According to an embodiment of the present disclosure, when ISP is performed, the width or the height of a sub partition may be limited. More specifically, when ISP is performed, the width or the height of a sub partition for prediction may be limited. More specifically, when ISP is performed, the width of a sub partition for prediction may be limited. Being limited may mean that a small size is not used. This may allow easy implementation. For example, in an implementation, a memory may be stored and invoked in a unit of rows. In this case, when a row of a sub partition is invoked, more rows than are actually used may be required to be invoked, and if the width of the sub partition is small, throughput may be reduced. For example, if a CU size is 4×N or 8×N, the width of an ISP sub partition may be able to be 1 or 2 according to the above description.

In addition, when ISP is performed, the size of a sub partition for prediction is limited Thus, a predicted size and a transformed size may be different from each other. When ISP is performed, the size of a sub partition for prediction is limited. Thus, a size in which a prediction is performed and a size in which a reconstruction is performed may be different from each other. For example, when ISP is used, a predicted size may be larger than or equal to a transformed or reconstructed size.

Therefore, according to an embodiment of the present disclosure, when ISP is performed, the width of a sub partition for prediction may be defined to be 4 or more. Hereinafter, a case where the minimum value of the width of a sub partition for ISP prediction is 4 are mainly described. However, the present disclosure is not limited thereto, a random minimum value other than 4 may be configured, and the same description may be applied.

According to an embodiment of the present disclosure, the decoder may configure nW and nH. For example, nW and nH may be a transform width and a transform height which are scaled and transformed, (number 3 in area (B) in Table 9) or are reconstructed (number 4 in area (B) in Table 9), respectively. In addition, if the width of an ISP sub partition is smaller than the minimum value (i.e., if an nTbW/NumIntraSubPartitions value is smaller than the minimum value when ISP vertical splitting is performed), nW may not be a transform width of prediction (number 2 in area (B) in Table 9). If the width of an ISP sub partition is smaller than the minimum value (i.e., if a nTbW/NumIntraSubPartitions value is smaller than the minimum value when an ISP vertical splitting is performed), a transform width for prediction (number 2 in area (B) in Table 9) may be the minimum value of the width of a sub partition of an ISP prediction. In addition, in a case (the case where the width of an ISP sub partition is larger than or equal to the minimum value, ISP horizontal splitting is performed, or ISP is not used) other than the case where the width of an ISP sub partition is smaller than the minimum value (i.e., if an nTbW/NumIntraSubPartitions value is smaller than the minimum value when ISP vertical splitting is performed), nW may be a transform width for prediction (number 2 in area (B) in Table 9). Furthermore, nH may be a transform height for prediction (number 2 in area (B) in Table 9). Referring to the equation (8-46), if IntraSubPartitionsSplitType is ISP_VER_SPLIT, nW may be configured by nTbW/NumIntraSubPartitions. In addition, if IntraSubPartitionsSplitType is not ISP_VER_SPLIT (i.e., if ISP is horizontally split or ISP is not used), nW may be configured to be nTbW. In addition, referring to the equation (8-47), if IntraSubPartitionsSplitType is ISP_HOR_SPLIT, nH may be configured by nTbH/NumIntraSubPartitions. In addition, if IntraSubPartitionsSplitType is not ISP_HOR_SPLIT (i.e., if ISP is vertically split or an ISP is not used), nH may be configured to be nTbH.

According to an embodiment of the present disclosure, the decoder may configure xPartInc and yPartInc. When ISP is used, a sub partition index or a sub partition position may be indicated on the basis of xPartInc and yPartInc, and prediction, transformation, and reconstruction operations, etc. may be performed by using the same. In Table 9, referring to the equation (8-48), in a case of ISP_VER_SPLIT, xPartInc may be configured to be 1, and in the other cases (a case where ISP is not be used, or a case of ISP_HOR_SPLIT), the same may be configured to be 0. Referring to the equation (8-49), in a case of ISP_HOR_SPLIT, yPartInc may be configured to be 1, and in the other cases (a case where ISP is not be used, or a case of ISP_VER_SPLIT), the same may be configured to be 0. Referring to the equations (8-52) and (8-53), xPartIdx and yPartIdx may be configured on the basis of xPartInc and yPartInc. xPartIdx and yPartIdx may indicate an ISP sub partition index, and may be an index for the x-axis, and an index for the y-axis, respectively. Alternatively, xPartIdx and yPartIdx may indicate a sub partition index for scaling, transformation, and reconstruction. If ISP is not used, xPartIdx and yPartIdx may both be 0. If ISP is used, NumIntraSubPartitions becomes larger than 1, and referring to area (B) in Table 9, processes indicated by numbers 1, 2, 3, and 4 are performed with respect to "For i=0 . . NumIntraSubPartitions-1", wherein for loop is operated so that xPartIdx or yPartIdx is increased. xPartIdx or yPartIdx is increased with respect to the component among xPartInc or yPartInc, which is not 0 (equations (8-52) and (8-53)). In addition, Referring to Table 9, xPartIdx and yPartIdx may be configured to be 0 before for loop is started.

According to an embodiment of the present disclosure, the decoder may configure the size of a prediction block. More specifically, the width of a prediction block may be configured. Referring to Table 9, the width of a prediction block may be nPbW. In addition, the minimum width of a prediction block may be minPbW. In addition, minPbW may be the minimum value of the width of an ISP sub partition described above. According to an embodiment, nPbW may be configured on the basis of minPbW. In addition, nPbW may be configured on the basis of nW. According to an embodiment, nPbW may be configured as Equation 17 below.

$$nPbW = \text{Max}(\min PbW, nW) \quad \text{[Equation 17]}$$

Referring to Equation 17, nPbW may always be equal to or larger than minPbW. This is because that if nW is smaller than minPbW, nPbW is configured to be minPbW, if nW is larger than minPbW, nPbW is configured to be nW, and if nW is identical to minPbW, nPbW is configured to be minPbW. In addition, a case where nW is smaller than minPbW may correspond to a case where ISP is used, and vertical splitting is performed.

In addition, according to an embodiment of the present disclosure, minPbW may be 4. Therefore, referring to the equation (8-50) in area (B) in Table 9, nPbW may be configured as Equation 18 below.

$$nPbW = \text{Max}(4, nW) \quad \text{[Equation 18]}$$

In Equation 18, Max(x, y) may be a function of providing, as a result value, x if x is larger than or equal to y (x>=y) and providing y if x is smaller than y (x<y).

In addition, in an embodiment, referring to Table 9, the decoder may configure pbFactor. For example, the decoder may configure the same as shown in the equation (8-51). In addition, the decoder may configure the index of a prediction block on the basis of pbFactor. For example, the decoder may configure the x-axis index of a prediction block on the basis of pbFactor. Referring to the equation (8-54) in area (B) of Table 9, the x-axis index of a prediction block may be xPartPbIdx. xPartPbIdx may be configured by (xPartIdx % pbFactor). The operator % may indicate a modular calculation. That is, x % y may be the remainder after x is divided by y. If nW is 4 or more, nPbW may be nW. Therefore, pbFactor may be 1. Therefore, xPartPbIdx may always be 0. If nW is smaller than 4, nPbW may be 4(or minPbW). Therefore, pbFactor may be 4/nW, and pbFactor may be a value larger than 1. If nW is 1 or 2, pbFactor may be 4 and 2, respectively. There may be a case where xPartPbIdx is not 0.

More specifically, there may be a case where nTbW is 4 and NumIntraSubPartitions is 2. NumIntraSubPartitions may indicate the number of sub partitions by ISP. For example, if ISP is used, the same may indicate the number of transform blocks. If ISP is used, and the width of a sub partition is larger than or equal to the minimum value, the number of sub partitions by the ISP may be the number of prediction blocks. If ISP is not used, the number of sub partitions caused by ISP may be 1. For example, if nTbW is 4, nTbH is 8, ISP is used, and vertical splitting is performed, the number of sub partitions by the ISP may be 2. nW may be 2, nPbW may be 4, and pbFactor may be 2. In this case, xPartIdx may be 0 or 1, and when xPartIdx is 0, xPartPbIdx may be 0, and when xPartIdx is 1, xPartPbIdx may be 1. In addition, there may be a case where nTbW is 4, and the number of sub partitions by an ISP is 4. For example, if nTbW is 4, nTbH is larger than 8, an ISP is used, and vertical splitting is performed, the number of sub partitions by the ISP may be 4. In this case, nW may be 1, nPbW may be 4, and pbFactor may be 4. In this case, xPartIdx may be 0, 1, 2, or 3, and when xPartIdx is 0, xPartPbIdx may be 0, and when xPartIdx is not 0, xPartPbIdx may not be 0.

In addition, there may be a case where nTbW is 8, and the number of sub partitions by an ISP is 4. For example, if nTbW is 8, nTbH is larger than 4, an ISP is used, and vertical splitting is performed, the number of sub partitions by the ISP may be 4. In this case, nW may be 2, nPbW may be 4, and pbFactor may be 2. In this case, xPartIdx may be 0, 1, 2, or 3, and when xPartIdx is 0, 1, 2, and 3, xPartPbIdx may be 0, 1, 0, and 1, respectively. If ISP is not used, nPbW may be nW, pbFactor may be 1, and xPartPbIdx may be 0.

In addition, as described above, the decoder may invoke a prediction process, which may be the process described in number 2 in area (B) in Table 9. According to an embodiment of the present disclosure, the decoder may invoke a prediction process or may not invoke the same on the basis of xPartPbIdx. For example, if xPartPbIdx is 0, the decoder may invoke a prediction process. Conversely, if xPartPbIdx is not 0, the decoder may not invoke a prediction process. In addition, referring to Table 9, the decoder may identify that the top-left position of a current transform block, which is an input of a prediction process, is (xTb0+nW*xPartIdx, yTb0+nH*yPartIdx). Therefore, the position may indicate the top-left position of each sub partition if ISP is used. In addition, the width and the height of a transform block, which is inputs of a prediction process, may be nPbW and nH, respectively. In addition, an output of a prediction process may be predSamples, which is a prediction sample array having a size of (nPbW×nH). The width and the height of a coding block, which is inputs of a prediction process, may be nTbW and nTbH, respectively. As described above, nPbW is used as a transform width, which is an input of a prediction process, and thus a prediction process may be performed by using a transform width larger than the width of a sub partition of ISP. In addition, a transform width, which is an input of a prediction process, may be larger than or equal to the minimum value of the width of a sub partition for ISP prediction when ISP is used. Every time the prediction process is performed, the decoder may generate and prepare a reference sample and perform an intra sample prediction.

In addition, in an embodiment, the decoder may invoke a scaling and transformation process (number 3 in area (B) in Table 9), and a reconstruction process (number 4 in area (B) in Table 9). In addition, a transform width and a transform height, which are inputs, may be nW and nH, respectively. The decoder may invoke the processes regardless of xPartPbIdx. Therefore, there may be a case where a scaling and transformation process or a reconstruction process is performed without performing a prediction process for a particular i, a xPartIdx, and a yPartIdx. There may be a case where a transform width of a prediction process and a transform width of a scaling and transformation process or a reconstruction process are all different from each other with respect to a particular i (a xPartIdx, and a yPartIdx). An output of a scaling and transformation process or a reconstruction process may be an array of (nW×nH).

In an embodiment of the present disclosure, configuring nPbW, pbFactor, and xPartPbIdx, performing a prediction process on the basis of xPartPbIdx and configuring nPbW as a transform width, which is an input of the prediction process, may be for the purpose of guaranteeing that, when ISP is used, a prediction process is performed with at least the minimum value of the width of a sub partition. However, the process of Table 9 may also be performed for the chroma component as described with reference to Table 8. In addition, it is possible that the width or the height of a chroma block is smaller than 4. Therefore, if the width of a chroma block is smaller than 4, nPbW may be configured to be 4, and a prediction process may be performed using 4 as a transform block width input. In this case, a prediction may be performed with a value larger than the size of a prediction block actually required. If ISP is used, all the prediction blocks generated as outputs are used eventually, and a prediction sample which is not to be used in a described chroma component case may be generated. In addition, accordingly, reference samples may be generated and prepared more than required, and prediction blocks may be generated more than required. In addition, in a case where a prediction of a value larger than a width to be actually used is performed, if the planar mode, the DC mode, the PDPC, etc. is performed, a part far away from a prediction sample part to be actually used is used as a reference. Therefore, a coding performance may degrade.

Table 10 below shows an example of a decoding process for an intra block according to an embodiment of the present disclosure.

TABLE 10

- Otherwise, the following ordered steps apply:
  - The variables nW, nH, nPbW, pbFactor, xPartInc and yPartInc are derived as follows:

| | |
    |---|---|
    | nW = IntraSubPartitionsSplitType == ISP_VER_ SPLIT ? nTbW / NumIntraSubPartitions : nTbW | (8-46) |
    | nH = IntraSubPartitionsSplitType == ISP_HOR_SPLIT ? nTbH / NumIntraSubPartitions : nTbH | (8-47) |
    | xPartInc = ISP_VER_SPLIT ? 1 : 0 | (8-48) |
    | yPartInc = ISP_HOR_SPLIT ? 1 : 0 | (8-49) |
    | nPbW = ( cIdx == 0 ) ? Max( 4 , nW ) : nW | (8-50) |
    | pbFactor = nPbW / nW | (8-51) |

- The variables xPartIdx and yPartIdx are set equal to 0.
  - For i = 0..NumIntraSubPartitions − 1, the following applies:
    1. The variables xPartIdx and yPartIdx are updated as follows:

| | |
        |---|---|
        | xPartIdx = xPartIdx + xPartInc | (8-52) |
        | yPartIdx = yPartIdx + yPartInc | (8-53) |
        | xPartPbIdx = xPartIdx % pbFactor | (8-54) |

2. When xPartPbIdx is equal to 0, the intra sample prediction process as specified in clause 8.4.5.2 is invoked with the location ( xTbCmp, yTbCmp ) set equal to ( xTb0 + nW * xPartIdx, yTb0 + nH * yPartIdx ), the intra prediction mode predModeIntra, the transform block width nTbW and height nTbH set equal to nPbW and nH, the coding block width nCbW and height nCbH set equal to nTbW and nTbH, and the variable cIdx as inputs, and the output is an (nPbW)×(nH) array predSamples.
    3 The scaling and transformation process as specified in clause 8.7.2 is invoked with the luma location ( xTbY, yTbY ) set equal to ( xTbY + nW * xPartIdx, yTbY + nH * yPartIdx ), the variable cIdx, the transform width nTbW and the transform height nTbH set equal to nW and nH as inputs, and the output is an (nW)×(nH) array resSamples.
    4. The picture reconstruction process for a colour component as specified in clause 8.7.5 is invoked with the transform block location ( xTbComp, yTbComp ) set equal to ( xTb0 + nW * xPartIdx, yTb0 − nH * yPartIdx ), the transform block width nTbW, the transform block height nTbH set equal to nW and nH, the variable cIdx, the (nW)×(nH) array predSamples[ x ][ y ] with x = xPartPbIdx * nW..( xPartPbIdx + 1 ) * nW − 1, y = 0..nH − 1, and the (nW)×(nH) array resSamples as inputs, and the output is a modified reconstructed picture before in-loop filtering.

According to an embodiment of the present disclosure, Table 10 may substitute part (B) of Table 9 described above. In addition, the embodiment of Table 10 may be proposed to solve the problem described with reference to Table 9. In addition, a description overlapping with the description given with reference to Table 9 is omitted. According to an embodiment of the present disclosure, the encoder/decoder may not use ISP for the chroma component. In addition, as described above, an operation of configuring nPbW, and configuring a transform width of a prediction process to be nPbW may be to limit the width of a sub partition when ISP is used.

That is, according to an embodiment of the present disclosure, the encoder/decoder may configure nPbW on the basis of what the color component is. What the color component is may be indicated by cIdx. If cIdx is 0, the color component may be the luma component, and if cIdx is not 0 (e.g., 1 or 2), the color component may be the chroma component. According to an embodiment, the encoder/decoder may configure nPbW to be Max(minPbW, nW) with respect to the luma component, and may configure nPbW to be nW with respect to the chroma component. Alternatively, the encoder/decoder may configure nPbW to be Max (minPbW, nW) with respect to the luma component, and may configure nPbW to be nTbW with respect to the chroma component. This is because ISP may not be used for the chroma component. Therefore, nPbW may be configured as Equation 19 below.

$$nPbW = (cIdx == 0) ? \text{Max}(\min PbW, nW) : nW \quad \text{[Equation 19]}$$

According to an embodiment, minPbW may be 4. Therefore, referring to the equation (8-50) in Table 10, nPbW may be configured as Equation 20 below.

$$nPbW = (cIdx == 0)? \text{Max}(4, nW): nW \quad \text{[Equation 20]}$$

Therefore, if nW is smaller than 4 with respect to the luma component (this case may be part of a case where ISP is used and vertical splitting is performed), the encoder/decoder may configure 4 as nPbW. In addition, if nW is larger than or equal to 4 with respect to the luma component (this case may be part of a case where ISP is not used, or ISP is used), the encoder/decoder may configure nW as nPbW. In addition, nPbW may be configured to be nW with respect to the chroma component. This case may be the same as the case where, if ISP is not used with respect to the chroma component, nTbW is used as nPbW.

In an embodiment of the present disclosure, nTbW and nTbH may be values obtained by modifying the width and the height of a coding block on the basis of the maximum transform size. In addition, if ISP is used, nW and nH may be the width and the height of an ISP sub-partition, and if ISP is not used, nW and nH may be nTbW and nTbH. In addition, if a coding block width is larger than the maximum transform size, nTbW may be the maximum transform size, and if a coding block width is smaller than or equal to the maximum transform size, nTbW may be the coding block width. In addition, if a coding block height is larger than the maximum transform size, nTbH may be the maximum transform size, and if a coding block height is smaller than or equal to the maximum transform size, nTbH may be the coding block height.

In the embodiment of Table 10, nPbW is configured to be nW with respect to the chroma component, and thus nW may be used as an input transform block width of a prediction process. Therefore, an unnecessary or non-efficient prediction process (the process may include generation and preparation of a reference sample, generation of a prediction sample, etc.) may be removed. That is, if a chroma block width is smaller than 4, the width of a transform block of a prediction process may be prevented from being configured to be 4. In addition, in the embodiment of Table 10, pbFactor for the chroma component may always be 1.

According to an additional embodiment of the present disclosure, a procedure of configuring 1 as the number of sub partitions with respect to the chroma component may be added. Alternatively, a procedure of configuring an ISP split type for the chroma component to be ISP_NO_SPLIT may be added. Referring to Table 8 to Table 10, the number of sub partitions or an ISP split type is used for the chroma component as well as the luma component, and there may not exist an independent parameter for each color component. Therefore, this is because, in a case of SINGLE_TREE, if ISP is used for the luma component, sub-partitioning may be performed for the chroma component by using the number of sub partitions or an ISP split type value of a case where ISP is used.

According to another embodiment, the number of sub partitions or an ISP split type value may separately exist for the chroma component. For example, the number or the ISP split type value may be NumIntraSubPartitions[cIdx] or IntraSubPartitionsSplitType[cIdx]. Therefore, if cIdx is not 0, the encoder/decoder may configure or infer 1 and ISP_NO_SPLIT as NumIntraSubPartitions[cIdx] and IntraSubPartitionsSplitType[cIdx], respectively.

According to another embodiment, variables such as nW, nH, xPartInc, and yPartInc in Table 10 may be configured on the basis of a color component. For example, the above variables may be configured as Equation 21 below.

$$nW = \quad \text{[Equation 21]}$$
$$(Intra \text{ SubPartitions Split Type} == \text{ISP\_VER\_SPLIT \&\&}$$
$$cIdx == 0)? nTbW / NumIntra \text{ SubPartitions}: nTbW$$
$$nH =$$
$$(Intra \text{ SubPartitions Split Type} == \text{ISP\_HOR\_SPLIT \&\& } cIdx == 0)?$$
$$nTbH / NumIntra \text{ SubPartitions}: nTbH$$
$$x\text{Part } Inc = \text{ISP\_VER\_SPLIT \&\& } cIdx == 0 ? 1 : 0$$
$$y\text{Part } Inc = \text{ISP\_HOR\_SPLIT \&\& } cIdx == 0 ? 1 : 0$$

Table 11 below shows an example of a decoding process for an intra block according to an embodiment of the present disclosure.

TABLE 11

- Otherwise, the following ordered steps apply:
  - The variables nW, nH, nPbW, pbFactor, xPartInc and yPartInc are derived as follows:

| | |
|---|---|
| nW = IntraSubPartitionsSplitType == ISP_VER_SPLIT ? nTbW / NumIntraSubPartitions : nTbW | (8-46) |
| nH = IntraSubPartitionsSplitType == ISP_HOR_SPLIT ? nTbH / NumIntraSubPartitions : nTbH | (8-47) |
| xPartInc = ISP_VER_SPLIT ? 1 : 0 | (8-48) |
| yPartInc = ISP_HOR_SPLIT ? 1 : 0 | (8-49) |
| nPbW = Max( 4 , nw ) | (8-50) |
| pbFactor = nPbW / nW | (8-51) |

- The variables xPartIdx and yPartIdx are set equal to 0.
  - For i = 0..NumintraSubPartitions − 1, the following applies:
    1. The variables xPartIdx and yPartIdx are updated as follows:

| | |
|---|---|
| xPartIdx = xPartIdx + xPartInc | (8-52) |
| yPartIdx = yPartIdx + yPartInc | (8-53) |
| xPartPbIdx = xPartIdx % pbFactor | (8-54) |

2. When xPartPbIdx is equal to 0, the intra sample prediction process as specified in clause 8.4.5.2 is invoked with the location ( xTbCmp, yTbCmp ) set equal to ( xTb0 + nW * xPartIdx, yTb0 + nH * yPartIdx ), the intra prediction mode predModeIntra, the transform block width nTbW and height nTbH set equal to ( cIdx == 0 ? nPbW : nW ) and nH, the coding block width nCbW and height nCbH set equal to nTbW and nTbH, and the variable cIdx as inputs, and the output is an (nPbW)×(nH) array predSamples when cIdx is equal to 0 and an (nW)×(nH) array predSamples when cIdx is not equal to 0.

TABLE 11-continued

3. The scaling and transformation process as specified in clause 8.7.2 is invoked with the luma location ( xTbY, yTbY ) set equal to ( xTbY + nW * xPartIdx, yTbY + nH * yPartIdx ), the variable cIdx, the transform width nTbW and the transform height nTbH set equal to nW and nH as inputs, and the output is an (nW)×(nH) array resSamples.
4. The picture reconstruction process for a colour component as specified in clause 8.7.5 is invoked with the transform block location ( xTbComp, yTbComp ) set equal to
( xTb0 + nW * xPartIdx, yTb0 + nH * yPartIdx), the transform block width nTbW, the transform block height nTbH set equal to nW and nH, the variable cIdx, the (nW)×(nH) array predSamples[ x ][ y ] with
x = xPartPbIdx * nW..( xPartPbIdx +1 ) * nW − 1, y = 0..nH − 1, and the (nW)×(nH) array resSamples as inputs, and the output is a modified reconstructed picture before in-loop filtering.

According to an embodiment of the present disclosure, Table 11 may substitute part (B) of Table 9 described above. In addition, the embodiment of FIG. 11 may be proposed to solve the problem described with reference to Table 9. In addition, a description overlapping with the description given with reference to Table 9 and Table 10 is omitted.

According to an embodiment of the present disclosure, an input and an output of a prediction process may vary according to what the color component is. For example, an input and an output of a prediction process may vary according to whether or not the color component is the luma component. The prediction process may mean the part invoked in number 2 in Table 11. In addition, the prediction process may include generation and preparation of a reference sample, an intra sample prediction, and the like. According to an embodiment, in a case of the luma component, nPbW may be used as the width of a transform block, which is an input of a prediction process. In this case, the width of an output array of the prediction process may be nPbW.

In addition, according to an embodiment, in a case of the chroma component, nW (or nTbW) may be used as the width of a transform block, which is an input of a prediction process. In this case, the width of an output array of the prediction process may be nW (or nTbW). In the embodiment of Table 11, an input transform block width of a prediction process, is configured to be nW for the chroma component. Therefore, an unnecessary or non-efficient prediction process (the process may include generation and preparation of a reference sample, generation of a prediction sample, etc.) may be removed. That is, if a chroma block width is smaller than 4, the width of a transform block of a prediction process may be prevented from being configured to be 4.

In addition, in the embodiment of Table 11, nPbW may be configured to be 4 or more. Therefore, there may be a case where pbFactor is not 1. For example, if a chroma block width is smaller than 4, nPbW may be configured to be 4, and pbFactor may be configured to be larger than 1. In a case of the chroma component, the number of ISP sub partitions may be 1, and xPartPbIdx is 0 because xPartIdx is only used as 0. Therefore, there may be no problem to perform the processes indicated by numbers 2, 3, and 4 in Table 11.

Table 12 below shows an example of a decoding process for an intra block according to an embodiment of the present disclosure.

TABLE 12

- Otherwise, the following ordered steps apply:
    - The variables nW, nH, nPbW, pbFactor, xPartInc and yPartInc are derived as follows:

| | |
|---|---|
| nW = IntraSubPartitionsSplitType == ISP_VER_SPLIT ? nTbW / NumIntraSubPartitions : nTbW | (8-46) |
| nH = IntraSubPartitionsSplitType == ISP_HOR_SPLIT ? nTbH / NumIntraSubPartitions : nTbH | (8-47) |
| xPartInc = ISP_VER_SPLIT ? 1 : 0 | (8-48) |
| yPartInc = ISP_HOR_ SPLIT ? 1 : 0 | (8-49) |
| nPbW = ( cIdx == 0) ? Max( 4 , nW ) : nW | (8-50) |
| pbFactor = nPbW / nW | (8-51) |
| CbWidth = nTbW | |
| CbHeight = nTbH | |

- The variables xPartIdx and yPartIdx are set equal to 0.
- For i = 0..NumIntraSubPartitions − 1, the following applies:
    1. The variables xPartIdx and yPartIdx are updated as follows:

| | |
|---|---|
| xPartIdx = xPartIdx + xPartInc | (8-52) |
| yPartIdx = yPartIdx + yPartInc | (8-53) |
| xPartPbIdx = xPartIdx % pbFactor | (8-54) |

2. When xPartPbIdx is equal to 0, the intra sample prediction process as specified in clause 8.4.5.2 is invoked with the location ( xTbCmp, yTbCmp ) set equal to ( xTb0 + nW * xPartIdx, yTb0 + nH * yPartIdx ), the intra prediction mode predModeIntra, the transform block width nTbW and height nTbH set equal to nPbW and nH, the coding block width nCbW and height nCbH set equal to CbWidth and CbHeight, and the variable cIdx as inputs, and the output is an (nPbW)×(nH) array predSamples.
   3. The scaling and transformation process as specified in clause 8.7.2 is invoked with the luma location ( xTbY, yTbY ) set equal to ( xTbY + nW * xPartIdx, yTbY + nH * yPartIdx ), the variable cIdx, the transform width nTbW and the transform height nTbH set equal to nW and nH as inputs, and the output is an (nW)×(nH) array resSamples.
   4. The picture reconstruction process for a colour component as specified in clause 8.7.5 is invoked with the transform block location ( xTbComp, yTbComp ) set equal to
   ( xTb0 + nW * xPartIdx, yTb0 + nH * yPartIdx ), the transform block width nTbW, the transform block height nTbH set equal to nW and nH, the variable cIdx, the (nW)×(nH) array predSamples [ x ][ y ] with
   x = xPartPbIdx * nW..( xPartPbIdx + 1 ) * nW − 1, y = 0..nH − 1, and the (nW)×(nH) array resSamples as inputs, and the output is a modified reconstructed picture before in-loop filtering.

Referring to Table 9 to 11 described above, when a prediction process having number 2 is invoked, the width nTbW and the height nTbH of a transform block are configured to be nPbW and nH. Thereafter, the width nCbW and the height nCbH of a coding block are configured to be nTbW and nTbH. Therefore, the width nCbW and the height nCbH of a coding block may be configured to be nPbW and nH. According to an embodiment of the present disclosure, a coding block width and a coding block height may be required when ISP is used. If the coding block width and the coding block height are configured to be nPbW and nH, values corresponding to very short lengths are used, and thus the prediction may not be performed properly. For example, in a case where ISP is used, a coding block width and a coding block height may be used when a reference sample is prepared.

Therefore, according to an embodiment of the present disclosure, when retrieving a prediction process, the decoder may use values that are not updated, as a coding block width and a coding block height. For example, the decoder may use, as a coding block width and a coding block height of a prediction process, a width and a height which are configured out of for loop in Table 12 or are configured before the process indicated by number 2.

Referring to Table 12, CbWidth and CbHeight may be configured to be nTbW and nTbH, respectively. CbWidth and CbHeight may not be updated when the process in Table 12 is operated. In addition, CbWidth and CbHeight may be used as a coding block width and height which are inputs for retrieving a prediction process in number 2 in Table 12.

As another embodiment, when a prediction process is invoked, the decoder may use, as a coding block width and a coding block height, (IntraSubPartitionsSplitType-=ISP_VER_SPLIT? nW*NumIntraSubPartitions:nW) and (IntraSubPartitionsSplitType==ISP_HOR_SPLIT? nH*NumIntraSubPartitions:nH), respectively. Also, in the embodiment, values that are not updated are used. Therefore, the above problem may not occur.

Figure 26:
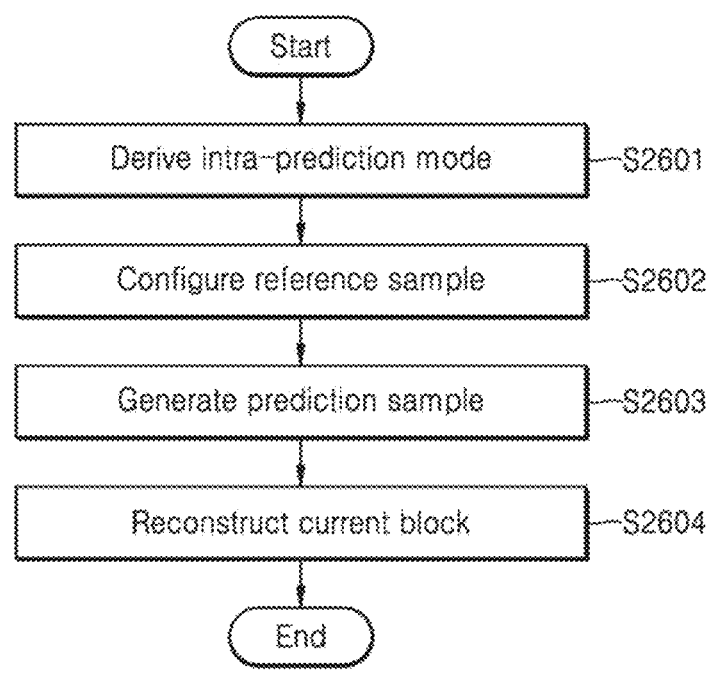
FIG. 26 is a flowchart illustrating an intra-prediction method according to an embodiment of the present disclosure.

FIG. 26 is a flowchart illustrating an intra-prediction method according to an embodiment of the present disclosure. Referring to FIG. 26, for convenience of explanation, a description will be given mainly for the decoder, but the present disclosure is not limited thereto. A multi-estimation prediction-based video signal processing method according to the present embodiment may also be applied to the encoder by a substantially identical method.

The decoder derives an intra-prediction mode of a current block (S2601).

The decoder configures a reference sample around the current block (S2602).

The decoder generates a prediction sample of the current block by using the reference sample on the basis of the intra-prediction mode (S2603).

The decoder reconstructs the current block on the basis of the prediction sample (S2604). Specifically, the decoder may add a residual block to the prediction sample (or a prediction block) so as to generate a reconstruction block of the current block.

As described above, operation S2603 may include: on the basis of a width and a height of the current block, configuring a filter flag value specifying a filter coefficient of an interpolation filter applied to the reference sample; and performing filtering for the reference sample by using an interpolation filter having the filter coefficient specified by the filter flag.

In addition, as described above, the filter flag value may be configured on the basis of a block size variable of the current block, and the block size variable may be derived by summing up log base 2 of the width, and log base 2 of the height, and applying a right shift operation by 1 for the sum.

In addition, as described above, if a vertical horizontal distance minimum value is larger than a predefined particular threshold value, the filter flag value is configured to be 1, and otherwise, the filter flag value is configured to be 0, and the vertical horizontal distance minimum value may be derived to be a smaller value between an absolute value of a difference between the intra-prediction mode and a horizontal mode, and an absolute value of a difference between the intra-prediction mode and a vertical mode.

In addition, as described above, the threshold value may be previously defined according to the block size variable.

In addition, as described above, if a value of the block size variable is 2, the filter flag value may be configured to be 0.

In addition, as described above, if a value of the block size variable is 2, the threshold may be previously defined to be a value that is always larger than or equal to the vertical horizontal distance minimum value.

In addition, as described above, an intra-prediction mode used to derive the vertical horizontal distance minimum value may include an intra-prediction mode of a case where a wide angle intra-prediction is used for the current block.

The above-described embodiments of the present invention may be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in memory and driven by a processor. The memory may be located inside or outside the processor and may exchange data with the processor by various means already known.

Some embodiments may also be implemented in the form of a recording medium including computer-executable instructions such as a program module that is executed by a computer. Computer-readable media may be any available media that may be accessed by a computer and may include all volatile, nonvolatile, removable, and non-removable media. In addition, the computer-readable media may include both computer storage media and communication media. The computer storage media may include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description and all changes or modifications derived from the meaning and range of the appended claims and equivalents thereof are to be interpreted as being included within the scope of present invention.

The invention claimed is:

1. A video signal decoding device comprising a processor, wherein the processor is configured to:
when a prediction mode of a current block is an intra-prediction mode, obtain, from a bitstream, an ISP (Intra Sub Partitions) mode flag indicating whether to apply an ISP mode to the current block, and determine whether to apply the ISP mode to the current block according to the ISP mode flag;
generate a reference sample for the current block;
determine a value of a filter flag for specifying an interpolation filter applied to the reference sample, wherein the interpolation filter includes a plurality of filter coefficients;
generate a prediction sample of the current block by performing filtering for the reference sample by using the interpolation filter specified by the value of the filter flag; and
reconstruct the current block on the basis of the prediction sample,
wherein when it is determined that the ISP mode is applied on the current block, the value of the filter flag is determined to be a first value among a plurality of values, and
wherein when it is determined that the ISP mode is not applied on the current block, the value of the filter flag is determined to be any one among the plurality of values based on a size of the current block,
wherein when the ISP mode is applied on the current block, the current block is split vertically or horizontally into sub partitions for intra prediction.

2. A non-transitory computer-readable medium storing a decoding method,
wherein the decoding method comprises:
when a prediction mode of a current block is an intra-prediction mode, obtaining, from bitstream, an ISP (Intra Sub Partitions) mode flag indicating whether to apply an ISP mode to the current block, and determining whether to apply the ISP mode to the current block according to the ISP mode flag;
generating a reference sample for the current block;
determining a value of a filter flag for specifying an interpolation filter applied to the reference sample, wherein the interpolation filter includes a plurality of filter coefficients;
generating a prediction sample of the current block by performing filtering for the reference sample by using the interpolation filter specified by the value of the filter flag; and
reconstructing the current block on the basis of the prediction sample,
wherein when it is determined that the ISP mode is applied on the current block, the value of the filter flag is determined to be a first value among a plurality of values, and
wherein when it is determined that the ISP mode is not applied on the current block, the value of the filter flag is determined to be any one among the plurality of values based on a size of the current block,
wherein when the ISP mode is applied on the current block, the current block is split vertically or horizontally into sub partitions for intra prediction.

3. A video signal encoding device comprising a processor, wherein the processor is configured to:
when a prediction mode of a current block is an intra-prediction mode, determine whether to apply an ISP (Intra Sub Partitions) mode to the current block and generating an ISP mode flag indicating whether to apply the ISP mode to the current block;
generate a reference sample for the current block;
determine a value of a filter flag for specifying an interpolation filter applied to the reference sample, wherein the interpolation filter includes a plurality of filter coefficients;
generate a prediction sample of the current block by performing filtering for the reference sample by using the interpolation filter specified by the value of the filter flag; and
encode the current block on the basis of the prediction sample,
wherein when it is determined that the ISP mode is applied on the current block, the value of the filter flag is determined to be a first value among a plurality of values, and
wherein when it is determined that the ISP mode is not applied on the current block, the value of the filter flag is determined to be any one among the plurality of values based on a size of the current block,
wherein when the ISP mode is applied on the current block, the current block is split vertically or horizontally into sub partitions for intra prediction.

4. A method of transmitting a bitstream, the method comprising:
when a prediction mode of a current block is an intra-prediction mode, determining whether to apply an ISP (Intra Sub Partitions) mode to the current block and generating an ISP mode flag indicating whether to apply the ISP mode to the current block;
generating a reference sample for the current block;
determining a value of a filter flag for specifying an interpolation filter applied to the reference sample, wherein the interpolation filter includes a plurality of filter coefficients;
generating a prediction sample of the current block by performing filtering for the reference sample by using the interpolation filter specified by the value of the filter flag;
generating encoded data of the current block on the basis of the prediction sample; and
transmitting the bitstream including the encoded data of the current block,
wherein when it is determined that the ISP mode is applied on the current block, the value of the filter flag is determined to be a first value among a plurality of values, and
wherein when it is determined that the ISP mode is not applied on the current block, the value of the filter flag is determined to be any one among the plurality of values based on a size of the current block, wherein when the ISP mode is applied on the current block, the current block is split vertically or horizontally into sub partitions for intra prediction.

\* \* \* \* \*